United States Patent
De Jong

(10) Patent No.: US 10,142,119 B2
(45) Date of Patent: Nov. 27, 2018

(54) COMMUNICATION METHOD AND APPARATUS USING CHANGING DESTINATION AND RETURN DESTINATION ID'S

(71) Applicant: ORACLE INTERNATIONAL CORPORATION, Redwood City, CA (US)

(72) Inventor: Eduard K. De Jong, Amsterdam (NL)

(73) Assignee: SUN MICROSYSTEMS, INC., Santa Clara, CA (US)

(*) Notice: Subject to any disclaimer, the term of this patent is extended or adjusted under 35 U.S.C. 154(b) by 136 days.

(21) Appl. No.: 14/841,185

(22) Filed: Aug. 31, 2015

(65) Prior Publication Data

US 2016/0006572 A1    Jan. 7, 2016

Related U.S. Application Data

(62) Division of application No. 11/987,659, filed on Dec. 3, 2007, now Pat. No. 9,137,212.

(Continued)

(51) Int. Cl.
*G06F 15/16* (2006.01)
*H04L 12/18* (2006.01)
(Continued)

(52) U.S. Cl.
CPC .......... *H04L 12/18* (2013.01); *G06F 11/1004* (2013.01); *H04L 63/0428* (2013.01); *H04L 63/08* (2013.01)

(58) Field of Classification Search
CPC ............................. H04L 63/0428; H04L 63/08
See application file for complete search history.

(56) References Cited

U.S. PATENT DOCUMENTS 5,430,727 A * 7/1995 Callon ................... H04L 29/06
                                                        370/401
5,592,488 A * 1/1997 Thomann .............. G06F 9/3824
                                                        370/465
(Continued)

FOREIGN PATENT DOCUMENTS

WO      8902140 A    3/1989
WO      9935791 A    7/1999
(Continued)

*Primary Examiner* — John B Walsh
(74) *Attorney, Agent, or Firm* — Tarolli, Sundheim, Covell & Tummino LLP

(57) ABSTRACT

A method of exchanging a series of communication primitives during one or more communication sessions between two or more communication units is provided. In one embodiment, the method includes providing a first communication primitive including at least a first destination ID identifying at least a first communication unit as a receiver of the first communication primitive. The method also includes providing first data in the first communication primitive that reflects a first return destination ID identifying at least a second communication unit as a sender of the first communication primitive. Further, using the first data, a second destination ID is determined that is included in a second communication primitive sent from the first communication unit to the second communication unit. Also, the method includes determining, by the second communication unit during the one or more communication sessions, second data indicating a second return destination ID, wherein the second data differs from the first data and providing a third communication primitive including the second data.

17 Claims, 24 Drawing Sheets

Related U.S. Application Data

(60) Provisional application No. 60/872,507, filed on Dec. 4, 2006.

(51) Int. Cl.
*H04L 29/06* (2006.01)
*G06F 11/10* (2006.01)

(56) References Cited

U.S. PATENT DOCUMENTS

| | | | |
|---|---|---|---|
| 5,802,519 A | 9/1998 | De Jong | |
| 5,941,988 A * | 8/1999 | Bhagwat | H04L 69/16 |
| | | | 726/12 |
| 6,058,483 A | 5/2000 | Vannel | |
| 6,094,656 A | 7/2000 | De Jong | |
| 6,157,955 A * | 12/2000 | Narad | H04L 45/16 |
| | | | 709/228 |
| 6,172,972 B1 * | 1/2001 | Birdwell | H04B 7/18584 |
| | | | 370/349 |
| 6,359,886 B1 * | 3/2002 | Ujihara | H04L 45/00 |
| | | | 370/392 |
| 6,526,451 B2 * | 2/2003 | Kasper | G06F 5/065 |
| | | | 370/359 |
| 6,725,272 B1 * | 4/2004 | Susai | H04L 29/06 |
| | | | 709/229 |
| 6,823,453 B1 * | 11/2004 | Hagerman | H04L 29/12009 |
| | | | 380/211 |
| 6,842,446 B2 * | 1/2005 | Everson | H04W 28/06 |
| | | | 370/328 |
| 6,847,647 B1 * | 1/2005 | Wrenn | H04L 45/24 |
| | | | 370/392 |
| 6,963,982 B1 * | 11/2005 | Brustoloni | H04L 29/12009 |
| | | | 713/160 |
| 7,046,625 B1 * | 5/2006 | Kasper | H04L 49/25 |
| | | | 370/230 |
| 7,215,684 B1 * | 5/2007 | Rosen | H04W 28/06 |
| | | | 370/477 |
| 7,249,306 B2 * | 7/2007 | Chen | H03M 13/091 |
| | | | 714/700 |
| 7,304,996 B1 * | 12/2007 | Swenson | H04L 45/7453 |
| | | | 370/229 |
| 7,336,682 B2 * | 2/2008 | Singh | H04L 12/4633 |
| | | | 370/392 |
| 7,555,608 B2 * | 6/2009 | Naik | G06F 12/0891 |
| | | | 711/133 |
| 7,565,463 B2 * | 7/2009 | Johnsen | G06F 13/4022 |
| | | | 370/351 |
| 7,636,369 B2 * | 12/2009 | Wong | H04L 12/4645 |
| | | | 370/389 |
| 7,710,978 B2 * | 5/2010 | Signaoff | H04L 63/0272 |
| | | | 370/395.5 |
| 7,821,931 B2 * | 10/2010 | Swenson | H04L 45/7453 |
| | | | 370/230 |
| 7,908,651 B2 * | 3/2011 | Maher | H04L 12/4633 |
| | | | 709/227 |
| 7,936,682 B2 * | 5/2011 | Singh | H04L 69/22 |
| | | | 370/241 |
| 2001/0023460 A1 * | 9/2001 | Boucher | G06F 5/10 |
| | | | 709/250 |
| 2003/0076794 A1 * | 4/2003 | Kawasaki | H03M 13/093 |
| | | | 370/329 |
| 2003/0210663 A1 * | 11/2003 | Everson | H04W 28/06 |
| | | | 370/329 |
| 2004/0049596 A1 * | 3/2004 | Schuehler | H04L 43/18 |
| | | | 709/238 |
| 2004/0123221 A1 * | 6/2004 | Huffman | H03M 13/093 |
| | | | 714/776 |
| 2004/0151109 A1 * | 8/2004 | Batra | H04B 1/7163 |
| | | | 370/208 |
| 2005/0122986 A1 * | 6/2005 | Starr | H04L 69/16 |
| | | | 370/412 |
| 2005/0182841 A1 * | 8/2005 | Sharp | H04L 69/16 |
| | | | 709/228 |
| 2005/0193316 A1 * | 9/2005 | Chen | H03M 13/091 |
| | | | 714/758 |
| 2005/0278459 A1 * | 12/2005 | Boucher | H04L 12/5693 |
| | | | 709/250 |
| 2006/0098585 A1 * | 5/2006 | Singh | H04L 63/1416 |
| | | | 370/252 |
| 2007/0192543 A1 * | 8/2007 | Naik | H04L 47/2441 |
| | | | 711/133 |
| 2007/0242696 A1 * | 10/2007 | Signaoff | H04L 63/0272 |
| | | | 370/469 |
| 2008/0049774 A1 * | 2/2008 | Swenson | H04L 45/7453 |
| | | | 370/412 |

FOREIGN PATENT DOCUMENTS

| | | |
|---|---|---|
| WO | PCT/NL00/00510 | 7/2000 |
| WO | 0172012 | 9/2001 |

\* cited by examiner

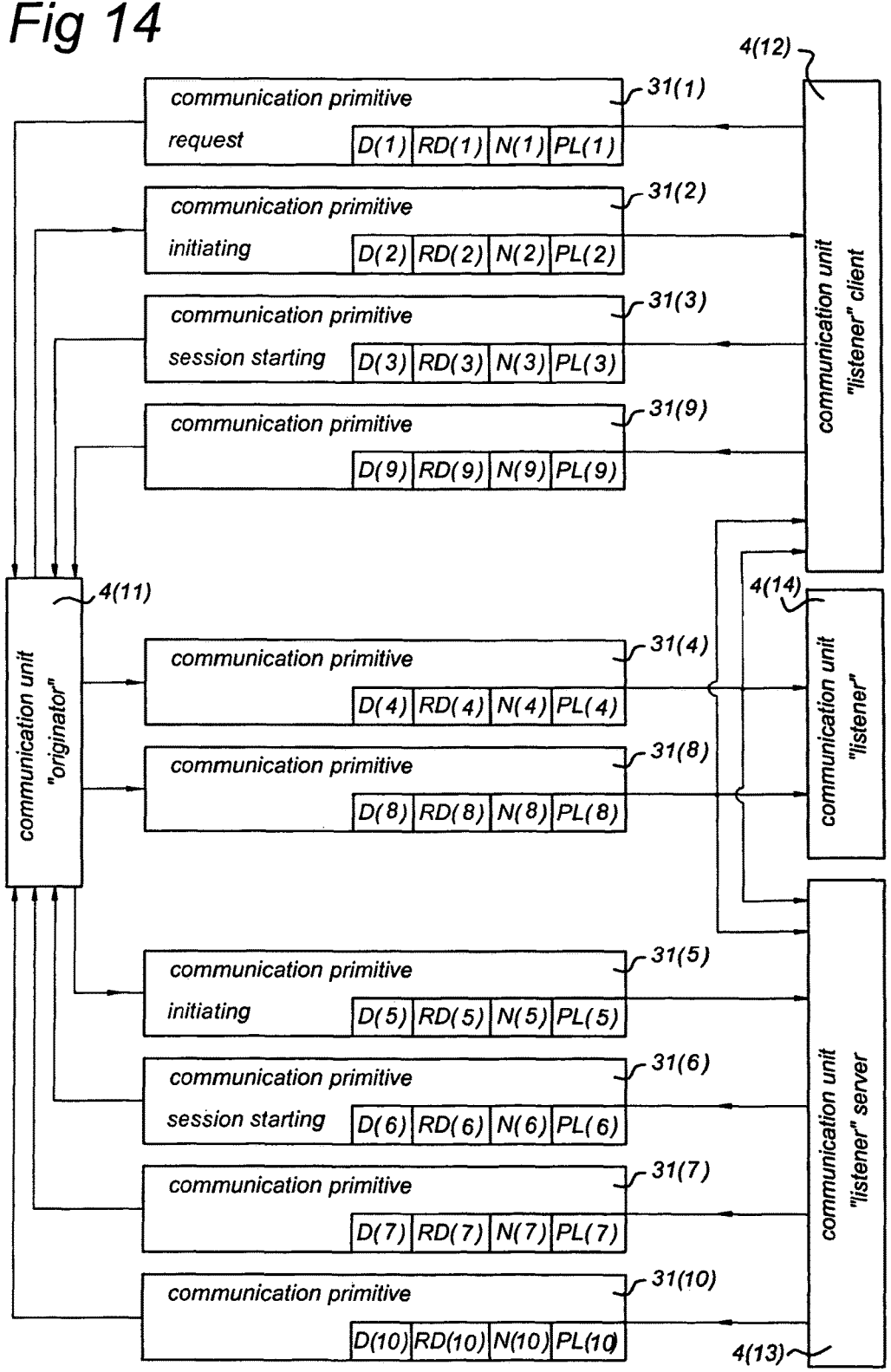

Fig 15

| communication unit 4(12) as client | communication unit 4(13) as server |
|---|---|
| 31(1)   sending | |
| D(1) = e.g. pre- arranged < for 4(11) ><br>RD(1) = checksum<br>N(1) = random<br>PL(1) = request to join multicast. session | |
| 31(2)   receiving | 31(5)   receiving |
| D(2) = RD(1) <for 4(12)><br>RD(2) = checksum<br>N(2) = multicast destination ID<br>PL(2) = "initiating" + data | D(5) = e.g. pre -arranged<for 4(13)><br>RD(5) = checksum<br>N(5) = N(2) =multicast destination ID<br>PL(5) = "initiating" + data |
| 31(3)   sending | 31(6)   sending |
| D(3) = RD(2) <for 4(11)><br>RD(3) = N(2) = multicast destination ID<br>N(3) = checksum<br>PL(3) = "session starting" + data | D(6) = RD(5) <for 4(11)><br>RD(6) = N(5) = multicast destination ID<br>N(6) = checksum<br>PL(6) = "session starting" + data |
| 31(4)   receiving | 31(4)   receiving |
| D(4) = RD(3) = RD(6) =multicart destination ID<br>RD(4) = checksum<br>N(4) = random<br>PL(4) = session data | |
| | 31(7)   sending |
| | D(7) = RD(4)<br>RD(7) = multicast destination ID or random return destination ID<br>N(7) = checksum<br>PL(7) = |
| 31(8)   receiving | 31(8)   receiving |
| D(8) = RD(3) = RD(6) = multicast destination ID<br>RD(8) = checksum<br>N(8) = random or multicast destination ID2<br>PL(8) = session data, or invitation to (re)join | |
| 31(9)   sending | 31(10)   sending |
| D(9) = RD(4)<br>RD(9) = checksum<br>N(9) = random<br>PL(9) = | D(10) = RD(4)<br>RD(10) = multicast destination ID2<br>N(10) = checksum<br>PL(10) = |

COMMUNICATION METHOD AND APPARATUS USING CHANGING DESTINATION AND RETURN DESTINATION ID'S

CROSS REFERENCE TO RELATED APPLICATIONS:

This application is a divisional of U.S. patent application Ser. No. 11/987,659 filed on Dec. 3, 2007, which is incorporated herein in its entirety by reference.

RELATED APPLICATIONS

This application claims priority of U.S. Provisional Application No. 60/872,507 filed Dec. 4, 2006, which is hereby incorporated by reference in its entirety.

FIELD OF THE INVENTION

The present invention relates to communication messages and the way they are transmitted. In certain embodiments, the communication messages may include at least a header and a payload and the header may include units of data, such as at least a destination ID and data to determine a return destination ID.

BACKGROUND OF THE INVENTION

Communication devices, such as transmitters, receivers and transceivers are connected through a common communication infrastructure. The connections may be either wireless or via fixed cables. A communication device typically comprises a processing unit, an input/output device connected to the communication infrastructure, working memory and program memory. Additionally, the communication device may have an input device, such as a keyboard and a mouse, and a display to communicate with a human operator. The program memory of the communication device contains one or more programs that, while being executed by the processing unit, may require, from time to time, that data is to be sent or received from other communication devices that are connected to the same common communication infrastructure. The common communication infrastructure typically comprises data transportation devices, like copper or optical cables, that provide the connection between communication devices possibly in combination with interconnection nodes that provide for information transfer between physically separated data transportation devices. Connection to the common communication infrastructure need not be permanent and may vary both in location and over time. At a given time, a communication unit may be connected to none, one or several distinct data transportation devices.

Data transportation devices may be shared, e.g., they may be used at the same time by different communication devices. Shared transportation devices are typically connected to more than two communication devices and/or interconnection nodes. The communication devices or interconnection nodes perform amongst themselves an arbitration protocol to allocate communication capacity of the shared data transportation devices to each of the connected communication devices or interconnection nodes. Ethernet™ is a type of communication architecture that uses shared data transportation devices.

In some instances, data transportation devices may not be shared. Instead, they may be dedicated to two communication devices communicating with one another. Dedicated data transportation devices typically connect a communication device or an interconnection node with a single other communication device or interconnection node, e.g., a 10-BaseT connection. An interconnection node for such a dedicated data transportation device is typically connected to more than two of such communication devices.

Data communication between communication devices typically involves the sending and subsequently receiving of data unites often referred to as "packets" or "messages" comprising a message header and some additional data. The message header typically comprises a part to identify a communication unit that is intended as receiver and further data indicating the manner to correctly interpret and process the message header and the additional data being transmitted. For example, in TCP/IP network communication, the IP number of the recipient is part of the message header. The additional data comprises "pure" data or instructions, or both.

When communicating over shared transportation devices, an arbitration protocol allows the communication devices' and interconnection nodes to, in effect, simultaneously use the same resources, such as copper or optical cables, and perform communication in a pseudo-exclusive fashion. The arbitration protocol may include a multiplexing technique and predefined priority rules. However, sharing the resources also allows any of the other communication devices connected to that resources to share, intended or unintended, in the communication performed, resulting in a fundamental lack of confidentiality in communication over such shared resources.

Another aspect of using shared resources is that a single communication device for performing a predetermined task may in fact be arranged as a number of physically distinct collaborating communication devices. In some cases, the transparent collaboration of communication units to be perceived by other communicating units as one may be beneficial.

Typically, a communication device, or equally, a collection of collaborating communication devices, takes part in a communication either in a role of initiator, commonly referred to as "client," or in a role of respondent, commonly referred to as "server." However, because a communication device may participate in multiple simultaneous communications, it may operate in any combination of these two roles.

Functionally, a communication message may be defined as a unit of data sent by a communication device acting as client, commonly referred to as "request," or sent by a communication device acting as server, commonly referred to as "response." A request-and-response type communication is typical for communications between computer programs using Remote Procedure Calls (RPC) or Remote Method Invocation (RMI), or for communication on the World Wide Web (e.g., HTTP), or many other TCP/IP protocols.

The RPC concept was developed by Sun Microsystems, Inc. as part of the Open Network Computing architecture. The RPC is an interface allowing different programs to communicate with one another. The interface allows communication devices to use services of other communication devices. Upon request by a sending communication device another communication device, executes data received from the sending communication device and the results are transmitted back to the sending communication device.

RMI was also developed by Sun Microsystems, Inc. for distributed programs using software objects written in Java.

RMI is an example of an RPC mechanism and allows Java objects instantiated somewhere in a network of computers to access each other remotely.

Another type of communication includes "message passing" between communication devices. In message passing, a response is required although such a response is typically restricted to only contain an acknowledgement of the reception of a communication message. Such a restricted response is sent by a receiver to a sender. Typically, in this type of communication, a subsequent response message may also be sent to the sender by the receiver.

Communication between devices can be described as performed as a session. In session, the communication is started at some point in time and, after a period of regular exchange of communication messages, no further messages are sent. Typically, a communication session is started by the exchange of an initial set of communication messages that may serve to establish the purpose of the session or any parameters needed by the communicating devices. Session initialization is typically used when it is required that the communication is secured to, for example, establish a shared data encryption key.

In some implementations of data transportation devices, a communication message may, during actual transport, be partitioned and reassembled as may be required by the data transportation devices. For example, communication messages can be reassembled to conform to the communication message structure inherent to ATM (Asynchronous Transfer Mode) connection. This technique is commonly implemented in Internet-based communications.

In general, a computer program may be designed based on a plurality of software units, such as "objects," e.g., Java™ Enterprise Beans. Java™ Enterprise Beans are developed by Sun Microsystems, Inc. The software units may be designed to execute in separate controlling threads. Data communication may be performed between programs and, in particular, between specific controlling threads in these programs.

Some communication sessions between controlling threads require security. Communicating devices, or, communicating computer programs, may be implemented to protect communication between themselves and one or more other devices or computer programs. For a secured communication at least one of the following may be required:
1. Establishing an appropriateness of a communicating device, or program, to take part in the communication;
2. Controlling authenticity;
3. Maintaining confidentiality of the existence of the communication; and
4. Maintaining confidentially of data exchanged in the communication.

In IP protocol Ipv6, the traditional EP protocol (IPv4) has been extended to provide support for security in data communication mainly for items 2 and 3 mentioned above. The actually applied security mechanism to the communication session may depend on the relative locations of the computer programs and may vary from communication session to communication session. In particular, in some cases no security mechanisms will be applied to a communication session.

U.S. Pat. Nos. 5,802,519 and 6,094,656 describe systems and communication devices that define executable procedures and data stored in a communication device to communicate with other communication devices in an orderly exchange of communication messages. These patents, however, do not disclose specifics regarding the data exchanged in communication primitives or of the nature of the processing involved in response to a received communication message, such as determining data elements contained in the header of a communication message.

International Patent Application No. PCT/NL00/00510 describes a system of communication devices that communicate by exchanging communication messages, where additional data is inserted in the payload of each communication message. The additional data is derived from application program data available to the communication devices and stored in the payload of the communication message. The 00510 publication, however, does not describe how the data in the header of a communication message is constructed.

Further, WO-A-01/72012 describes a mechanism to enhance security in a conglomerate of communicating small processors, by implementing a solution to the problem of initializing and administering cryptographic data, such as, secret keys needed to perform secured communications.

SUMMARY OF THE INVENTION

Accordingly, it is desirable to have a system and method that enhances the security of data communication, especially in systems using shared data transportation devices. Moreover, there is a need to provide security at moderate overhead in communication bandwidth and processing power. Methods and systems consistent with certain embodiments of the disclosed invention addresses these and other concerns.

In one embodiment, a method is provided that includes the steps of providing a first communication primitive including at least a first destination ID identifying at least a first communication unit as a receiver of the first communication primitive. The method also includes providing first data in the first communication primitive that reflects a first return destination ID identifying at least a second communication unit as a sender of the first communication primitive. Further, using the first data, a second destination ID is determined that is included in a second communication primitive sent from the first communication unit to the second communication unit. Also, the method includes determining, by the second communication unit during the one or more communication sessions, second data indicating a second return destination ID, wherein the second data differs from the first data and providing a third communication primitive including the second data.

In another embodiment a machine-readable storage device storing a communication primitive is provided that includes a payload and a header including at least a destination ID identifying at least one communication units as a receiver of the communication primitive and other data. In certain embodiments, the header includes checksum data having a value in accordance with a predetermined relation with at least the destination ID and at least a part of the other data.

In another embodiment, a communication port is provided that is for a transceiver communication unit arranged to operate as a sending communication unit to send a series of communication primitives during a communication session to one or more further communication units, and as a receiving communication unit to receive a series of communication primitives during the communication session from the one or more further communication units. The communication primitives may each include a destination ID identifying the transceiver communication unit or the one or more further communication units as receiver of the communication primitives. Further, the communication primitives may each include data indicating a return destination ID that identifies the transceiver communication unit or the one or more further communication units as a return address for a possible return communication primitive from the receiver identified by the destination ID. Further, in certain embodiments, the transceiver communication unit may includes a port logic controller arranged to change the data indicating the return destination ID during a communication session when the transceiver communication unit operates as sending communication unit. Additionally, in certain embodiments, the communication port may include a memory storing a destination table including destination records with different return destination ID's assembled by the port logic controller for communication primitives previously sent to the one or more further communication units. In certain embodiments, when the transceiver communication unit operates as receiving communication unit, the port logic controller establishes whether a received communication primitive is addressed to the transceiver communication unit by comparing the destination ID of the received communication primitive with the return destination IDs.

In another embodiment, a method is disclosed of communicating a series of communication primitives during a multicast communication session between an originating communication unit and listening communication units. The method may include sending multicast communication primitives from the originating communication unit to the listening communication units. In certain embodiments, the multicast communication primitives include at least a multicast destination ID identifying each one of the listening communication units as a receiver of each of the multicast communication primitives. The method may also include changing the multicast destination ID by the originating communication unit during the multicast communication session to generate a changed multicast destination ID.

In another embodiment, a method is provided for initializing a communication in a communication system including a first set of communication units that are permanently or intermittently connected for communication, a second set of communication units that are a sub-set of the first set of communication units and a third set of communication units that are a sub-set of the second set of communication units. the method may include distributing a first random number to each communication unit in the second set of communication units for use in requesting an initialization of further communications. Further, the method may include providing functions for initializing communication by each communication unit in the third set of communication units. In certain embodiments, the first random number is assigned to each communication unit in the third set of communication units as a destination ID for requesting the initializing communication.

In other embodiments, a communication primitive is disclosed that includes a return destination ID has a different value from a return destination ID used for a previous communication primitive in the same session.

Furthermore, in accordance with the present invention, in some of the communication primitive, at least one of the destination ID and return destination ID comprises a randomly assembled number.

Also in accordance with the present invention, in at least one of the communication primitives data in the header can be used to assemble a return destination ID in accordance with a predetermined rule.

Thus, including in each data exchange between communication devices a randomly (or pseudo-randomly) generated number that may serve as address of a further communication message, serves to support additional security. The mechanism of how such a communication message with a randomly determined address can be conveyed over a network and can be received by the intended receiving communication device is explained later. The randomly generated number may, for instance, serve as authentication code of transmitted data or as a seed for a data encryption key that encrypts data. In this manner, secured communication can be realized with very little overhead in utilization of communication bandwidth and at moderate costs in processing. Moreover, in this way security can be realized at the basic communication-primitive level of a communication protocol.

It is to be understood that the term "random" not necessarily refers to pure random. The random value may, for example, be dependent on one or more other numbers in the communication message that further includes either pure random data or pseudo randomly computed data. In one embodiment, the random number used in the communication primitive is unpredictable.

With embodiments of the invention, an efficient way of secure communication between communication devices may be obtained. In particular, certain embodiments of the invention is applicable to small computers and embedded systems that are not always connected to a large communication network or are communicating with other computers on a restricted network. Such a loosely connected, federated system of computers is expected to be a major component in the trend to ubiquitous computing, where programmable communicating devices are deployed to control everything, like car and home lights, dish washers, magnetron ovens, telephones, etc. Security is a major concern in such systems to guarantee proper control of the, often wireless, communicating devices and to protect the privacy of the operators. Embodiments of the present invention achieve this type of security. Moreover, certain embodiments of the present invention enable such security to be relatively easy to implement and manage. For example, certain embodiments may be realized as an additional and relatively small on-chip component.

In one embodiment, a communication message may include a randomly assembled number that has a predetermined relationship with at least one of the following items: a second random number comprised in the header, at least one of the other data units in the header, and of at least one part of the data units in the payload, calculated by means of a cryptographic hash function. In a further embodiment, the return destination ID in the communication primitive comprises the randomly assembled number.

Embodiments of the present invention also relate to a communication unit arranged to receive a communication message from another communication unit. The communication message may comprise at least a header and a payload. The header may comprise units of data including at least a destination ID and a randomly assembled number. The communication unit may be arranged to establish an identify if a destination communication unit to receive the communication message based on the destination ID, The communication unit may be configured to recognize the destination ID when the destination ID comprises a number assembled previously by the communication unit and included in an earlier message to one other communication unit. In a further embodiment, the previously assembled number included in the earlier message has a predetermined relationship with at least one of the following items of the earlier communication primitive: a second random number comprised in the header, at least one of the other data units in the header and of at least one part of the data in the payload, calculated by means of a cryptographic hash function.

Embodiments of the present invention also relate to a system comprising at least two communication units, each communication unit being a communication unit as described above.

Moreover, the disclosed embodiments of the present invention relate to a communication method comprising using a communication message in a transmission from a first communication unit to a second communication unit, the communication message comprising at least a header and a payload, the header comprising units of data including at least a destination ID and a randomly assembled number, the method comprising establishing to which communication unit the communication message is addressed by analyzing the destination ID, wherein the method comprises recognizing said destination ID by the second communication unit when the destination ID comprises a value assembled by said second communication unit itself and included in an earlier message to the first communication unit.

Certain embodiments associated with the present invention also relates to computer program product to be loaded by a communication unit to provide the communication unit with the capacity to receive a communication message from a further communication unit, the communication message comprising at least a header and a payload, the header comprising units of data including at least a destination II) and a randomly assembled number, and to provide the communication unit with the capacity to establish to which communication unit the communication message is addressed by analyzing the destination ID, wherein said computer program product provides the communication unit with the capacity to recognize the destination ID when the destination 1D comprises a value assembled by the computer program product in the communication unit itself and included in an earlier message to the further communication unit.

Certain embodiments relate to data structures and data carriers, such as a CD-ROM or DVD, provided with a computer program product as defined above.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIG. 14 is a block diagram of an exemplary interaction pattern between an originating communication unit and a plurality of other communication units when communicating in multicast fashion in accordance with certain disclosed embodiments.

FIG. 15 is a table with exemplary data values for communication primitives that may be exchanged in a multicast communication session in accordance with certain disclosed embodiments.

DESCRIPTION OF THE EMBODIMENTS

Figure 1:
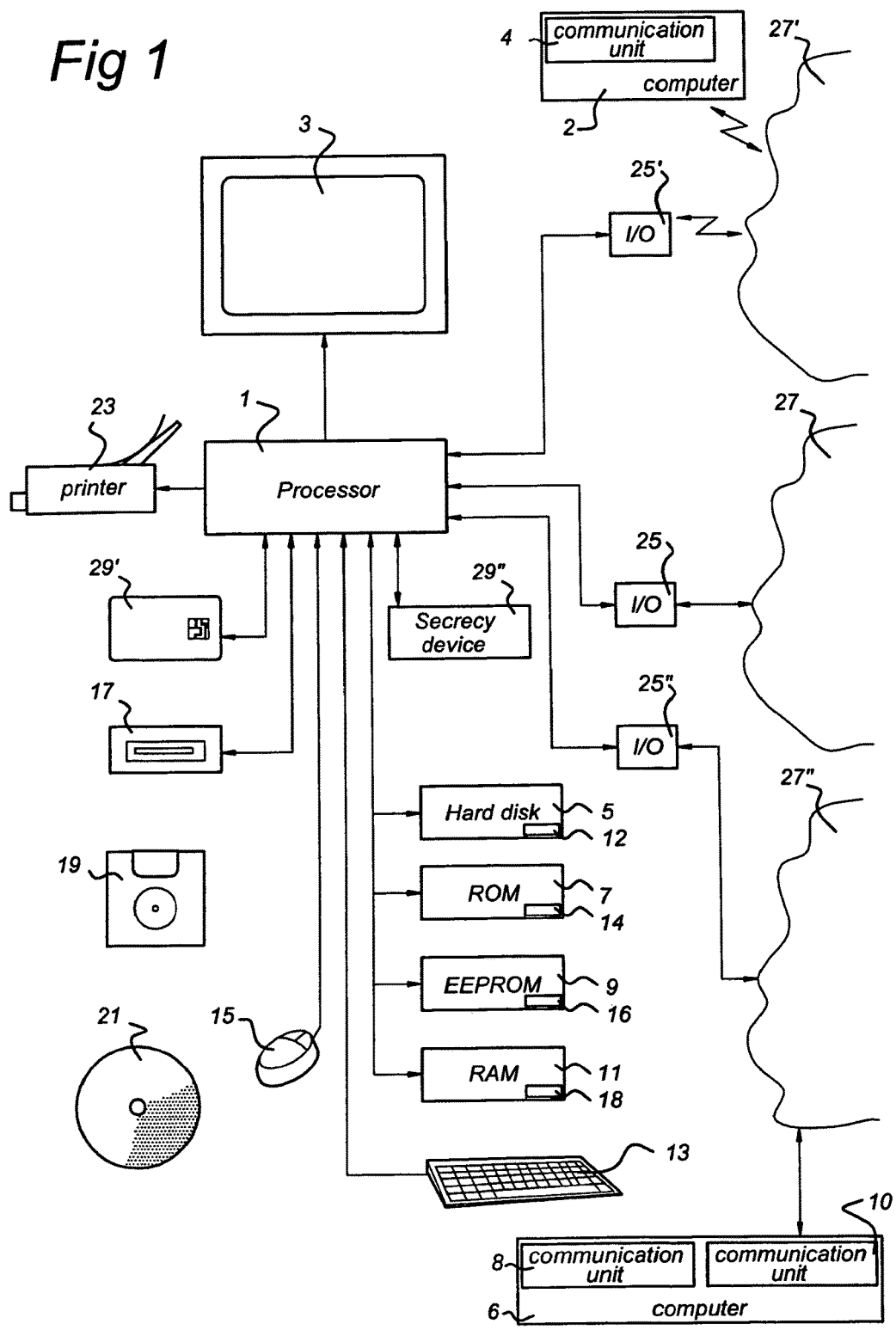
FIG. 1 is a diagram of an exemplary functional arrangement comprising a communication unit.

Reference will now be made in detail to the present exemplary embodiments of the invention, examples of which are illustrated in the accompanying drawings. Wherever possible, the same reference numbers will be used throughout the drawings to refer to the same or like parts.

In the context of certain embodiments of the present invention, a "communication primitive" may reflect a "communication message." In this regard, a communication primitive comprises a header and a payload as described above in connection with a communication message.

Further, in the context of certain embodiments of the present invention, the terms "process" or "programmed process" may refer to any set of operations that are deployed for an intended functional purpose, such as a software program or hard-wired logic, configured to perform the functional purpose.

Moreover, in the context of certain embodiments of the present invention, "communication units" may reflect communication devices. A communication unit may reflect one or more physical entities capable of doing something. A communication unit may also reflect distinct programmed "processes," or threads of control, on a computer that share one or more processors and may communicate amongst themselves as well as communicate with other processors over a communication infrastructure using, for example, shared data transportation devices. Shared data transportation devices may be communication channels shared by two or more communication units. In embodiments where communication is performed between "processes" executed by a single processor, the shared data transportation devices may be implemented as shared memory.

A communication unit may be associated with one or more attributes, such as a controlling entity (e.g. a human operator), a location, a physical processor performing an execution thread (or threads) in the communication unit, or the functions that can be performed by the communication unit while communicating, e.g. such as services provided by a server.

In accordance with certain embodiments, a communication session may, over time, migrate to a different piece of hardware (e.g., processor), moving all its internal state and possible distinct execution threads to a different physical environment, even while maintaining the communication session. For instance, a computer program processing data, and storing data in and reading data from, a memory, can be transported from one processor to another processor before completing execution. For example, migration may be performed to allow load balancing between a plurality of computers or to compensate for failure of a computer running the computer program.

In other embodiments, threads and states that comprise a conceptual process will in general be contained on a single processor, or closely coupled assembly of processors, such as when computer programs controls a printer. In this case, migration of the computer program tends to be more difficult.

In accordance with certain embodiments, a communication unit may be computer programs running on one or more predetermined computers. The computer programs may perform one or more functions and may be transferred from one computer to another.

In certain embodiments, communication units may not be directly interconnected. Instead, additional communication units may be used to function as interconnection nodes that interface the communication between indirectly connecting communicate units. The functionality provided by a communication unit that functions as an interconnection node is related to the capacity to receive a message from some sending communication unit and transmit it to some destination communication unit. In one embodiment, the sending and/or receiving communication units may be a communication unit functioning as an interconnection node. In accordance with the disclosed embodiments, a communication unit functioning as an interconnection node is referred to herein as an "interconnection node."

An interconnection node may be implemented in one or more separate hardware devices that contain in memory, one or more programs that perform communication mediating functions. In one embodiment, interconnection nodes may operate as a "hub", "bridge" or a "router."

An interconnection node may also be implemented as a communication unit comprising program functions performed by processor that mediate a communication between other communication units based on one or more intermediating policies implemented by the program functions. For instance, a communication unit functioning as an interconnection node may be implemented as a program on the same computer as a number of other communication units (e.g., programs) having communications mediated by one interconnection node program.

In another embodiment, communication between communication units, such as in the example of an interconnection node described above, may be implemented using shared hardware, e.g. memory. The manner of communications in this manner is similar to communications between communication units implemented in different hardware.

Communication Unit

FIG. 1 shows an embodiment of an exemplary computer arrangement. The communication unit shown in FIG. 1 may also reflect an embodiment in which the communication unit relates to a "process," such as a computer program, e.g. stored in memory. A "process" may be associated with the execution of a set of instructions present in or a part of, a computer program. The computer program may be executed by the computer arrangement shown in FIG. 1. The computer arrangement of FIG. 1 may comprise any number of communication units operating in a request-and-response type communication with another communication unit configured similar to or beneficial to the other communicate unit. FIG. 1 also shows an executing interconnection node 50 being in accordance with certain embodiments of the present invention.

As shown in FIG. 1, interconnection node 50 may comprise a processor 1 for performing arithmetic, logic and control flow operations.

Processor 1 may be connected to a plurality of memory components, including a hard disk 5, Read Only Memory (ROM) 7, Electrically Erasable Programmable Read Only Memory (EEPROM) 9, and Random Access Memory (RAM) 11. Not all of these memory types need necessarily be provided. Moreover, the memory components need not be located physically within the same system as processor 1, but may be located remote from processor 1. Moreover, other types of memory, such as tape and memory sticks, etc. may be provided. Memory components 5, 7, 9, 11 may each store data and instructions of computer programs to be executed by processor 1.

Hard disk 5, ROM 7, EEPROM 9, and the RAM 11, respectively, are shown to include a box 12, 14, 16, and 18 respectively. These boxes refer to respective memory portions storing sets of instructions and data forming one or more software communication units in accordance with an embodiment of the invention.

The processor 1 may also be connected to devices for inputting instructions, data etc. by a user, like a keyboard 13, and a mouse 15. Other (future) types of input devices, such as a touch screen, a track ball and/or a voice converter, known to persons skilled in the art may be provided too.

Processor 1 may also be connected to a reading unit 17. The reading unit 17 is arranged to read data from and possibly write data on a data carrier like a floppy disk 19, a CD-ROM 21, or recordable CD's. Other data carriers may be tapes, DVD, recordable DVD's etc., as is known to persons skilled in the art.

The processor 1 is also connected to a printer 23 for printing output data on paper, as well as to a display 3, for instance, a monitor (cathode ray tube), LCD (Liquid Crystal Display) screen or PDP (Plasma Display Panel), or any other type of display known to persons skilled in the art.

The processor 1 may be arranged to communicate with a tamper resistant storage 29', e.g. a smart card, for storing cryptographic keys that may be used to generate communication protection keys. Moreover, the processor 1 may be connected to a secrecy device 29" used as a user authentication device and that may perform cryptographic operations, possibly providing additional security in communications.

The processor 1 may be connected to one or more communication networks 27, 27', 27", for instance, the Public Switched Telephone Network (PSTN), a Local Area Network (LAN), a Wide Area Network (WAN), the Internet, etc. by means of I/O units 25, 25', 25". The processor 1 is arranged to communicate with other communication units through the networks 27, 27', 27", as determined by a computer program stored in memory 5, 7, 9, 11.

The processor 1 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 1 through the networks 27, 27', 27". Other such remote processors may be computer 2 communicating in a wireless way via network 27' controlled by communication unit 4, or computer 6 communicating with network 27" controlled by two (or more) communication units 8, 10.

Although the I/O units 25, 25', 25" are shown as physical boxes, communication between the computer arrangement and the networks 27, 27', 27" may be performed in a wireless fashion. This observation also holds for any other data transportation line shown in any of the figures: they may be either implemented as a physical line (copper or optical wire) or as a wireless connection.

Figure 2:
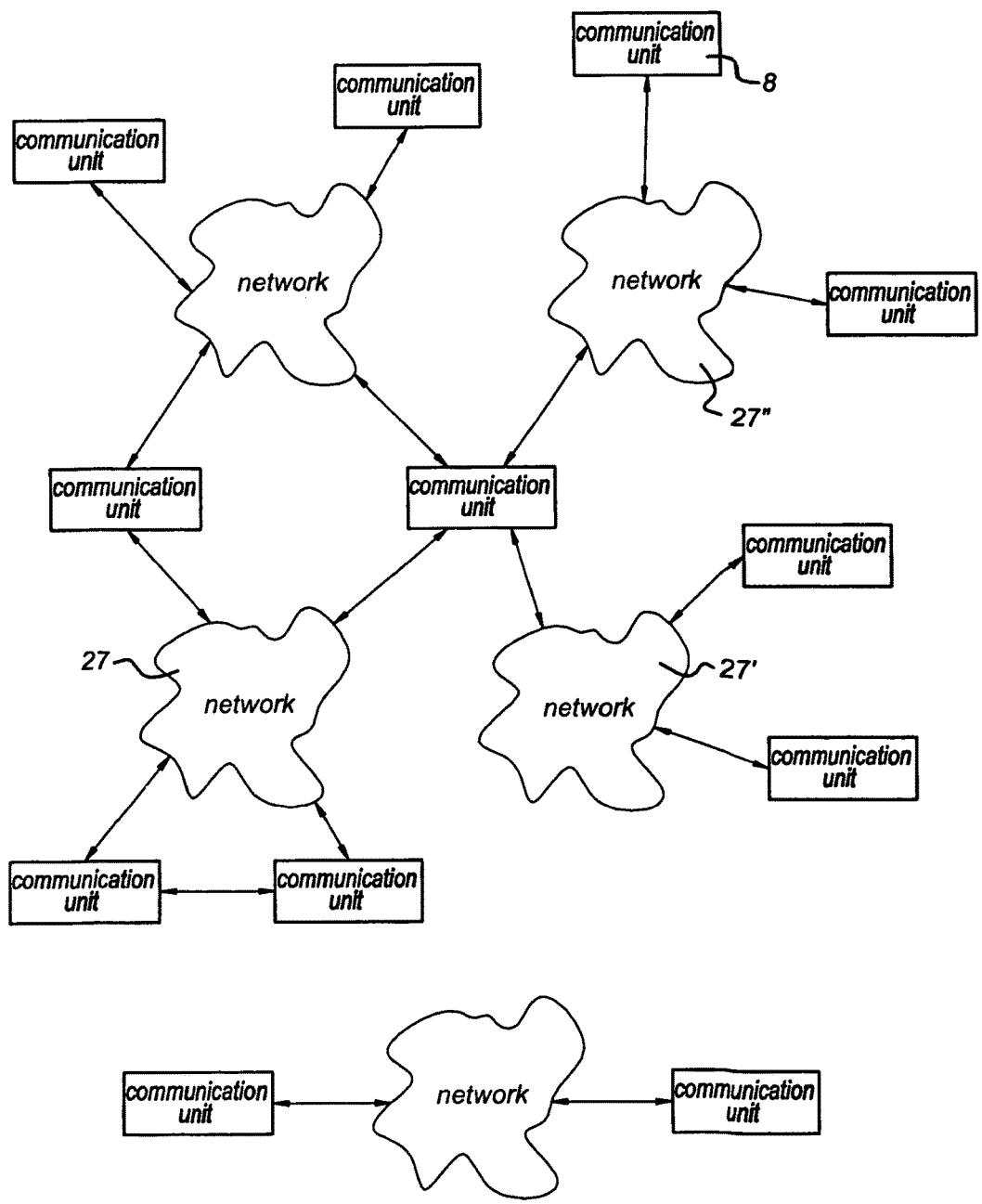
FIG. 2 is a diagram of an exemplary configuration of a number of communication units connected to data communication networks.

FIG. 2 shows an exemplary configuration of communication networks comprising several communication units. As shown, communication units may be configured to communicate with one another via the networks 27, 27', 27". Further as shown, one or more of the communication units may be arranged to communicate directly with another one without using one of those networks 27, 27', 27".

As illustrated in FIGS. 3a through 7, certain embodiments of the disclosed invention may be applicable to inter-process communications.

Figure 3A:
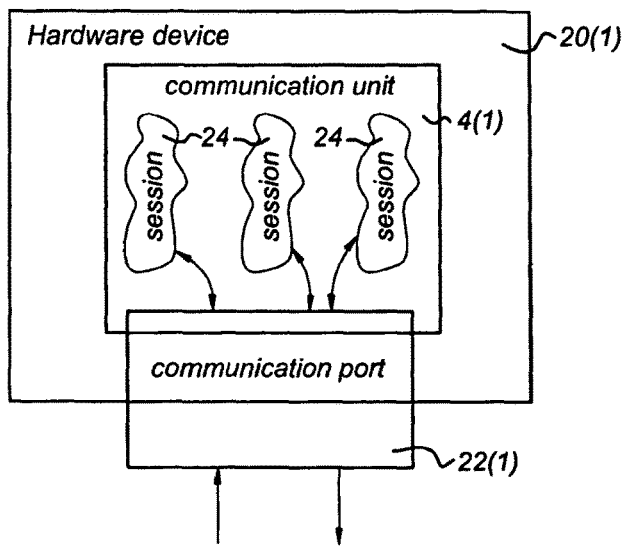
FIGS. 3A and 3B are related block diagrams of exemplary hardware devices comprising one or more communication units in accordance with certain disclosed embodiments.

FIG. 3a shows an exemplary communication unit 4(1) according to certain embodiments of the present invention. The communication unit 4(1) may be part of a hardware device 20(1), for instance, a light fixture or switch. One or more communication sessions 24 are running, or able to run, within the communication unit 4(1). The communication unit 4(1) is provided with a communication port 22(1) to support communication with other communication units, for instance, via the network structures shown in FIG. 2.

Figure 3B:
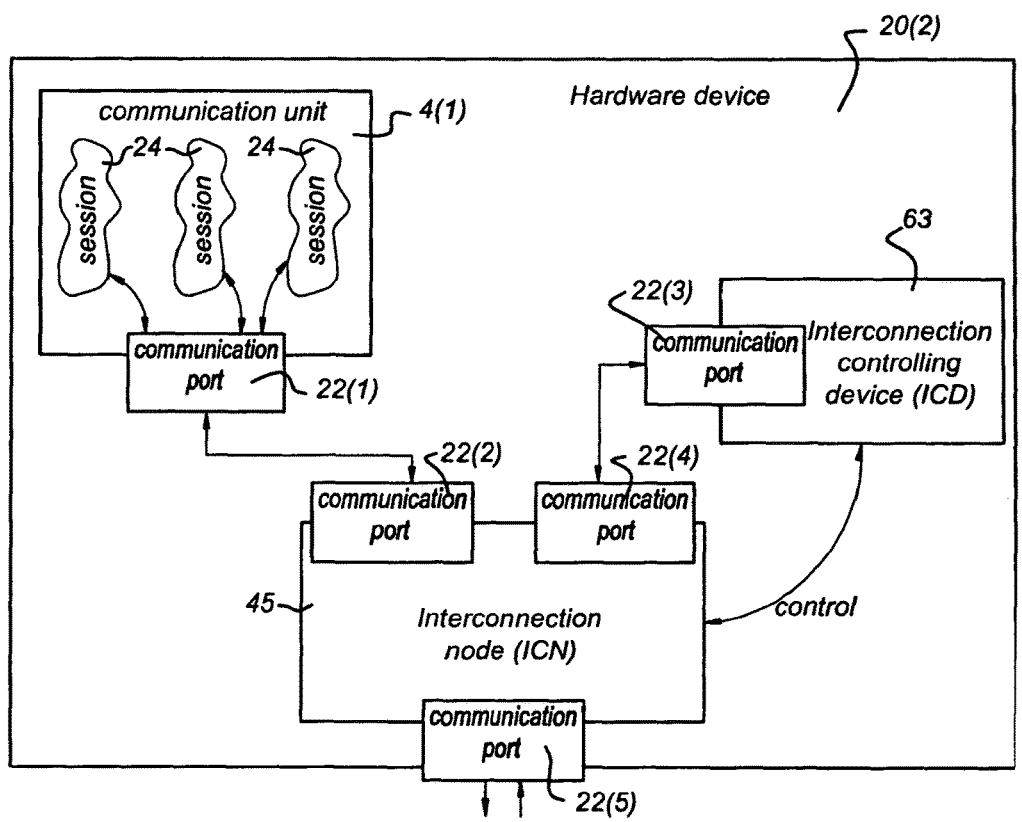

FIG. 3b shows an exemplary hardware device 20(2) with a communication unit 4(1) as shown in FIG. 3a. In this exemplary configuration, communication unit 4(1) may be connected via its communication port 22(1) with a further communication unit that is configured to operate as an interconnection node ICN 45. In certain embodiments, the interconnection node ICN 45 may be provided with a plurality of communication ports 22(2), 22(4), 22(5). Moreover, the hardware device 20(2) also comprises a further communication unit that operates as an interconnection controlling device ICD 63. Interconnection controlling device ICD 63 controls the interconnection node ICN 45 via a separate control line. Data communication between the interconnection controlling device ICD 63 and the interconnection node ICN 45 is provided via a data transmission line and respective communication ports 22(3), 22(4), as shown in FIG. 3b. The interconnection node ICN 45 is provided with a further port 22(5) for communicating with other communication units external to the hardware device 20(2) shown in FIG. 3b. In one embodiment, the hardware shown in FIG. 3b may be a light switch. Other types of hardware devices may be implemented in accordance with embodiments of the present invention.

Figure 4:
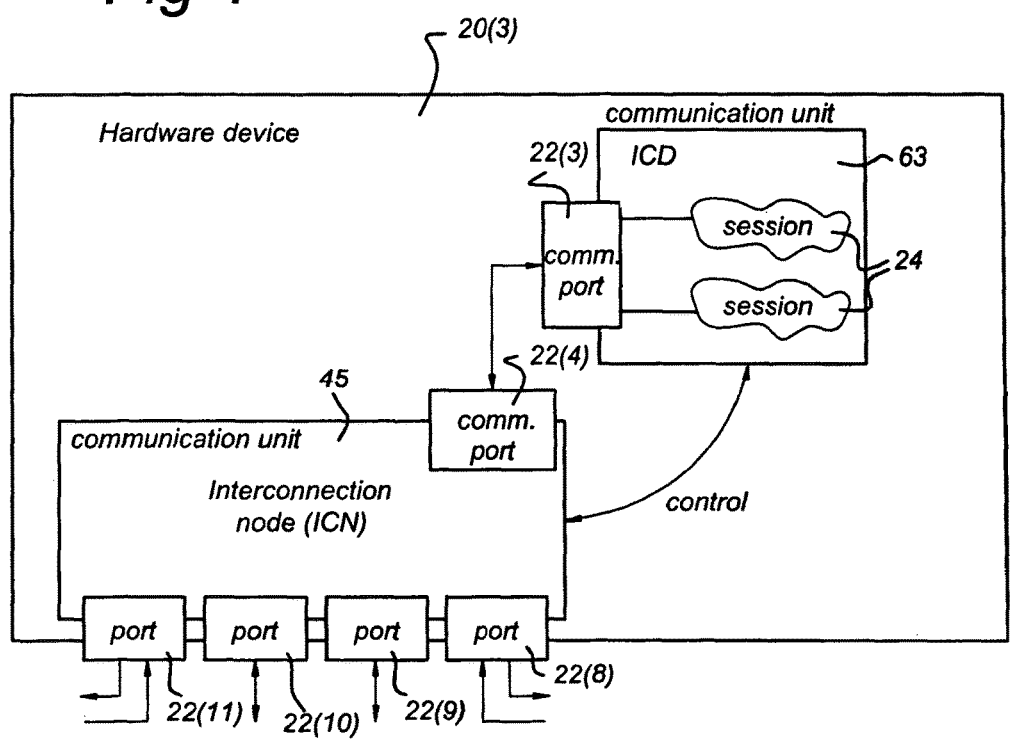
FIG. 4 is a block diagram of an exemplary hardware device comprising a communication unit dedicated to interconnecting other communication units in accordance with certain disclosed embodiments.

FIG. 4 shows an exemplary hardware device 20(3) that may for instance, be used as a router in the network structure shown in FIG. 2. In one embodiment, hardware device 20(3) comprises an interconnection control device ICD 63 that is connected to a further communication unit that operates as interconnection node ICN 45. The interconnection control device 63 controls the interconnection node ICN 45 via a separate control line. Data communication is provided through a separate data line and corresponding communication ports 22(3), 22(4). The interconnection node ICN 45 is provided with several communication ports 22(8)-22(11) to support communication with external communication units and/or other interconnection nodes.

Figure 5:
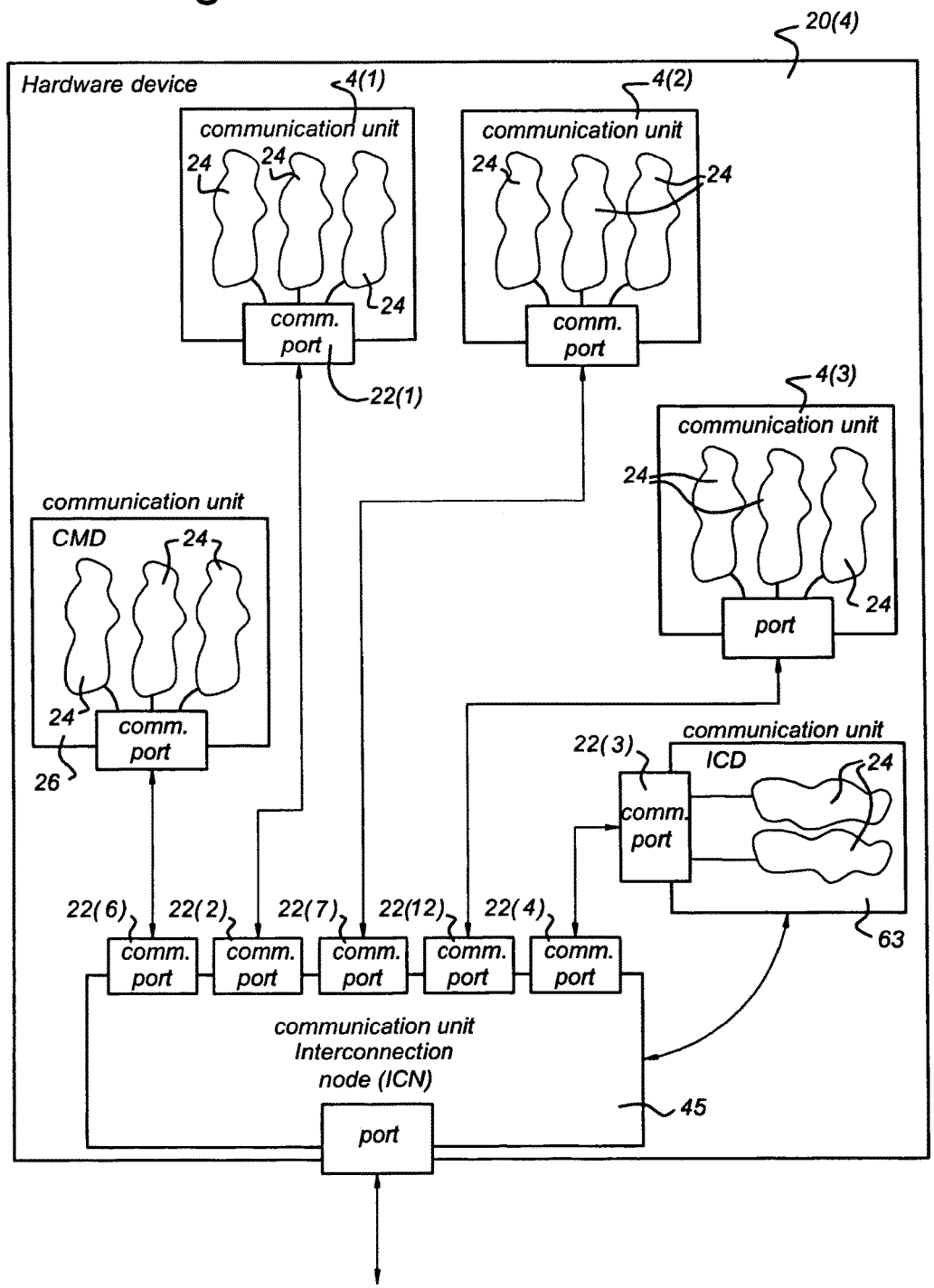
FIG. 5 is a block diagrams of exemplary hardware devices comprising a plurality of communication units in accordance with certain disclosed embodiments.

FIG. 5 shows an exemplary hardware device 20(4) including a plurality of communication units 4(1)-4(3) similar to the communication unit shown in FIG. 3a. All the communication units 4(1)-4(3) are connected to a further communication unit that operates as an interconnection node ICN 45 via separate communication lines and corresponding communication ports 22(2), 22(4), 22(6), 22(7), 22(12). Alternatively, the communication ports 22(2), 22(4), 22(6), 22(7), 22(12) are connected to a shared communication medium. Each of the communication units support running one or more communication sessions 24. The hardware device 20(4) is also provided with a further communication unit that operates as an interconnection controlling device ICD 63. Moreover, the hardware device is provided with a connection mediating device CMD 26. The CMD 26 is connected to the interconnection node ICN 45. Its function is to build connections between server units and client units. The hardware device shown in FIG. 5 may, e.g., be a computer (e.g., client), such as a desk top workstation.

Figure 6:
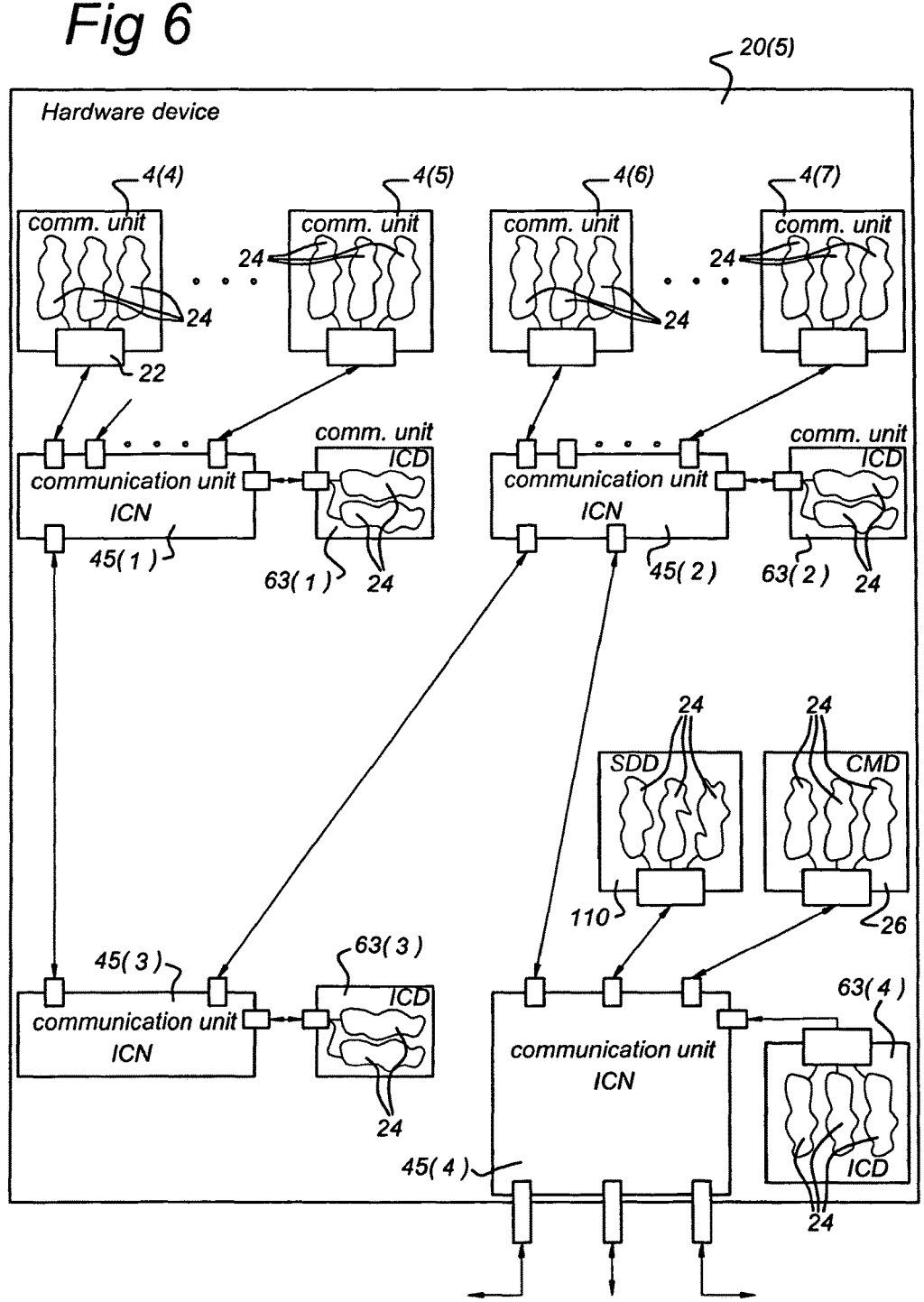
FIG. 6 is yet another block diagrams of exemplary hardware devices comprising a plurality of communication units in accordance with certain disclosed embodiments.

FIG. 6 shows an exemplary hardware device 20(5) that may, for instance be a computer (e.g., server). The hardware device 20(5) shown in FIG. 6 includes, for example, a plurality of further communication units that operate as interconnection nodes ICN 45(1) to 45(4), three of which 45(1), 45(2), 45(3) that are only able to communicate with devices within the hardware device 20(5), like other interconnection nodes ICN, respective interconnection control devices ICD 63(1), 63(2), 63(3) and communication units 4(4)-4(7). One of the interconnection nodes ICN 45(4) is provided with communication ports to provide communication with one or more communication units and interconnection nodes external to the hardware device. This latter interconnection node ICN 45(4) is internally connected to further communication units that operate as an interconnection control device ICD 63(4), a service discovery device SDD 121, and a connection mediation device CMD 26, respectively. The service discovery device SDD 110 supports clients to locate servers. The connection mediating device CMD 26 supports connection of a server communication unit and a client communication unit.

Figure 7:
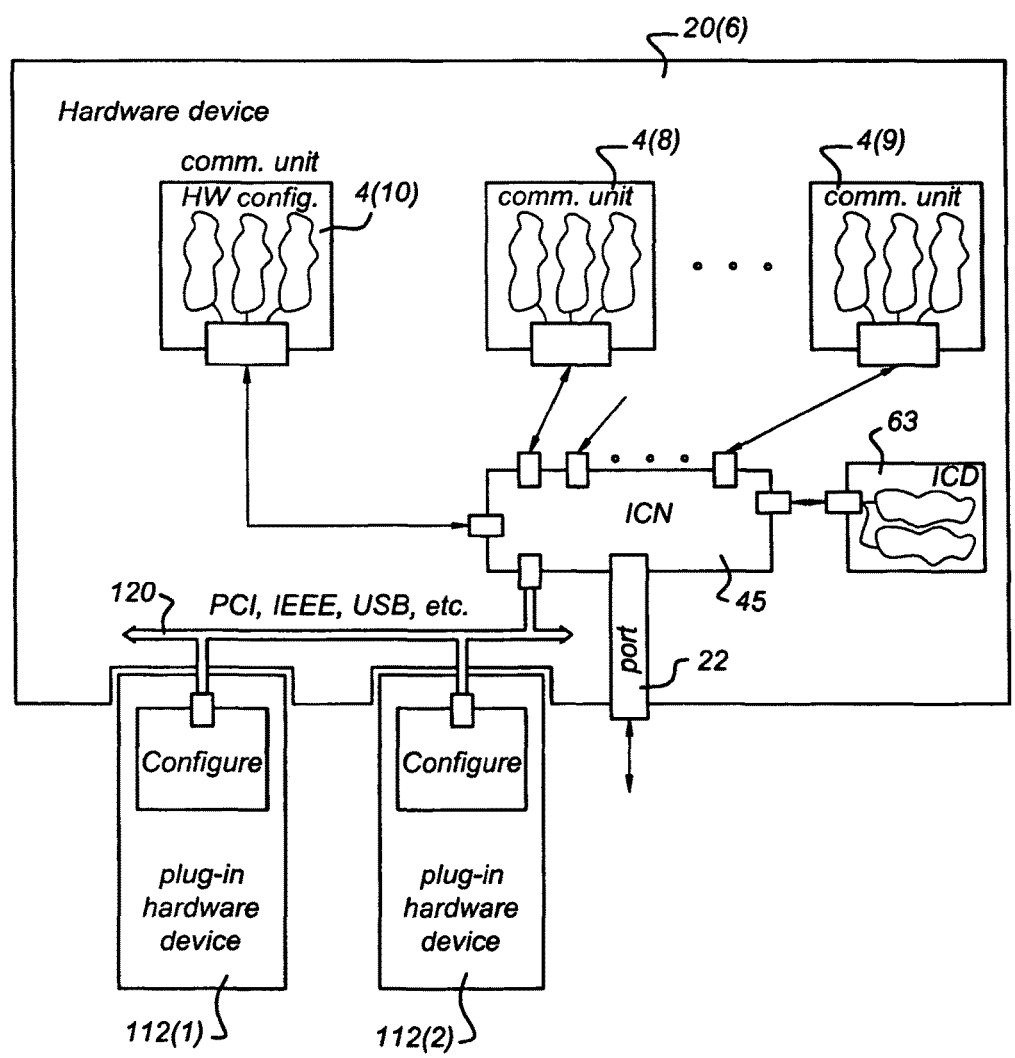
FIG. 7 is a block diagram of an exemplary hardware device comprising a plurality of hardware components and communication units in accordance with certain embodiments.

FIG. 7 shows a further embodiment of a hardware device 20(6). This hardware device 20(6) comprises a communication unit that operates as an interconnection node 45 that is controlled by a further communication unit that operates as an interconnection controlling device ICD 63, and is connected to a plurality of communication units 4(8), 4(9). Moreover, the interconnection node ICN 45 is connected to a communication unit 4(10) configured to support hardware configuration of one or more plug-in hardware devices 112(1), 112(2). This communication unit 4(10) is indicated in FIG. 7 with the label "HW CONFIG." The interconnection node ICN 45 is also connected to an internal bus 120. This bus 120 may be a PCI (peripheral component interconnect) bus, an IEEE USB (Universal Serial Bus), etc. As shown, the hardware device 20(6) is designed to allow insertion of one or more plug-in hardware devices 112(1), 112(2). After plug-in, these plug-in hardware devices 112(1), 112(2) connect to the internal bus 120 of the hardware device 20(6). Each of the plug-in hardware devices 112(1), 112(2) includes a communication unit designed to support the hardware device configuration after the plug-in hardware device has been connected to the bus 120. In operation, the hardware device configuration will start automatically by suitable communications with the communication unit designed to support the hardware configuration present within the hardware device, as known to persons skilled in the art. The interconnection node ICN 45 is also provided with a separate port 22 to support communication with other communication units and/or interconnection nodes external to the hardware device 20(6) itself.

Data Exchange Between Communication Units

In certain embodiments, communication between devices takes place as an exchange of communication primitives, which contain data sent from one device to another, accompanied by a header with data defining the receiving communication unit and other attributes, such as mechanisms to implement security. In certain embodiments, each communication session, i.e., a communication process with a predetermined start and end, between two or more communication units will comprise a plurality of communication primitives. The way at least part of the header data are constructed, how such header data may be used to direct a communication primitive from a sending communication unit to a receiving communication unit and how this data indicates in what way security may be provided is related to certain aspects of the invention.

Figure 8A:
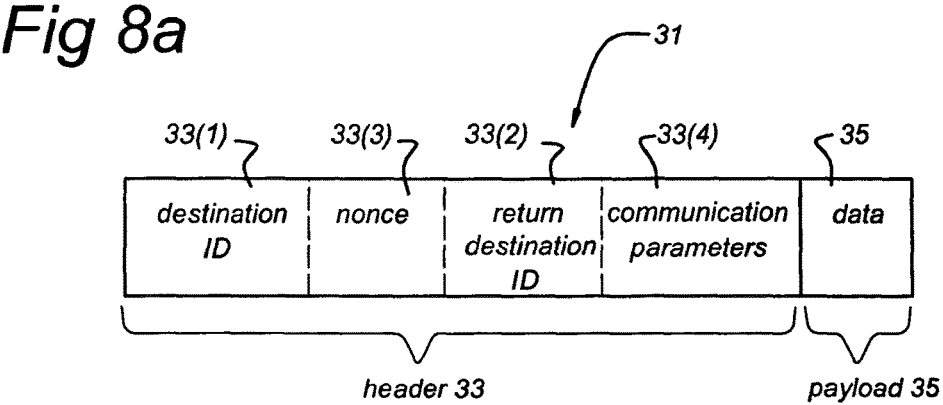
FIG. 8a is a block diagram of an exemplary communication primitive in accordance with certain disclosed embodiments.
Figure 8B:
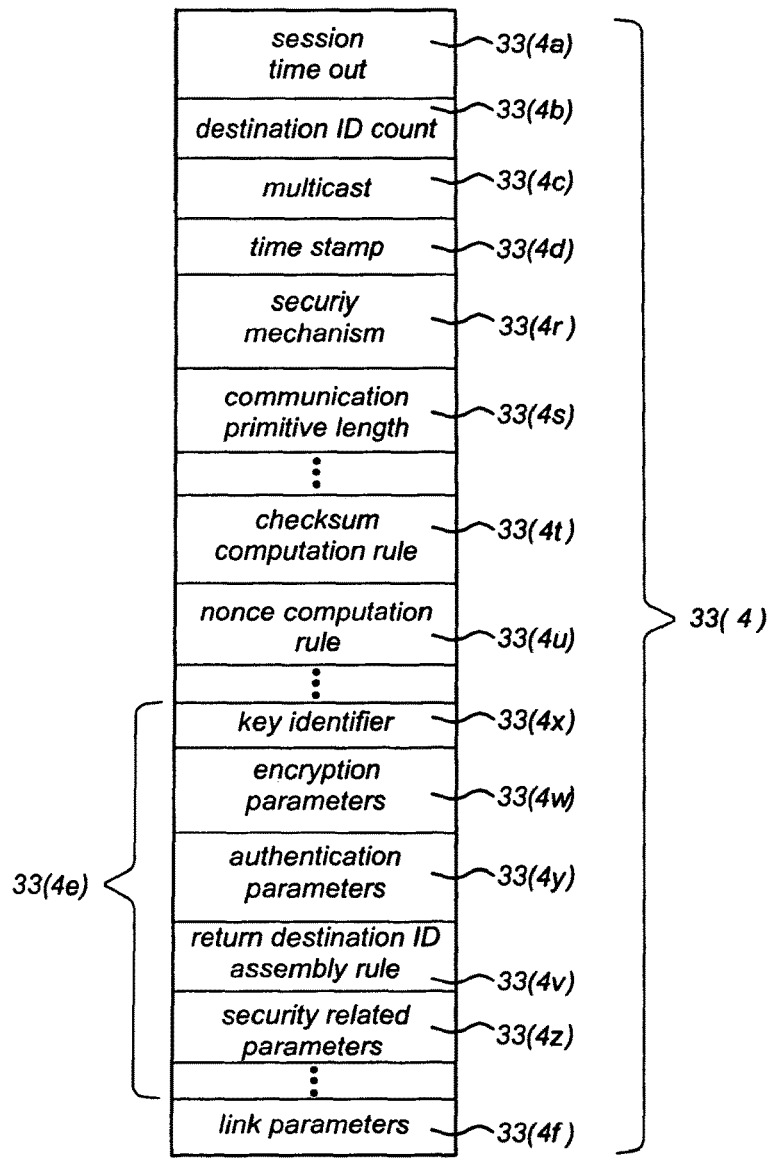
FIG. 8b shows a block diagram of an exemplary component of a header for a communication primitive in accordance with certain disclosed embodiments.
Figure 8C:
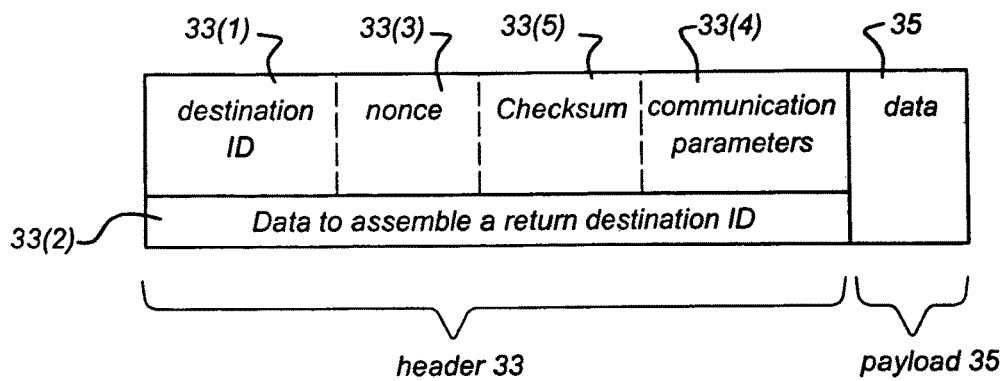
FIG. 8c is a block diagram of an exemplary communication primitive in accordance with certain disclosed embodiments.

FIGS. 8a, 8b and 8c show examples of the content of a communication primitive 31 in accordance with an example of the invention. As FIG. 8A shows, the communication primitive 31 comprises a header 33 and a payload 35. In an embodiment, the communication primitive header 33 contains at least three distinct data units: a destination ID 33(1), a return destination ID 33(2), and a "nonce" 33(3). The header 33 may also contain communication parameters 33(4). The communication parameters 33(4) may, among others, comprise data specifying a type of protection. They may also include data indicating a routing priority or data necessary to reserve resources in a network for a communication between two or more communication units. Embodiments of the present invention are not restricted in any way to any specific type of communication parameters 33(4) used.

The header 33 may be of a fixed size while the payload 35 may be of variable size. For instance, the destination ID 33(1) and return destination ID 33(2) may each be numbers of the same size, e.g. 32 bit. However, the invention is not limited in this respect. If variable, the size of the payload 35 is preferably included in the header 33 as one of the communication parameters 33(4).

FIG. 8b shows details of communication parameters 33(4) that may be included in embodiments of the present invention. One or more communication parameters 33(4) may be used in different embodiments. These parameters may be used to determine the rule for determining the return destination ID 33(2) or the nonce 33(3) and may include an indication of a session time out 33(4a), a number of times a destination ID 33(1) may be repeated 33(4b), an indication if the communication primitive concerned is part of a multicast 33(4c), an indication of a timestamp 33(4d), a number of session parameters 33(4e), link parameters 33(4f), an indication of a security mechanism 33(4r) applied to the communication primitive, an indication of the length of the communication primitive 33(4s), an indication of the computation of a communication primitive checksum 33(4t), and an indication of nonce computation rules 33(4u) that apply to the computation of the nonce 33(3).

The session parameters 33(4e) may comprise the following parameters: an indication of return destination ID assembly rules 33(4v) that apply to the computation of the return destination ID 33(2), encryption parameters 33(4w), a key identifier 33(4x) used in computing a communication primitive data authentication cryptogram, a hashing algorithm indicator 33(4y) used to identify a hashing algorithm applied for data authentication, as well as possible other security related parameters 33(4z). In an embodiment two or more sets of security parameters 33(4z) may be present. In another embodiment, the timestamp indication 33(4d) may comprise two or more distinct time stamps. The ellipsis in FIG. 8b indicates that other communication parameters may be used within the scope of the present invention.

FIG. 8C shows an example of a further embodiment in which the communication primitive header 33 contains at least three distinct data units: a destination ID 33(1), a checksum 33(5), a nonce 33(3). The communication parameters 33(4) that may be contained in the header 33 may indicate the manner in which a return destination ID 33(2) pertaining to a particular communication primitive 31 is assembled from any of the data parts 33(1), 33(3), 33(4), 33(5) alone or in any combination. It is noted that FIG. 8C shows the return destination ID 33(2) as symbolically present in the header as a whole, without it being present in a particular data part 33(1), 33(3), 33(4), 33(5) found in the header 33.

Figure 9A:
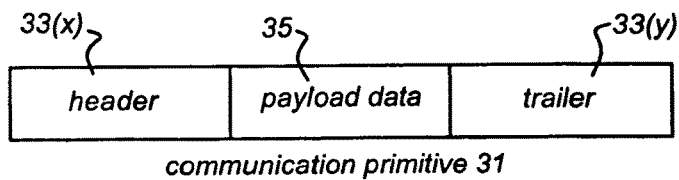
FIGS. 9a and 9b are block diagrams of exemplary combinations of a communication primitive in accordance with certain disclosed embodiments.
Figure 9B:
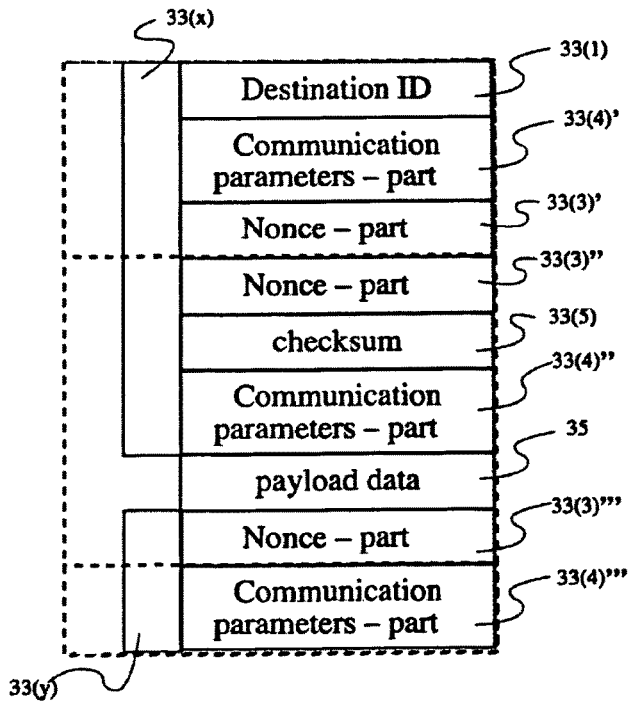

FIGS. 9a and 9b show possible arrangements for the data parts 33, 35 in a communication primitive 31 in the order they may be transmitted in accordance with embodiments. Ordering arrangements for data parts of the communication primitive may facilitate the use of stream encryption in allowing it to be applied selectively for parts of the header 33 and payload 35, by placing unencrypted data at the very start or end of the transmitted data stream. Such data at the end or start may then be consulted while the communication primitive is in transit, without requiring decryption. A dotted line in FIG. 9b indicates symbolically which parts of communication primitive 31 may be encrypted. FIG. 9b shows that the boundary of encryption may not align with the boundary between data parts in the header (or trailer). As an example, a first nonce part 33(3)' and a second nonce part 33(3)" are single contiguous data parts of header 33 yet split when applying encryption.

FIG. 9a shows an embodiment in which the communication primitive 31 comprises a header field 33(x), a payload comprising data 35 and a trailer field 33(y). Trailer field 33(y) may comprise some of the header data parts 33(4a . . . 4d, 4r . . . 4z) shown in FIG. 8b. Moreover, the data parts 33(4a . . . 4d, 4r . . . 4z) in the header may not be contiguous in either header field 33(x) or trailer field 33(y) and parts of the data parts 33(4a . . . 4d, 4r . . . 4z) may be present in the communication primitive in any suitable order. For the embodiment shown in FIG. 9b, data parts 33(4a . . . 4d, 4r . . . 4z), at least in part, are transmitted at the end. Different portions are indicated with 33(4)', 33(4)", 33(4)''', Also the nonce may be split in parts 33(3)', 33(3)" and 33(3)''', The same holds for the destination ID 33(1) and return destination ID 33(2). Splitting header data in several parts may facilitate the implementation on computing architectures with moderate width of their processing data path for instance 16 or 32 bits. Then, parts of the data parts of the header 33 may be read from a received communication primitive 31 in an order that they are required for processing before and after encryption or decryption.

As illustrated in the FIGS. 9a and 9b, in a further embodiment, the destination ID 33(1) is, at least in part, the first data transmitted in the communication primitive. In yet a further embodiment, the at least first part of the destination ID is followed in the transmission by at least a part of the communication parameters 33(4). In yet another further embodiment the return destination ID 33(2), at least in part, is transmitted immediately after transmission of the destination ID 33(1). In yet another further embodiment, the return destination ID 33(2), at least in part, is transmitted after transmission of a first part of the destination ID 33(1) and a first part of the communication parameters 33(4). In another embodiment at least a part of the communication parameters 33(4) is transmitted following the payload 35. In yet another embodiment, at least a part of the nonce 33(3) is transmitted following the payload 35. In yet a further embodiment, the initially transmitted parts of the destination ID 33(1), communication parameters 33(4)', return destination ID 33(2) and nonce 33(3)' are of equal size, e.g. 32 bit. The different parts are indicated with accent marks in FIG. 9b, where appropriate.

In accordance with an embodiment, after a communication session has been initialized, at least one of destination ID 33(1) used to identify a communication unit to receive the communication primitive 31 and return destination ID 33(2) used to identify another communication unit to receive at least one reply to the communication primitive, has a value that is changed during the session. In a further embodiment, the change in value of the destination ID 33(1) or of the return destination ID 33(2) is in accordance with a predetermined rule or with a rule agreed upon at the initialization of the session.

Hence, in a communication session in accordance with an embodiment of the invention, the destination ID 33(1) or return destination ID 33(2) may differ for each next communication primitive during a communication session between communication units. The predetermined or agreed rule may indicate when and in what way the value for the destination ID 33(1) or return destination ID 33(2) will be changed. In a further embodiment, the time and manner of changing the value of destination ID 33(1) or return destination ID 33(2) may be indicated in the communication parameters 33(4) in the header 33 of the communication primitive 31. In a further embodiment, the communication parameters 33(4) in the header 33 of the communication primitive 31 may contain a counter indicating the number of times a particular value for destination ID 33(1) will be used in a sequence of communication primitives 31 received at the same communication unit.

In another embodiment, the return destination 1D 33(1) pertaining to a communication primitive 31 is assembled from data contained in the header 33 according to a predetermined rule or with a rule agreed upon at the initialization of the session. In a further embodiment, the rule for assembling the return destination ID 33(2) may be indicated in the communication parameters 33(4) in the header 33 of the communication primitive 31. In a further embodiment, the predetermined rules for assembling a return destination ID 33(2) comprise a computation that involves data shared between the sender and receiver, e.g. exchanged in previous communication primitives. In yet a further embodiment, the computation comprises a cryptographic process and the shared data comprises a secret cryptographic key. Such shared data may have been established for instance at least in part at the start of a communication session.

As known in the art, the destination ID 33(1) of a communication primitive serves to identify the communication unit that will receive this communication primitive. It may be used to guide the communication primitive along its route through a communication network, as is known to persons skilled in the art. In addition, while the receiving communication unit may be engaged in several simultaneous communication sessions, the destination ID 33(1) may also serve to identify a particular communication session or process involved in the data communication.

Figure 10A:
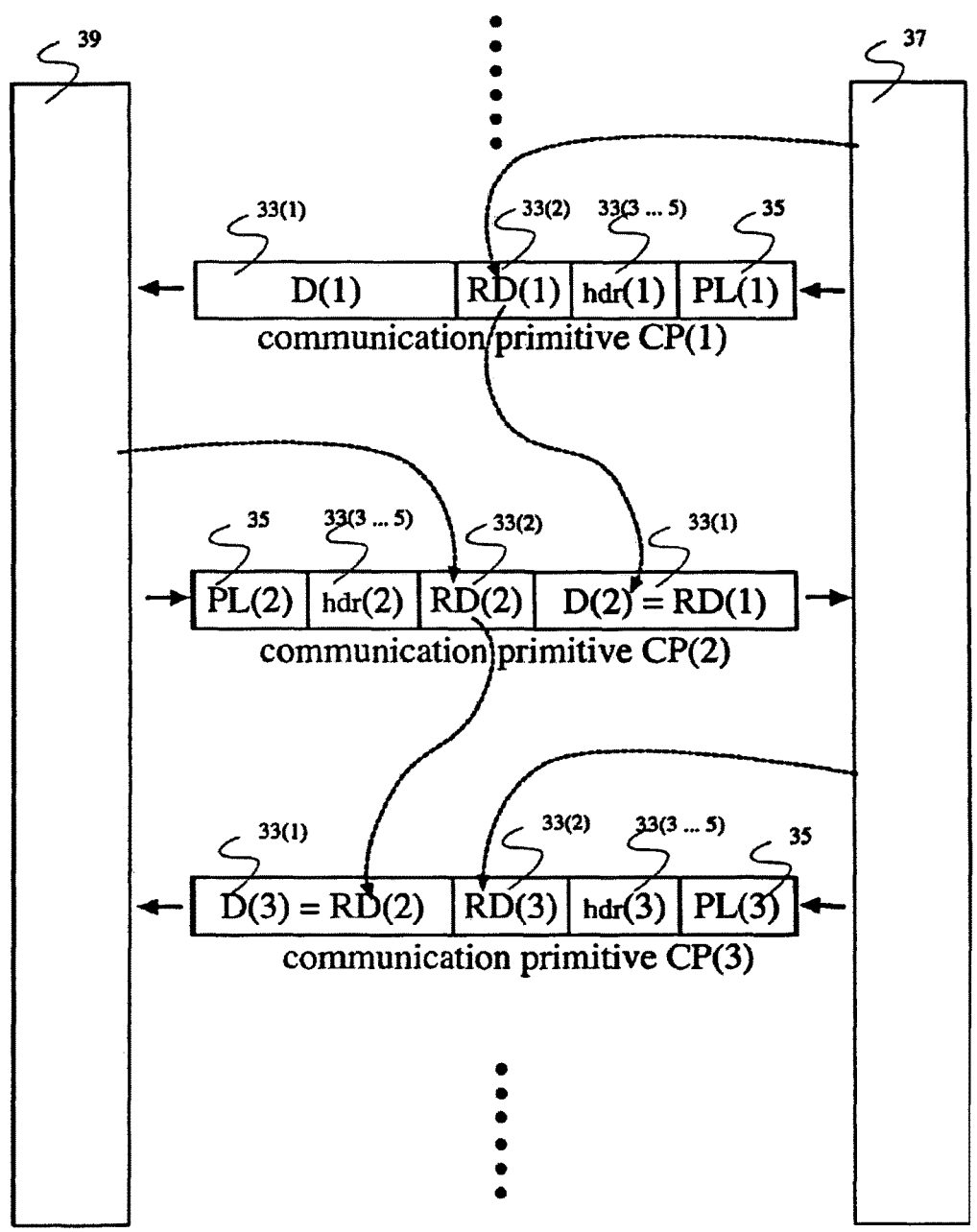
FIGS. 10a and 10b are an interaction block diagram of two exemplary communication units communicating with changing return destination and destination ID's during a communication session in accordance with certain disclosed embodiments.
Figure 10B:
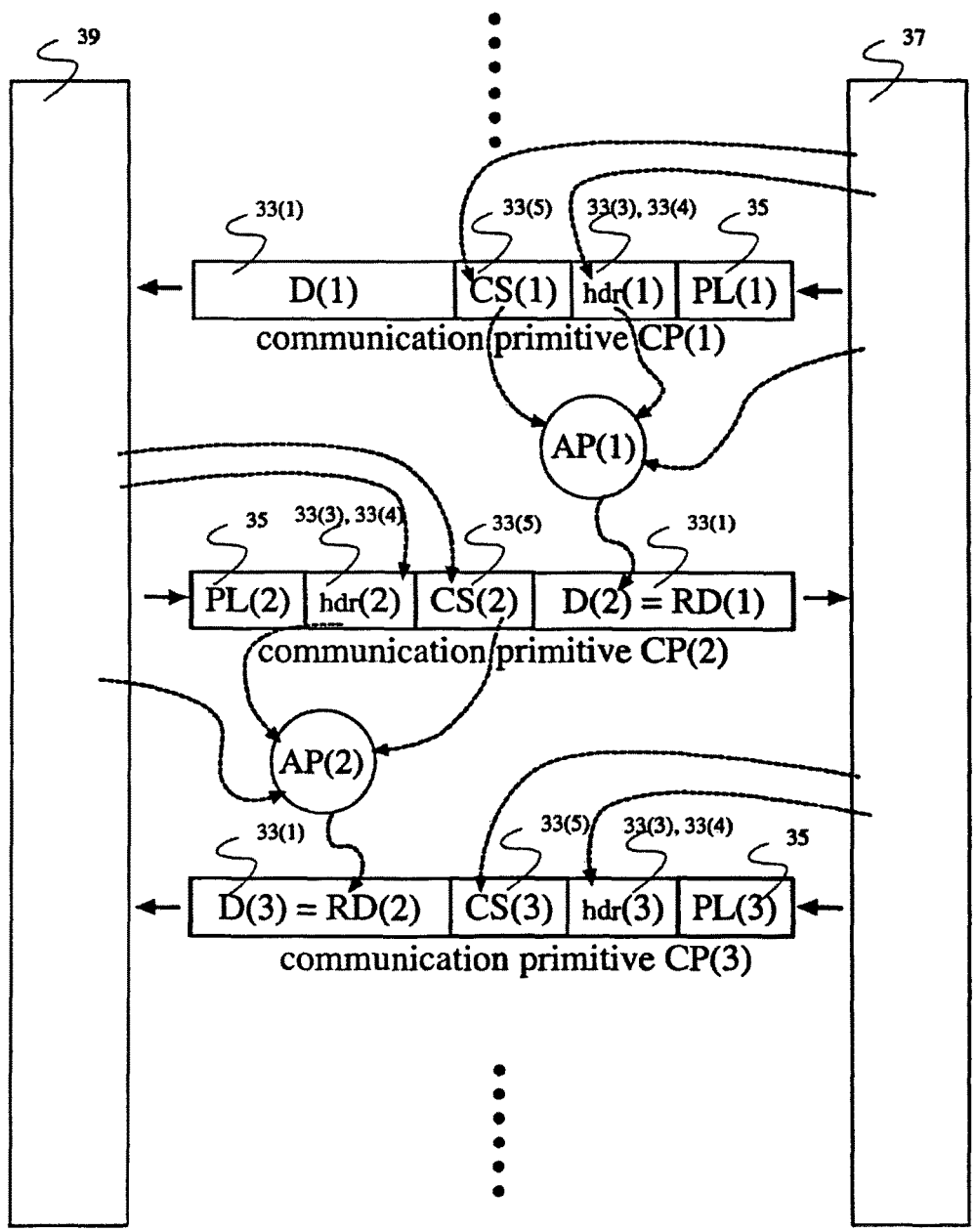
Figure 11A:
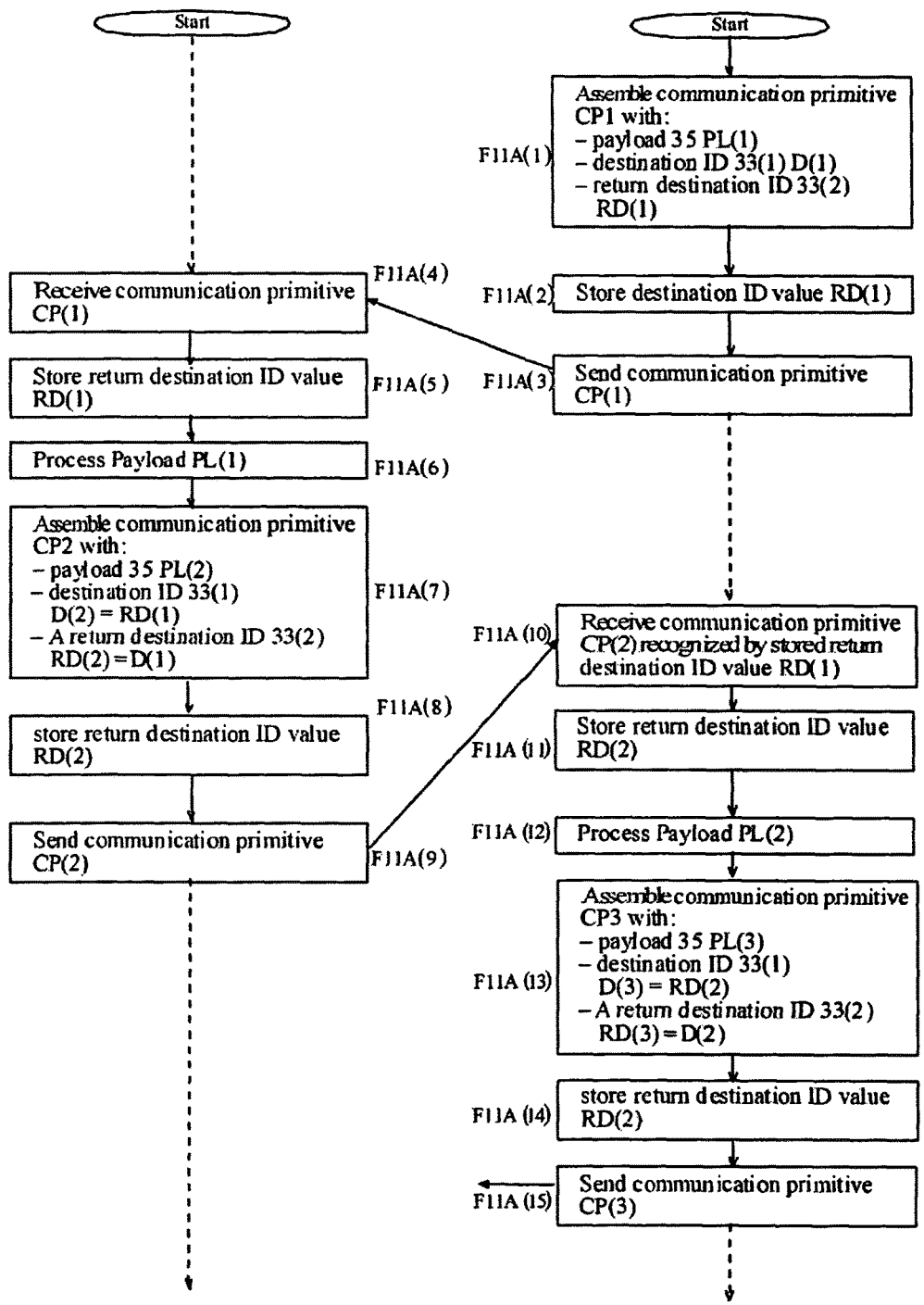
FIG. 11a is a flow chart of an exemplary communication session conducted between two communication units using changing return destination and destination ID's during a communication session in accordance with certain disclosed embodiments.
Figure 11B:
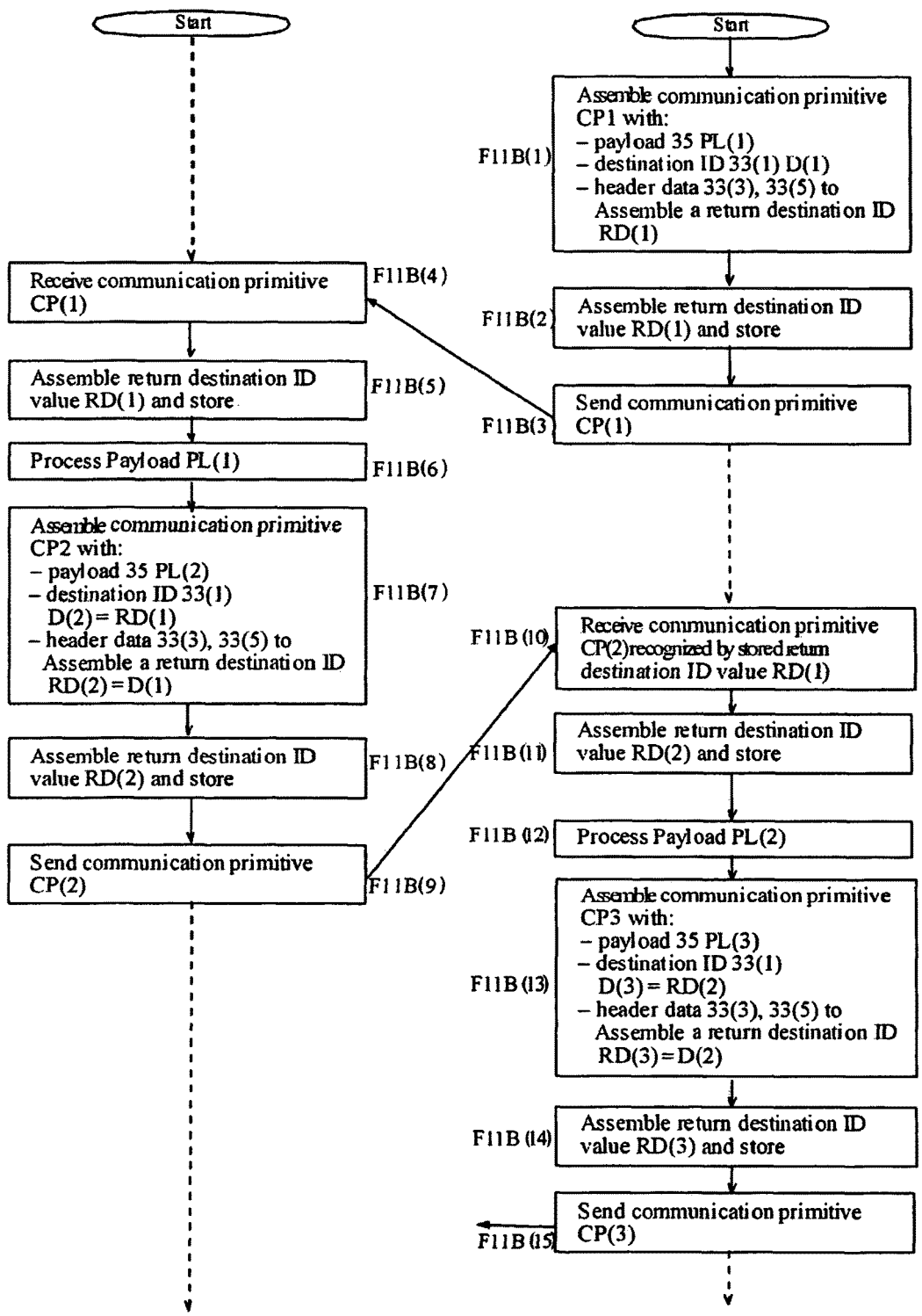
FIG. 11b is a flow chart of an exemplary communication session conducted between two communication units using data in a header to assemble changing return destination and destination ID's in accordance with certain disclosed embodiments.

Assembling the return destination ID 33(2) in a communication primitive are explained in detail with reference to FIGS. 10A, 10B, 11A and 11B. In these figures, a communication unit 37 is engaged in a communication session with a communication unit 39. At a certain stage in the communication session, the communication unit 37 sends a request to communication unit 39. The communication unit 37 acts thus as "client", whereas the communication unit 39 acts as "server". Earlier communication primitives exchanged between the communication units 37, 39 are indicated with leading ellipses in FIGS. 10A and 10B and dashed lines in FIGS. 11A and 11B. The earlier communication primitives may include ones according to a predetermined initiation protocol to establish a first random destination ID. After the exchange of communication primitives described by FIGS. 10A, 10B, 11A and 11B further communication primitives may be exchanged as is indicated with the trailing ellipsis in FIGS. 10A and 10B and dashed lines in FIGS. 11A and 11B. FIG. 11B resembles FIG. 11A similarly as FIG. 10A resembles FIG. 10B. FIGS. 10A and 11A illustrate the use of a communication primitive 31 with a structure shown in FIG. 8A whereas FIGS. 10B and 11B relate to FIG. 8C.

As is known to those skilled in the art, communication unit 39 receives a first request indicated by a communication primitive and sends a reply in accordance with a predetermined server program. Subsequently, communication unit 37 receives the reply and performs any task as initiated by the reply received in accordance with a predetermined client program. (These actions have not been shown in FIGS. 11A and 11B).

FIGS. 10A and 11A show an example of an embodiment in which the destination ID 33(1) is directly derived from the value of return destination ID 33(2) in the header 33 of a previously received communication primitive. FIGS. 10B and 11B show an example of an embodiment in which the destination ID 33(1) is assembled from data in the header 33 and payload 35 of a previously received communication primitive, which may include the value of the return destination ID 33(2) and other data 33(3), 33(4). As the examples in these figures show, both values for the return destination ID 33(2) and destination ID 33(1) are changed for each consecutive communication primitive in a communication session: the values of destination ID 33(1) and return destination ID 33(2) differ for each communication primitive in a communication session. However, the invention is not restricted to these examples, any other scheme of assembling the destination ID 33(1) and/or the return destination ID 33(2) in accordance with a predetermined rule, e.g., based on information obtained from a previously received communication primitive is possible, as indicated above.

FIGS. 10A and 10B show communication unit 37 sending a communication primitive CP(1) to communication unit 39. Communication unit 39 then is shown sending a response as a second communication primitive CP(2). Upon receiving communication primitive CP(2); communication unit 37 then proceeds with sending a third communication primitive CP(3). The dashed lines in FIGS. 10A, 10B show that the communication unit 37, 39 determines the data in the header of the communication primitive. FIG. 10A shows the sending communication unit determining a new value for the return destination ID 33(2) RD(i) (i=1, 2, 3, . . . ) and determining the destination ID(1) D(i+1) as the value of the return destination ID RD(i) in the previously received communication primitive CP(i). FIG. 10B shows the sending communication unit determining the value for data in the header of communication primitive CP(i+I), like checksum 33(5) CS(i+I) or nonce 33(3) hdr(i+I) and determining the destination 1D D(i+I) as the value of the return destination 1D RD(i) assembled from data, e.g. CS(i) and hdr(i), in the header of the previously received communication primitive CP(i−1) by a return destination assembly process AP(i). By means of dashed arrows, FIG. 10B also shows how the return destination assembly process AP(i) may involve use of data available to the communication unit 37, 39. In FIGS. 10A, 10B reference sign PL(i) refers to payload 35 of communication primitive CP(i).

Operationally, the schematic diagram in FIG. 10A will be illustrated with the flow chart in FIG. 11A. Communication unit 37 assembles a communication primitive CP(1) (cf. FIG. 10A, 10B) to be sent to communication unit 39, stage F1 1A(1). The communication primitive CP(1) comprises payload 35 PL(1), destination ID 33(1) D(1) identifying the communication unit 39 as receiver of the current communication primitive, and a return destination ID 33(2) RD(1) identifying the communication unit 37 as receiver of a possible future communication primitive send as response. The return destination ID RD(1) is determined by communication unit 37 specifically for communication primitive 31 CP(I), e.g. in accordance with a predetermined rule. The value of the return destination ID RD(I) is stored, stage F11A(2), by communication unit 37 to allow it to be used in recognizing later messages received as to having communication unit 37 as intended receiver (return address). In stage F11A(3), the communication unit 37 sends the communication primitive CP(I) to the communication unit 39.

After having received the communication primitive CP(1), stage F11A(4), storing the return destination ID 33(2) for later use, stage F11A(5), the communication unit 39 may perform any predetermined task as may be instructed by the received communication primitive 31 CP(1), stage F11A(6).

Then, in stage F11A(7), the server 39 assembles a communication primitive 31 CP(2). The communication primitive 31 CP(2) comprises a payload 35 PL(2), a destination ID 33(1) D(2) identifying the communication unit 37 as receiver. This destination ID 33(1) D(2) is set to be equal to the value of return destination ID RD(1) stored in stage F11A(5) (D(2)=RD(1)). Moreover, the second communication primitive CP(2) will comprise a return destination ID 33(2) RD(2), identifying the communication unit 39 as return address, specifically determined by communication unit 39 for communication primitive CP(2), e.g. in accordance with a predetermined rule. Here, the value of the return destination ID RD(2) in general differs from the value of the destination ID D(1) in communication primitive CP(1) (RD2≠D(1)). In stage F11A(8), the value of the return destination ID RD(2) is stored by the communication unit 39 to allow later messages received to be recognized by the communication unit 39 to have the communication unit 39 as intended receiver. In stage F11A(9), the communication primitive 31 CP(2) thus assembled is sent back to the communication unit 37.

The communication unit 37 receives the communication primitive 31 CP(2), stage F11A(10), stores the return destination ID 33(2) for later use, stage F11A(11), and performs any task as initiated by payload PL(2) of communication primitive CP(2) in accordance with the predetermined client program, stage F11A(12). If required, in stage F11A(13), the communication unit 37 assembles a communication primitive 31 CP(3) to be sent to the communication unit 39. The communication primitive 31 CP(3) is assembled by communication unit 37 to comprise a destination ID 33(1) D(3) that is set by the communication unit 37 to be equal to the value of the return destination ID RD(2) stored in stage F11A-11 (D(3)=RD(2)). Moreover; the communication unit 37 establishes a new return destination ID 33(2) RD(3) identifying the communication unit 37 as the intended recipient of any reply. The value of the return destination ID RD(3) is stored by the communication unit 37, stage F11A (14), in order to allow later recognition of messages sent back to the communication unit 37 by the communication unit 39. Then, the communication unit 37 transmits the communication primitive C(3) to the communication unit 39, stage F11A(15).

Operationally, the schematic diagram in FIG. 1013 is illustrated with the flow chart in FIG. 11B. Communication unit 37 assembles a communication primitive CP(1) to be sent to communication unit 39, stage FLAB(I). The communication primitive CP(1) comprises payload 35 PL(1), destination ID 33(1) D(1) identifying the communication unit 39 as receiver of the current communication primitive, and data in the header 33 to assemble a return destination ID 33(2) RD(1) identifying the communication unit 37 as receiver of a possible future communication primitive send as response. The header data 33(3), 33(5) is determined by communication unit 37 specifically for communication primitive 31 CP(1), e.g. in accordance with a predetermined rule. The value of the return destination ID RD(1) is assembled form the determined header data and stored, stage FLAB(2), by communication unit 37 to allow it to be used in recognizing later messages received as to having communication unit 37 as intended receiver. In stage FLAB(3), the communication unit 37 sends the communication primitive CP(1) to the communication unit 39.

After having received the communication primitive CP(1), stage FLAB(4), the communication unit 39 assembles the value of the return destination ID 33(2) and stores it for later use, stage FLAB(5). (FIG. 10B shows an assembly process AP(1) for this purpose) Then, the communication unit 39 may perform any predetermined task as may be instructed by the payload PL(1) of received communication primitive CP(1), stage FLAB(6).

Then, in stage FLAB(7), the server 39 assembles a communication primitive 31 CP(2). The communication primitive 31 CP(2) comprises a payload 35 PL(2), a destination ID 33(1) D(2) identifying the communication unit 37 as receiver. This destination ID 33(1) D(2) is set to be equal to the value of the return destination H) RD(1) assembled and stored in stage FLAB-6 (D(2)=RD(1)). Moreover, the second communication primitive will comprise data in the header 33 to assemble a return destination ID 33(2) RD(2), identifying the communication unit 39 as return address, specifically determined by communication unit 39 for communication primitive CP(2), e.g. in accordance with a predetermined rule. Here, the data in the header to assemble the return destination ID RD(2) in general differs from the data in the header of communication primitive 31 CP(1) (RD2≠D(1)). In stage FLAB(8), the value of the return destination ID RD(2) is assembled form the determined header data and stored by communication unit 39 to allow it to be used in recognizing later messages received as to having communication unit 39 as intended receiver. In stage F1 1B(9), the communication primitive 31 CP(2) thus assembled is sent back to the communication unit 37.

The communication unit 37 receives the communication primitive 31 CP(2), stage FLAB(10), assembles the value of the return destination ID 33(3) and stores it for later use, stage FLAB(11) (FIG. 10B shows an assembly process AP(2) for this purpose). Then, it performs any task as initiated by payload PL(2) of communication primitive CP(2) in accordance with the predetermined client program, stage FLAB(12). If required, in stage FLAB(13), the communication unit 37 assembles a communication primitive 31 CP(3) to be sent to the communication unit 39. The communication primitive 31 CP(3) is assembled by communication unit 37 to comprise a destination ID 33(1) D(3) that is set by the communication unit 37 to be equal to the value of the return destination ID RD(2) assembled and stored in stage FLAB(11) (D(3)=RD(2)). Moreover, the communication unit 37 establishes data in the header to assemble a new return destination ID 33(2) RD(3) identifying the communication unit 37 as the intended recipient of any reply. The value of the return destination ID RD(3) is assembled and stored by the communication unit 37, stage FLAB(14), in order to allow later recognition of messages sent back to the communication unit 37 by the communication unit 39. Then, the communication unit 37 transmits the communication primitive C(3) to the communication unit 39, stage F11B (15).

FIG. 11B resembles FIG. 11A, the differences being in how the header data is prepared. FIG. 11B involves a generic assembly process for the value of a return destination ID 33(2) based on data in the header 33 of a communication primitive 31 whereas FIG. 11A describes extracting the value of the destination return II) 33(2) directly from the header data 33.

The processes shown in FIGS. 10A, 11A and 10B, 11B, respectively, are continued until the communication session between the communication unit 37 and the communication unit 39 is completed, after which no further communication primitives are exchanged. Alternatively, as known to those skilled in the art, the communication session may be considered completed if, for a predetermined period of time, no further communication primitives have been exchanged. FIGS. 10A, 10B, 11A and 11B show examples of how assembling a plurality of different return destination IDs from possibly multiple data previously received in the communication can be used in a communication session between a client 37 and a server 39.

Further details as to how embodiments of the present invention may assemble and store these destination ID's is described below.

To follow the examples in FIGS. 10A, 10B, 11A and 11C, after the return destination II) 33(2) (or, alternatively, a checksum 33(5) and a nonce 33(3)) has been generated for a particular communication primitive, and the communication primitive has been sent by communication unit 39 and received by communication unit 37, the data comprised in the communication primitive is used by communication unit 37 to assemble a return destination ID that is stored in the memory of the communication unit 37 as identification of the expected response or subsequent request, respectively. In this manner, the sequence of assembled return destination ID's 33(2) serve as identification of a specific stream of communication primitives of a communication session to which a communication primitive pertains, distinguishing it from other communication primitives associated with possible other communication sessions that the communication unit partakes in. The stored return destination ID 33(2) may therefore be used by the communication unit in a filter of the stream of communication primitives that it may receive, e.g. when connected to a shared data transportation media. After a communication primitive has been received by a communication unit that used a stored return destination ID 33(2) to identify the received communication primitive as addressed to it, the stored return destination ID 33(2) may be discarded. In such a case, a next communication primitive received from the other communication unit will have a new return destination ID 33(2). Then, in effect, communication units in the communication use the different and evolving return destination ID's 33(2) stored in their memories as the identifiers of the data exchange between them.

Initialization.

The communication between communication units is initialized in general by communication with one or more communication units that have been configured specifically for initialization, which respond to communication primitives using specific pre-arranged destination ID's. The prearranged destination IDs may be restricted to communication units belonging to a sub-net. In general, the pre-arranged destination ID is stored in association with a process, or functional component, in the communication unit that can be called upon to initialize a communication session for other processes in the communication unit.

In one embodiment, a pre-arranged destination ID associated with initialization is generated as a random number and distributed amongst a sub set of communication units.

In a further embodiment, the pre-arranged destination ID is distributed out of band. For instance, such a destination ID may be distributed on paper and entered into the memory of a communication unit using a keyboard, alternatively the pre-arranged destination ID may be stored in a portable non-volatile memory, such as a smart card 1 and entered into the memory of a communication unit by inserting the smart card. In yet a further embodiment, the pre-arranged destination ID is valid for a specific period time.

In an other further embodiment, after a specific period of use, the randomly generated pre-arranged destination ID is replaced by a new random value that is distributed in band. The specific period of time for termination or refreshing of a pre-arranged destination ID, as known to those skilled in the art, is understood to be relatively long with respect to the typical use of the communication medium by the communication units that share this pre-arranged destination ID for initialization.\

While the use of pre-arranged destination IDs is known in the art the present invention allows these numbers to be of an arbitrary value, can be different for different sets of communication units and can be shared by an arbitrary subset of communicating devices irrespective of location and or connectivity, whereas such known pre-arranged destination IN are either restricted topographically, or are universally defined for use by every device, e.g. as specified by IANA. Providing security when using such a fixed universal list of pre-arranged addresses is problematic. As a contrast the invented prearranged destination IDs tying into the concept can be used inherently secure. Also in contrast to the art, in a further embodiment of this invention, communication units can partake in more than one community of communication units when they avail of a prearranged destination ID for initialization for each of these communities.

The method of initialization in accordance with the present can, thus, be summarized as follows: a method of initialization of a communication in a communication system which comprises a first plurality of communication units being permanently or intermittently connected for communication, a second plurality of communication units being a sub-set of the first plurality of communication units and a third plurality of communication units being a sub-set of the second plurality of communication units, wherein the method comprises: distributing a first random number to each communication unit in the second plurality of communication units for use in requesting an initialization of further communications; providing functions for initialization of communication by each communication unit in the third plurality of communication units, the first random number being assigned to each communication unit in the third plurality of communication units as a destination ID for requesting initialization of communication. In certain embodiments, the method may include using the random number for requesting initialization of further communications for a limited period of time. The method may also comprise performing the distributing of the random number out of band.

The method may also comprise distributing a second random number after a limited period of time to each communication unit in the second plurality of communication units for subsequent use in requesting an initialization of further communications, the second random number being assigned to each communication unit in the third plurality of communication units as a destination ID to request initialization of communication. The first random number may expire for use after a specific period of time after the distributing of the second random number.

The method may comprise distributing a third random number to each communication unit in the second plurality of communication units, the third random number being assigned to a functional unit in each communication unit in the second plurality of communication units configured to respond to receiving the third random number.

The system may additionally comprises a fourth plurality of communication units being a sub-set of the first plurality of communication units and not a proper sub-set of the second plurality of communication units, and a fifth plurality of communication units. If so, the method further then comprises: distributing a second random number to each communication unit in the fourth plurality of communication units for use in requesting an initialization of further communications, providing functions for initialization of communication by each communication unit in the fifth plurality of communication units, the second random number being assigned to each communication unit in the fifth plurality of communication units as a destination ID to request initialization of communication.

Indication of a State

Because, for each communication primitive, a new destination ID may be established using previously received data, embodiments of the present invention may identify a state of a communication session when receiving a next communication primitive by analyzing the destination ID it responds to. By determining a new value for the destination ID 33(1), it can only be associated with a reply to a particular communication primitive sent earlier by the communication unit itself in which the communication unit determined a new value for the return destination ID 33(2). The communication session is associated with a programmed process running on the communication unit. Therefore, in one embodiment, the destination ID of a received communication primitive is also used as an indication of the state, at the least in part, of that process running on the communication unit.

Returning to FIGS. 10A, 10B, 11A and 11B, it is noted that in some cases, the reply by the communication unit 39, 37 to a communication primitive 31 CP(1), CP(2) rather than a single communication primitive may include a plurality of communication primitives. In such instances, each one of the plurality of communication primitives sent by the communication unit 39, 37 to the communication unit 37, 39 may include a return destination ID stored in the memory for that purpose, which is derived from data received previously. For example, the value of the return destination ID RD(1) can be used as destination ID D(2) in a series of communication primitives 31 starting with CP(2).

In the embodiment shown in the examples above in FIGS. 10A, 10B, 11A and 11B, the return destination ID 33(2) is determined again for every new communication primitive by the communication units 37, 39 when acting as sender, using previously received data. However, it may be noted that the rule applied in determining the destination ID may be different for communication unit 37 then for communication unit 39 for instance communication unit 37 determines a new return destination ID 33(2) it uses to receive communication primitives from communication unit 39 whereas communication unit 39 uses a fixed return destination ID to receive communication primitives from communication unit 37.

In a scheme where a sending communication unit does not determine the values for the data in the header 33 that will assemble into a unique value for a return destination ID 33(2) in each communication primitive, the corresponding sender ID 33(1) in a received communication cannot be used as an indication of the state of a server or client process in the communication unit. Therefore, in a further embodiment, the sending communication unit may store the unique destination ID of a communication primitive as indicator of the sending process state and the receiving communication unit upon assembling a response may include the previously received destination ID in the header 33 as nonce 33(3). It is noted that the sending communication unit needs the collaboration of the receiving communication unit in applying the particular header data determining rule described in this paragraph; such collaboration, on the other hand, is not required when using the return destination ID to indicate process status.

Exemplary Communication Unit.

Figure 12:
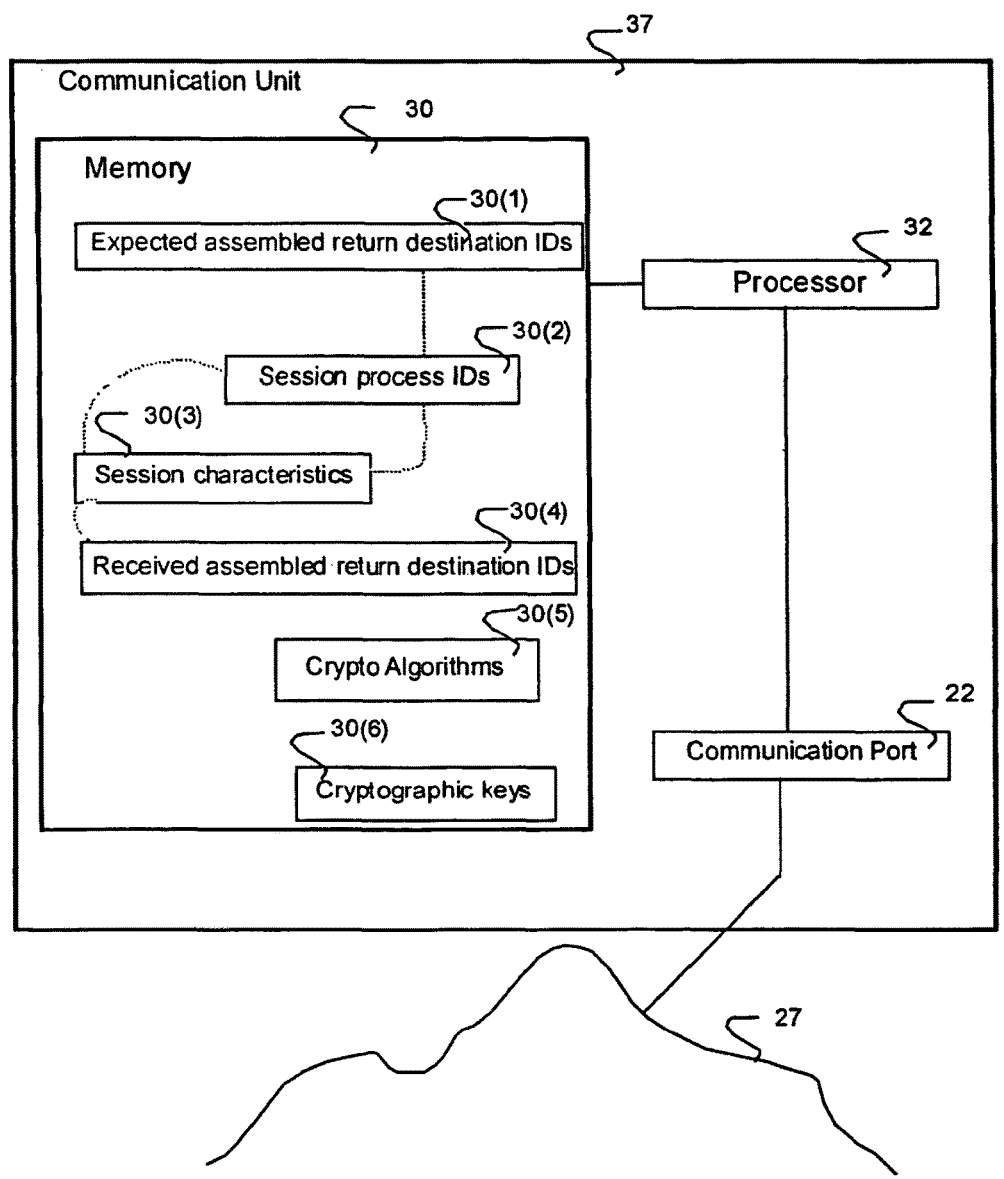
FIG. 12 is a block diagram of exemplary data structures and physical components related to a communication port in a communication unit according to certain disclosed embodiments.

FIG. 12 shows an exemplary communication unit 37 in accordance with embodiments of the present invention. In one embodiment, communication unit 37 may include a central processing unit 32 that may be used to execute general programs and programs engaged in communication. Communication unit 37 may also include a communication port 22 for exchanging communication primitives with other communication units possibly via communication network 27. The communication unit 37 further comprises memory 30. FIG. 12 relates to FIG. 1 and shows in more detail data structures that may be present in the memory means 5, 7, 9 and 11 in FIG. 1. Communication port 22 functionally comprises I/O device 25 (or 25', 25") as will be explained below in the section "communication port."

Memory 30 comprises various data structures 30(1, . . . , 6) comprising data typically used in exchanging communication primitives in accordance with embodiments. Data structure 30(1) is a table of return destination IDs that may be used by other communication units as destination IDs when sending a response to the communication unit 37. Data structure 30(2) is a table of communication session processes comprising process IDs used to identify processes the communication unit is involved in, and possible other process related data. Data structure 30(3) is a table of data that specifies characteristics of the communication session such as a cryptographic mechanism used and which relate to the communication parameters 33(4) in communication primitives sent and received in a communication session. Data structure 30(4) is a table of destination IDs assembled by a sending communication unit from data received in earlier communication primitives that can be used in a reply to the communication unit that sent the earlier communication primitive. As indicated by the dashed connecting lines the data structures 30(1, 2, 3, 4) are functionally related. The memory 30 may also comprise one or more cryptographic algorithms 30(5) that are executed by the processor 32 in the process of sending and receiving communication primitives. Cryptographic keys 30(6) that may be used in conjunction to the cryptographic algorithms 30(5) may also be present in the memory 30.

Assembling a Return Destination ID

Figure 13A:
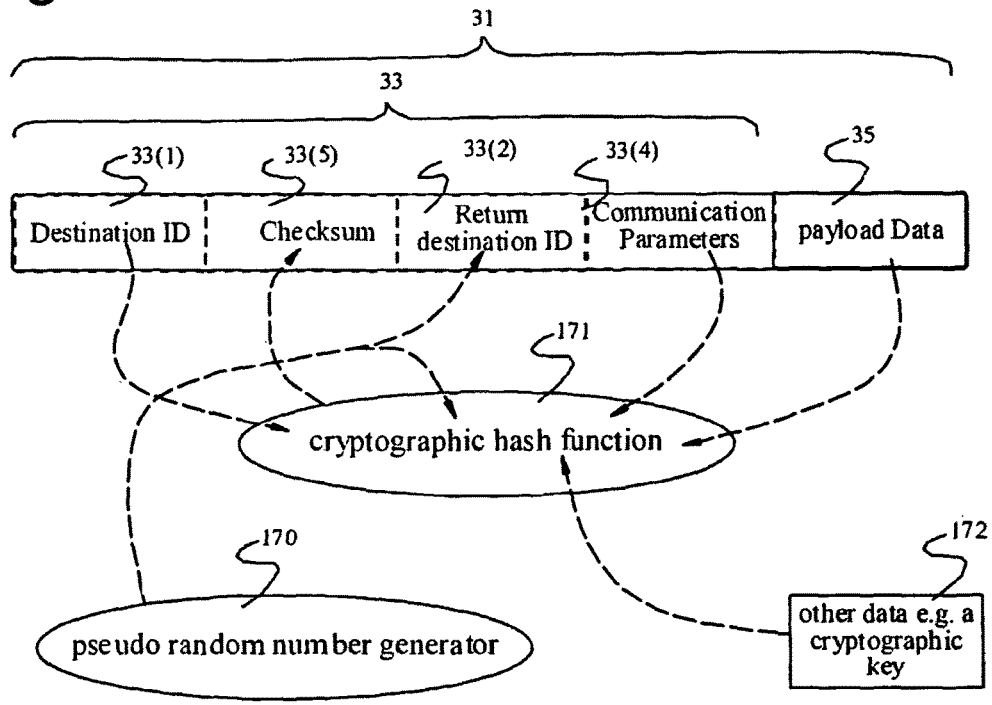
FIGS. 13a and 13b are block diagrams of exemplary functional arrangements for determining a unique component of the header of a communication primitive in accordance with certain disclosed embodiments.
Figure 13B:
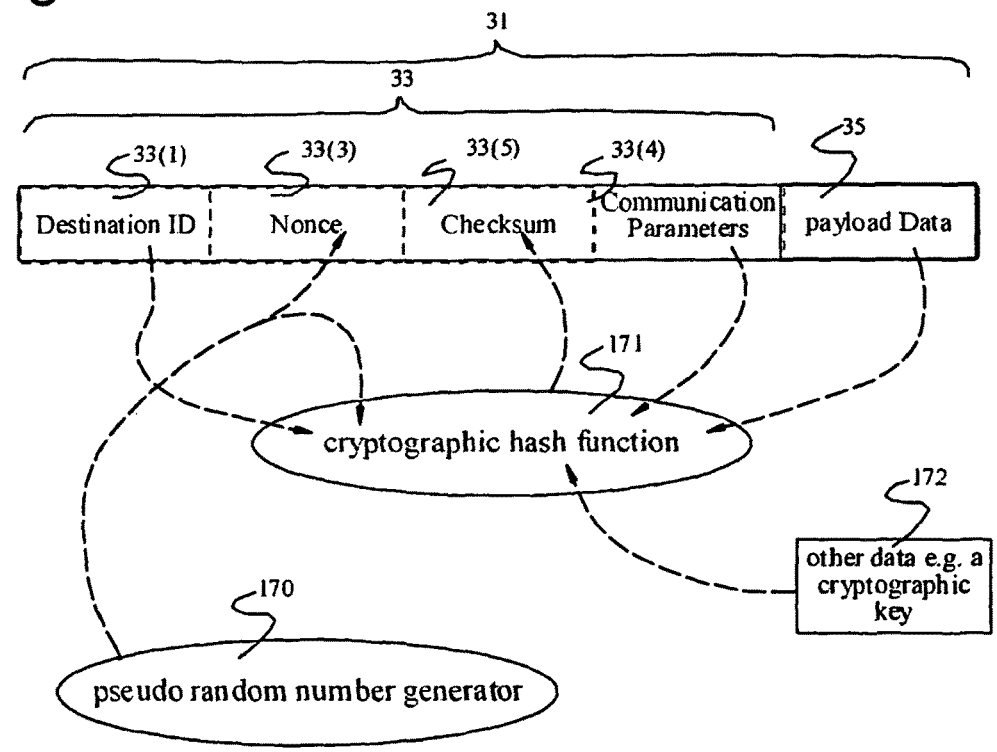

FIGS. 13A and 13B show diagrams illustrating an exemplary manner that certain embodiments determine data in the header 33 that will be used to assemble a return destination ID 33(2). FIG. 13A relates to the structure of a communication primitive 31 as presented in FIG. 8A, and FIG. 13B relates to the structure of a communication primitive presented in FIG. 8C.

Determining the data in the header 33 of a communication primitive 31 may include determining a random number or performing a cryptographic hash function over parts or all of the data contained in the communication primitive. This computation does, of course, not comprise the resulting part of the header 33 in its input.

FIG. 13A shows a particular embodiment in which a pseudo random number generator 170 is used in a communication unit to determine the value of the return destination ID 33(2) in the header 33 of communication primitive 31. The content of the destination ID 33(1), the return destination ID 33(2), the communication parameters 33(4) and all or part of the payload data 35 are further used as input in a cryptographic hash function 171 to calculate a checksum 33(5) in the header of the communication primitive 31. It is noted that the value of the checksum 33(5) is a proper (pseudo) random value as it is the result of a cryptographic hash function with at-least one of the inputs, destination ILK 33(1), return destination ID 33(2) being (pseudo) random. As the result of a random number generator, the value for the return destination ID 33(2) will be unique and different for each communication primitive. It is further noticed that the unique value of the received return destination ID 33(2), in turn when a reply is being assembled by the receiving communication unit may be used in assembling a next return destination ID for a next communication primitive and may propagate uniqueness to the resulting return destination ID. It is also noticed that the checksum 33(5) can effectively be used by the receiving communication unit in a checksum operation.

FIG. 13B shows an embodiment in which pseudo random number generator 170 is used to determine the value of a nonce 33(3) in the header 33 of communication primitive 31. The content of the destination ID 33(1), the nonce 33(3), the communication parameters 33(4) and all or part of the payload data 35 are further used as input in cryptographic hash function 171 to calculate checksum 33(5) in the header of the communication primitive 31. It is noted that the value of the checksum 33(5) is a (pseudo) random value as it is the result of a cryptographic hash function with at-least one of the inputs, destination ID 33(1) or nonce 33(3), being (pseudo) random. It is further noted that the value for the return destination ID 33(2) that may be assembled from the data inserted in the header of communication primitive according to this embodiment can be unique as the destination ID 33(1), nonce 33(3) and checksum 33(5) each are of a (pseudo) random nature.

In one further embodiment, the header 33 of a communication primitive comprises nonce 33(3) that is used as input in randomly determining a value also comprised in the header 33.

According to the embodiments exemplified in FIGS. 13A and 13B, the header 33 contains data and the checksum 33(5), and possibly nonce 33(3), respectively, that may be used by the receiving communicating unit to check the integrity of the received data including its delivery to the correct destination. To perform this check, the receiving communication unit performs the cryptographic hash function 171 on the same input data extracted from the received communication primitive 31 and compares the result with the nonce 33(3) or the checksum 33(5), respectively. Communications according to this particular embodiment will require a reduced bandwidth to achieve increased security since no separate checksum is necessary.

In a further embodiment, the data parts in the header 31 and payload 35 included in the computation of the hash function are indicated by the communication parameters in the header 33(4). There may be a parameter in the communication parameters 33(4) indicating how the hash function operates on the data and where the result is stored. In another further embodiment, the data part 33(3) in the header that has been randomly assembled is indicated by the communication parameters in the header 33(4).

In yet another embodiment, the cryptographic hash function may be used with other data 172 that is shared between the communicating communication units, e.g. as the result of previous exchange of communication primitives. In yet a further embodiment the shared data 172 includes a confidential cryptographic key. In this further embodiment, cryptographic authentication of the transmitted data and of its origin is possible. In general, the communication units 37, 39 may comprise a plurality of algorithms of hash functions. The other data 172 may include a plurality of secret keys. Therefore, in yet a further embodiment, the communication primitive sent from the sending communication unit to the receiving communication unit may comprise an indication to the algorithm of the cryptographic hash function 171 or secret key applied or both, e.g. in the communication parameters in the header 33(4). Strong hash algorithms that may be used are SHA1, MD4 or RIPEMD, although simpler hash algorithms, requiring less computational resources, may be sufficient in many cases. Establishing a shared secret key between communicating units may, for example, be done using a known key exchange protocol in an initial phase of the communication session. Using public key cryptography is also a possibility to share a cryptographic key for the current purpose of data authentication.

The embodiments shown in FIGS. 13A and 13B may also be used, for example, when the destination ID 33(1) is a fixed value or determined according to a rule that makes it's value not being unique. In a further embodiment, the pseudo random number generator 170 may be realized as a counter or a time stamp followed by a bit scrambling algorithm. In another embodiment, the pseudo random number generator 170 may return the value of one of the destination IN of recently received communication primitives. In a further embodiment, the pseudo random number generator 170 returns the value of the destination ID of the most recently received communication primitive sent by the destination of the communication primitive being assembled. In another further embodiment, the cryptographic hash function 171 may be realized with a data checksum algorithms, e.g. CRC. In yet a further embodiment, the type of pseudo random number generator 170 used in determining data in the header 33 may be indicated by the communication parameters 33(4).

In one embodiment, the nonce 33(3) comprises a time stamp. For the purpose of uniqueness the time stamp comprised by the nonce 33(3) may be expressed in a limited number of bits, e.g. 32, under the condition that the cycle time of a time stamp roll-over is sufficiently long.

It is to be understood that the term "unique" as used with reference to a return destination ID, does not mean that the value occurs only once and is never repeated. "Unique" is intended to refer to return destination ID values used only once within a limited time frame in a limited area of the communication network. To that purpose, the determination of the value of the nonce 33(3), or any other random data included in assembling the return destination ID with the purpose of creating uniqueness of the result, may not require very good randomness, or be a value expressed in many bits.

Multicast Communication Session

Certain embodiments of the present invention can be applied in a multicast environment, i.e., there is one communication unit operating as an originating communication unit of a multicast communication session with a plurality of other communication units operating as listening communication units. During such a communication session, data is transmitted that is addressed to the plurality of listening communication units to be received by all at essentially the same time. In some cases, it is desirable that the multicast communication sessions are to be continued after a first transmission to the plurality of listening communication units and the reception of a reply from at least one of them. One solution is to use a pre-arranged return destination ID that is the same for each of the plurality of other communication units, and reuse that pre-arranged destination ID for each multicast transmission. This method is well known to those skilled in the art. However, another solution is possible where no pre-arranged return destination ID is used, and where in accordance with the principles of the invention the return destination ID in the communication primitive that addresses each of the plurality of listening communication units is a multicast destination ID whose value is dynamically changed by the originating communication unit after one or more multicast transmissions in a multicast communication session. Assembling such a changing multicast destination ID may be based on a random or pseudo random process.

Therefore, in one embodiment, which is further explained below in connection with FIGS. 14, 15 and 16, the originating communication unit in a multicast fashion sends a communication primitive to at least one of a plurality of other communication units. Each communication primitive comprises specifically assembled data that will be used by each of the receiving communication units to assemble, using one or more pre-arranged processes, the data to be comprised in the header 31 of the reply with the purpose of assembling, using a pre-arranged process, the return destination ID in a subsequent communication primitive sent by the originating communication unit.

Turning to FIG. 14, a communication unit 4(11) is shown as the originator in a communication session in a multicast fashion. Also shown are three of the plurality of other listening communication units 4(12, 13, 14, . . .), that are the intended recipients of multicast transmissions from the originating communication unit 4(11). As example, communication unit 4(12) is shown as joining the multicast communication session as a listener on its own initiative, that is to say in the role referred to above as "client". As a further example, communication unit 4(13) is shown as joining the multicast communication session as listener on the initiative of the originating communication unit 4(11), that is to say in the role referred to above as "server". As will be explained below, both client and server roles are possible for any of the listening communication units partaking in the same multicast communication session. Notably, after the exchange of initiating communication primitives there is no longer a distinction between joining as listener as a client or joining as listener as server.

FIG. 14 shows a plurality of communication primitives 31(i) transmitted between the communication units 4(11), . . . , 4(13). Each communication primitive 31(i) comprises a payload PL(i), a destination ID D(i), a return destination ID RD(i), and a nonce N(i), where i=1, 2, 3, . . . .

The communication unit 4(12) in its role as client transmits an initiating communication primitive 31(1) to the communication unit 4(11). This communication primitive serves as a request to join a multicast communication session and, typically, has a payload PL(1) indicating this request and may contain further information with respect to the services required while partaking in the multicast communication session. The destination ID D(1) used in the requesting communication primitive 31(1) may have a pre-arranged value, or it may be dynamically assembled, e.g. in an ongoing communication session between the two communication units 4(11), 4(12).

The originating communication unit 4(11) in processing the received communication primitive 31(1) may decide to decline the request or may initiate a new multicast session or include communication unit 4(12) in an ongoing multicast. In the former case, a communication primitive may be sent to indicate the decision, which is not shown. In general, communications between the listening communication unit 4(12) and the originating communication unit 4(11) may continue, or the communication session may be terminated. This is not shown.

In the latter two cases a communication primitive 31(2) is sent by an originating communication unit 4(11) indicating that the other communication unit 4(12) can partake in the multicast communication session. Subsequently, the communication unit 4(12) may send a communication primitive 31(3) to which it will receive a reply communication primitive 31(4) in a multicast fashion, that is to say that all other communication units 4(12), 4(13), . . . receive the same reply. Typically, the payload PL(3) of communication primitive 31(3) indicates an acknowledgement of joining the multicast communication session. In general, payload PL(3) contains additional data relevant to the intended purpose of the multicast communication session, e.g. information identifying listening communication unit 4(12) to the other listening communication units 4(13), . . . .

The communication unit 4(13) in FIG. 14 is by example shown as joining as a listener in the multicast communication session in a role as server, that is to say it joins upon request by the originating communication unit 4(11). The originating communication unit 4(11) sends an initiating communication primitive 31(5), which typically contains in the payload PL(5) an indication of the nature of the request and further details of the intended purpose of the multicast communication session. The originating communication unit 4(11) may issue the request in order to commence a new multicast communication session with communication unit 4(13) as its first listener. Alternatively, the originating communication unit 4(11) may have the intention to include the communication unit 4(13) as an additional listener in an ongoing multicast communication session. The destination ID D(5) used in the requesting communication primitive 31(5) may have a pre-arranged value, or it may be dynamically assembled, e.g. in an ongoing communication session between the two communication units 4(11), 4(13).

The communication unit 4(13) in processing the request may decide to decline, and send a communication primitive to that effect, which is not shown. In general, communications between the communication unit 4(13) and the originating communication unit 4(11) may continue, or the communication session may be terminated. This is not shown in the figures.

If the communication unit 4(13) decides to accept the invitation to join the multicast communication session it sends communication primitive 31(6) in reply to the originating communication unit 4(11). Now, due to the specific way the return destination ID RD(6) in the communication primitive 31(6) has been assembled, as will be explained below, subsequent communication primitives may be sent by originating communication unit 4(11) that are sent in multicast fashion, and all other listening communication units 4(12), . . . will also receive the same communication primitive.

In the section below of this disclosure dedicated to routing, a further explanation is given on how a communication primitive comprising a (randomly) assembled return destination ID can be delivered to different destinations, when the communication units are not connected using a shared communication medium.

It is noted that the multicast destination ID does not need to have a pre-arranged value, and can be randomly assembled. Therefore, a communication unit can partake in multiple multicast communication sessions simultaneously. A group of multicast listeners is dynamic and listeners can join or disengage over the duration of a multicast communication session. The same multicast destination ID may be used for a number of subsequent communication primitives sent by the originating communication unit 4(11) and then be replaced by a new one, at which time a listening communication unit may decide to remain participant in the multicast communication session, or disengage. Communication units that wish to stay need to send a confirmation after having received the new multicast destination ID, while not responding will end the participation.

In an embodiment, the multicast destination ID is changed by the originating communication unit 4(11) in a regular fashion, e.g. after a number of communication primitives have been sent by the originating communication primitive, or after the lapse of a period of time. In another embodiment, the multicast destination ID is changed on request from one of the listening communication units.

Listening communication units 4(12), 4(13), . . . will receive all communication primitives sent by the originating communication unit 4(11) that have the multicast destination ID as return destination ID whether or not as a reply on an immediately preceding communication primitive from the receiving communication unit 4(12), 4(13), . . . . For example, communication primitive 31(8) is sent by the originating communication unit 4(11) in reply to a communication primitive 31(7) sent, for example, by the communication unit 4(13), and is received by all communication units 4(12), 4(13), . . . . In general, originating communication unit 4(11) may also decide to send a communication primitive 31(8) to all its listening communication units 4(12), 4(13), . . . on its own initiative without being triggered by a communication primitive 31(7) received from one of them.

In one embodiment, a "peer group" consisting of communication units performing similar or closely related functions is realized where each member is an originating communication unit in a multicast communication session in which the other communication units are listeners.

Figure 16:
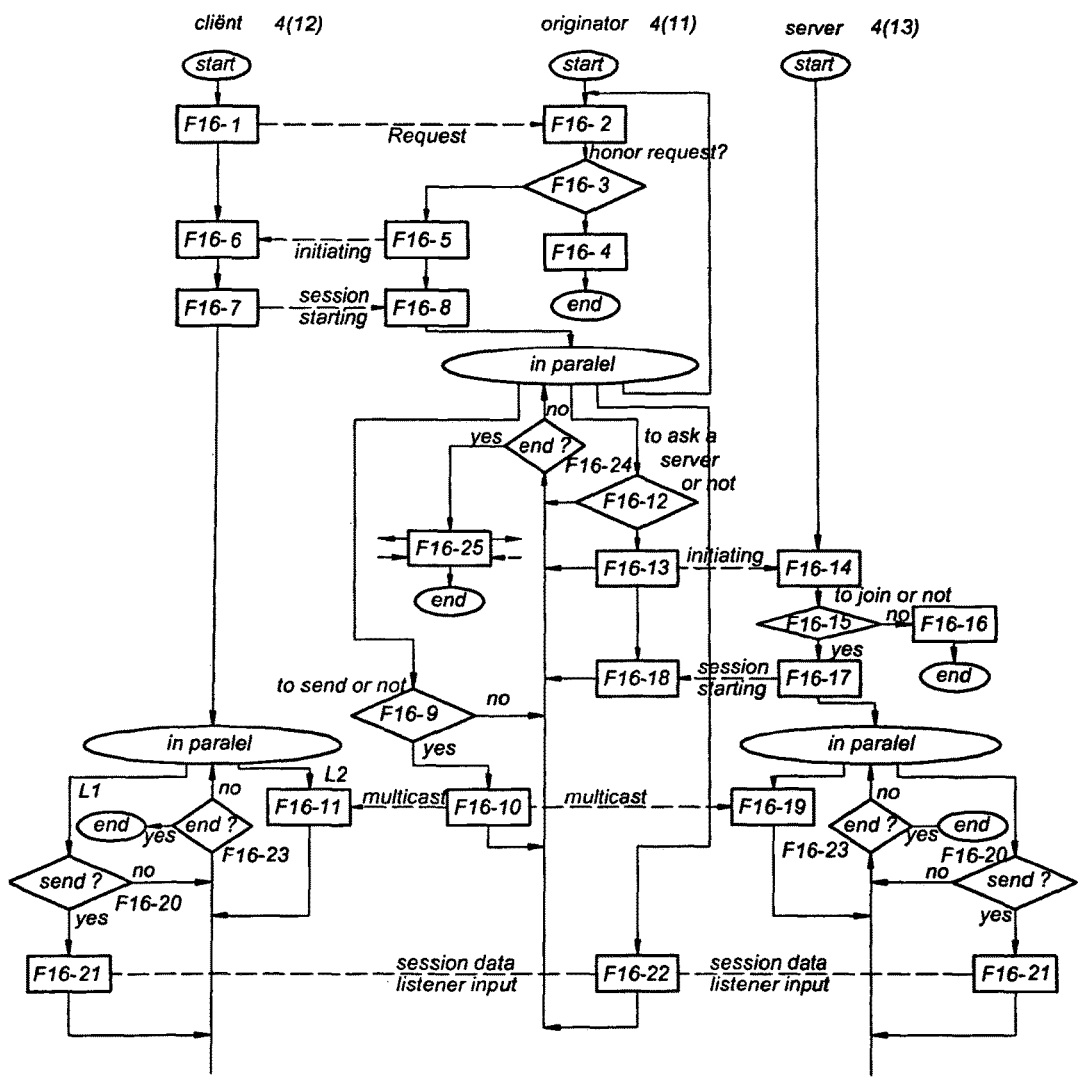
FIG. 16 is a flow chart of exemplary operations involved in a multicast communication session in accordance with certain disclosed embodiments.

Operational details for the exchange of communication primitives illustrated in FIG. 14 will be further explained with respect to FIGS. 15 and 16. FIG. 16 shows a flow chart with the interaction between three communication units when engaged in joining a multicast communication session as listener, either as a client or as a server.

FIG. 15 shows exemplary details of the values used in header and payload of the communication primitives 31(1, . . . , 10) used in the exchange in FIGS. 14 and 15.

As outlined in FIG. 16, in a first stage F16-1, communication unit 4(12) makes a determination to join a multicast communication session with communication unit 4(11). The communication primitive 31(1) with a request to that effect is sent to the communication unit 4(11) by communication unit 4(12) using a destination ID D(1) that may be pre-arranged or that is assembled from data received in a previous communication primitive received from communication unit 4(11). Exemplary values used in the header and of the payload PL(1) of the communication primitive 31(1) are schematically presented in the table in FIG. 15. For instance payload PL(1) of communication primitive 31(1) may contain details on which multicast to join.

In stage F16-2, communication unit 4(11) receives the request via communication primitive 31(1) from communication unit 4(12). In stage F16-3, communication unit 4(11) makes a determination to honor the request or to reject participation in the multicast communication session. If declined, communication between communication units 4(11), 4(12) may continue in stage F16-4. Continuation of the communication session may be realized in a reply to communication unit 4(12) that does not comprise data with respect to the multicast destination ID. Alternatively, the communication session may be terminated by either party after the exchange of one or more communication primitives.

If the request in communication primitive 31(1) is accepted, in stage F16-5, an initiating communication primitive 31(2) is sent by communication unit 4(11) to communication unit 4(12) effectively confirming the positive response to the request. This communication primitive 31(2) comprises data that will allow the receiving communication unit 4(12) to assemble the multicast destination ID. For example, as is shown in FIG. 15, this data as to the multicast destination II:) is comprised in the header by the nonce N(2). In stage F16-6, communication unit 4(12) receives this positive response from communication unit 4(11).

In stage F16-7, a session starting communication primitive 31(3) is sent by communication unit 4(12), that includes data in the header of the communication primitive 31(3) to assemble a return destination ID RD(3), e.g., assembled from information received in the earlier communication primitive 31(2), e.g. the nonce N(2). In FIG. 15, this is exemplary indicated as "RD(3)=N(2)=multicast destination ID". After having sent this communication primitive 31(3), the data included in the header, e.g. RD(3), is used by communication unit 4(12) to assemble the multicast destination ID RD(3), which is then stored in its memory. Communication unit 4(12) is now capable to recognize future communication primitives with the multicast destination ID RD(3) as destination ID as addressed to itself. In effect, communication unit 4(12) has become a listening communication unit in the multicast communication session. The stored multicast destination ID RD(3) is marked to the effect that multiple received communication primitives may be recognized as all validly addressed and will be received for possible processing.

It is noted that prior to or after stage F16-7, communication unit 4(12) may continue the communication session with communication unit 4(11) as explained above using dynamically assembled return destination It's, e.g. starting with a reply from communication unit 4(12) that uses the received return destination ID RD(2) as its destination ID. Then, at any point in time after having received the initiating communication primitive 31(2), communication unit 4(12) may make a determination to join the multicast communication session, and perform the operations explained above for stage F16-7.

In stage F16-8, communication primitive 31(3) sent by the listening communication unit 4(12) is received by the originating communication unit 4(11). Any data comprised in payload PL(3) in the received communication primitive 31(3), which may be relevant for the purpose of the multicast communication session will, in general, be processed by the originating communication unit 4(11).

In stage F16-9, a determination is made by originating communication unit 4(11) to send a multicast communication primitive 31(4). The determination may be based on the time elapsed since the last communication primitive from any of the listening communication units has been received, or on the number of communication primitives received from them or on information conveyed by any of the received communication primitives from listening communication units, or on information obtained from other communication units or otherwise.

In stage F16-10, a multicast communication primitive 31(4) is assembled by communication unit 4(11). This communication primitive 31(4) will be addressed to all listeners and have as its destination ID D(4) the multicast destination ID RD(3). The multicast destination ID RD(3) may conveniently have been stored in the memory of communication unit 4(11) after it has been assembled at the start of the multicast communication session. In the embodiment shown in FIGS. 15 and 16, the multicast destination ID RD(3)=nonce N(2), where nonce N(2) may be a random or pseudo random number. Note that the embodiment shown in FIGS. 15 and 16 resembles the process shown in FIG. 10A where a multicast destination ID can be directly read from a received communication primitive. However, in an other embodiment which, for the sake of simplicity, is not shown in FIGS. 15 and 16 a process like the process of FIG. 10B is used, i.e., the multicast destination ID can only indirectly be derived from a received communication primitive. In such an alternative embodiment, assembling the multicast destination ID RD(3) may be for instance using other data as input that may also comprise a random number and use an appropriate assembling process. The data used as input for the multicast destination ID RD(3) assembling process will be provided in the initiating communication primitive 31(2) sent by the originating communication unit 4(11) to any prospective listening communication unit. In an embodiment, at least a part of the assembling input data is comprised in the header of the initiating communication primitive 31(2). In a further embodiment, the assembling input data is comprised by the nonce N(2) in the initiating communication primitive 31(2). In another embodiment, at least a part of the assembling input data is comprised in the payload PL(2) of the initiating communication primitive 31(2).

Each listening communication unit is arranged to perform the multicast destination ID assembling process, e.g. stored as an algorithm in its memory, which it applies to the data received in the initiating communication primitive 31(2). Many different multicast destination ID assembling processes may be possible as will be clear to those skilled in the art and the communication primitive 31(2) may comprise an indication to the particular process to apply to join a specific multicast communication session, e.g. in the communication parameters 33(4) (FIG. 8b).

In stage F16-11, listening communication unit 4(12) receives first multicast communication primitive 31(4) sent by originating communication unit 4(11). In general, data contained in the payload PL(4) will be processed by communication unit 4(12) as appropriate for the purpose of the multicast communication session.

In stage F16-12, which may actually be before sending the first multicast communication primitive 31(4) in stage F16-10 as shown in FIG. 15, the originating communication unit 4(11) makes a determination to invite a further communication unit to join a multicast communication session for which it is the originator. For example, the determination is made to invite communication unit 4(13). Then, in stage F16-13 an initiating communication primitive 31(5) is sent by communication unit 4(11) to communication unit 4(13). The destination ID D(5) used in communication primitive 31(5) may have a pre-arranged value or it may be dynamically assembled based on data in an earlier communication primitive received from communication unit 4(13) as is explained above. Such an earlier communication primitive from communication unit 4(13) to communication unit 4(11) has not been shown in FIG. 14. The initiating communication primitive 31(5) comprises information to assemble the multicast destination ID=nonce N(2), as was explained in some detail with respect to stage F16-10 above. In FIG. 15, this is exemplary indicated as "N(5)=N(2)=Multicast destination ID."

It is noted—that depending on the actual assembling process that will be used by communication unit 4(13), the data comprised in initiating communication primitive 31(5) may differ from similar data sent in other initiating communication primitives (like 31(2)) to other prospective listing communication units 4(12, 14, . . . ) as long as applying the possibly various assembly processes results in the same value to be used as multicast destination ID. In stage F16-14, the initiating communication primitive 31(5) is received by communication unit 4(13).

In stage F16-15, a determination is made by communication unit 4(13) to honor or not to honor the invitation to join the multicast communication session for which communication unit 4(11) acts as originator.

If it is determined in stage F16-15 not to join in the multicast communication session the ongoing communication session between communication units 4(11) and 4(13) may be continued in stage F16-16, or it may be terminated, possibly after exchanging some further communication primitives. This is not of concern to the present example.

If, in stage F16-15 it is determined to join the multicast session, then, in stage F16-17, a session starting communication primitive 31(6) is sent by communication unit 4(13) to communication unit 4(11) which comprises data in the header that indicate that the multicast destination ID N(2) must be used in any communication primitive intended as reply to communication unit 4(13). In FIG. 15, this is exemplary indicated as "RD(6)=N(5)=Multicast destination ID." As a result of sending session starting communication primitive 31(6), communication unit 4(13) is a listening communication unit in the multicast communication session originated by communication unit 4(11). This stage is similar to stage F16-7 above where a session starting communication primitive 31(3) was sent by communication unit 4(12) to communication unit 4(11).

After having sent communication primitive 31(6), the data included in the header, e.g. RD(6), is used by communication unit 4(13) to assemble the multicast destination ID N(5) (=N(2)), which is then stored in its memory. Communication unit 4(13) is now capable to recognize communication primitives with the multicast destination ID N(5)=N(2) as addressed to itself. In effect, communication unit 4(13) has become a listening communication unit in the multicast communication session. This stage is functionally equivalent to stage F16-7 described above in the context of communication unit 4(12) joining the multicast communication session as a client. The notes made there apply equally here.

In stage F16-18, the session starting communication primitive 31(6) sent by the listening communication unit 4(13) is received by the originating communication unit 4(11). Any data that may be contained in the payload PL(6), which may be relevant for the purpose of the multicast communication session will, in general, be processed by the originating communication unit 4(11). Functionally, stage F16-18 is equivalent to stage F16-8 described above in the context of communication unit 4(12) joining the multicast communication session as a client.

In stage F16-19, listening communication unit 4(13) receives a first multicast communication primitive, which may be communication primitive 31(4) as shown in FIG. 15, from originating communication unit 4(11). Functionally, stage F16-19 is equivalent to stage F16-11 described above in the context of communication unit 4(12) joining the multicast communication session as a client.

In stage F16-20, each listening communication unit 4(12, 13, 14, . . . ) makes a determination to send a communication primitive 31(7) intended as input to the multicast communication session originating in communication unit 4(11). In stage F16-21, if the determination is positive as indicated for communication unit 4(13) in FIG. 15, the communication primitive 31(7) is sent to originating communication unit 4(11). The destination ID D(7) in communication primitive 31(7) is assembled from data comprised by a communication primitive previously received from communication unit 4(11), e.g. communication primitive 31(4). In FIG. 15, this is exemplary indicated with "D(7)=RD(4)". Using data comprised in a previously received multicast communication primitive, e.g. RD(4) in communication primitive 31(4), will facilitate the receiving communication unit 4(11) to recognize the payload data as input to the multicast communication session. Functionally, stage F16-21 is very similar to stages F16-7 and F16-17, where also input to the multicast session is provided in a communication primitive 31(3), 31(6) to originating communication unit 4(11). In these earlier stages, the session starting communication primitives 31(3), 31(6) are the very first one in joining the multicast communication session and the specific data comprised in their headers, e.g. RD(3), RD(6), that can be used to assemble the destination ID in a reply by communication unit 4(11), effectively establish the communication units 4(12), 4(13) as listeners. In the current stage, communication units 4(12, 13, 14, . . . ) have been established as listeners and the data in the header that can be used to assemble the destination ID in a reply may be different. In FIG. 15, the optional values for these data are exemplary indicated with "RD(7)=multicast destination ID or random return destination ID". If RD(7)=multicast destination ID, then, this indicates that communication unit 13 wishes to continue to be a listening communication unit in the multicast communication session. If, however, RD(7)=random return destination ID, then, this indicates that communication unit 13 does not wish to continue in the multicast communication session but wishes to start a private communication session with originating communication unit 4(11). In this private communication session, use can be made of (randomly) dynamically changing destination It's and/or return destination It's, as explained above.

In stage F16-22, originating communication unit 4(11) receives the input communication primitive 31(7) from, e.g., the listening communication unit 4(13) that had decided to send this communication primitive 31(7) (other communication units could have decided to do the same). Data contained in the payload PL(7) will in general be processed as appropriate for the purpose of the multicast communication session. Functionally, stage F16-22 is equivalent to stages F16-8 and F16-18, which were described above in the context of communication units 4(12, 13) joining the multicast communication session. The current stage performs the functionality as part of an ongoing multicast communication session.

In stage F16-23, that may be reached either after stage F16-21 or after a negative decision in stage F16-20, listening communication units 4(12, 13, 14, . . . ) make a determination to continue or end participation in the multicast communication session. If the decision is negative, the participation ends. If communication unit 4(12, 13, 14, . . . ) continues to partake in the multicast communication session it will be engaged in two parallel activities, a first one, marked LI, where it may decide to transmit a further communication primitive to originating communication unit 4(11) as input, involving stages F16-20 and F16-21 and a second one, marked L2, where it may receive a further multicast communication primitive from the originating communication unit 4(11), involving stage F16-11, F16-19.

In stage F16-24, originating communication unit 4(11) makes a determination to continue or end the multicast communication session. If the determination is to end the multicast communication session it jumps to stage F16-25 where a final multicast communication primitive may be sent informing the listeners of the decision. Furthermore, the originating communication unit 4(11) may wait to receive an acknowledgement from any or all of the listening communication units 4(12, 13, 14.). These further interactions are not shown and involve the functionality described for stages F16-19, F16-20, F16-21, F16-22 and F16-23.

If the determination is to continue the multicast communication session, the originating communication unit 4(11) will be engaged in four parallel activities: A first activity, marked O1, where the originating communication unit 4(11) may decide to send a further multicast communication primitive to listening communication units 4(12, 13, 14, . . . ) involving stages F16-9 and F16-10. A second activity, marked O2, where the originating communication unit 4(11) may decide to enlist a further communication unit as listener involving stages F16-12, F16-13 and F16-18. A third activity, marked O3, where the originating communication unit 4(11) receives a further communication primitive sent by one of the listening communication units 4(12, 13, 14, . . . ) as input to the multicast communication session. And, a fourth activity, marked O4, where the originating communication unit 4(11) responds to a request to join a multicast communication session it originates, involving stages F16-2, F16-3, F16-4, F16-5 and F16-8.

The multicast destination ID will in general be used by originating communication unit 4(11) for at least one of a series of multicast communication primitives. Then, at some point in time, originating communication unit 4(11) may determine that a change of the multicast destination II) is in order. Alternatively, originating communication unit 4(11) may determine to invite the listening communication units 4(12, 13, 14, . . . ) as participants to a second multicast communication session for which it is the originating communication unit. To effect such determinations, the originating communication unit 4(11) then includes in a multicast communication primitive 31(8) data that can be assembled into the new multicast destination ID. In FIG. 15, this is exemplary indicated as "N(8)=random or multicast destination ID 2" where N(8) is the nonce of communication primitive 31(8). Typically, the payload PL(8) of the multicast communication primitive 31(8) will contain information regarding the intended change of multicast destination ID or the other multicast communication session. Listening communication units 4(12, 13, 14, . . . ) upon receiving the multicast communication primitive 31(8) with this information make a determination to accept the invitation and the information comprised in the received multicast primitive, e.g. in the nonce N(8), will be used to send a second session starting communication primitive as is explained above with respect to stages F16-7 and F16-17. Such a second session starting communication primitive is referred to with numeral 31(10) in FIG. 15.

As can be seen in FIG. 15, the header 33 of all the communication primitives 31(1, . . . , 10) may comprise a checksum and a communication unit receiving the communication primitive can verify the checksum as part of the process of accepting the communication primitive as addressed to itself. Verification of the checksum as explained above may comprise using a cryptographic key to the effect of performing cryptographic authentication of the data and its origin while the communication primitive is being accepted.

Such authentication can also be achieved in a multicast communication session. A plurality of listening communication units will, in general, receive a multicast communication primitive. In order to authenticate the data comprised by the communication primitive a cryptographic key need to be used that is common to all receivers, the listening communication units and the sender, i.e., the originating communication unit 4(11). A public key algorithm with a key pair may be used, with the public key component shared by the listening communication units. However, public key algorithms require relatively much computational resources. Applying such an algorithm to a communication primitive during the process of accepting it as addressed to the receiver may cause undue delays. A secret value shared between all communication units 4(11, 12, 13, 14, . . . ) may be a more efficient solution. Therefore, in an embodiment, the originating communication unit assembles the data that will be used to assemble a multicast destination ID and which is included in an initiating communication primitive to comprise an indication of the cryptographic key to be used as an authentication key to authenticate the multicast communication primitives. In a further embodiment, the indication of the cryptographic key is a random seed that can be used to derive the authentication key. In yet a further embodiment, the indication is an encryption of the authentication key. In another embodiment, the key indication directly comprises the authentication key. In yet another embodiment, the authentication key is comprised by the payload. In the former two embodiments, it is noted, the originating communication unit and the communication unit receiving the initiating communication primitive share appropriate key derivation or key encryption algorithms and share further data, e.g. a secret key, to be applied with these algorithms to obtain the authentication key. Sharing algorithms and keys is know to those skilled in the art and can, for instance be achieved by exchange of communication primitives prior to sending the initiating communication primitive. In the latter two embodiments, the security of the authentication key relies on encryption applied to the communication primitive as a whole. In these embodiments also secret keys and appropriate algorithms are shared.

So, in accordance with this aspect of the invention, in a multicast communication session, the multicast destination ID of a multicast communication primitive is dynamically changed by originating communication unit 4(11) one or more times after the multicast communication session is initiated. Data pertaining to this changed multicast destination ID are sent by originating communication unit 4(11) to all listening communication units 4(12; 13, . . . ). The changed multicast destination ID can either be present itself in a communication primitive sent to all listening communication units 4(12, 13, . . . ) or that communication primitive comprises data that can be used by all listening communication units 4(12, 13, . . . ) to assemble the value of the changed multicast destination ID, and then store the assembled new multicast destination ID in their memories. The rules for this assembling are stored in the memories of the communication units 4(11, 12, 13, . . . ). This may occur several times during the multicast session and result in a changing multicast destination ID that will be recognized by each of the listening communication units 4(12, 13, . . . ) as being directed to them since they have stored the value of this multicast communication primitive in their respective memories. It is observed that the concept of using multicast destination It's in multicast communication sessions that are recognized by all listening communication units is known from the prior art. However, the way this concept is presented here is an advantageous implementation since different multicast destination It's can be defined for different multicast communication sessions, thus simplifying administrative overhead. Moreover, by using the concept of dynamically changing multicast destination It's, security in multicast communication sessions is enhanced. It will be very difficult if not impossible to intrude into a running multicast communication session and to become an undesired listening communication unit since the communication unit should have the rules stored in its memory to recognize the dynamically changed multicast destination It's.

Communication Port

In FIGS. 3a, 3b, . . . 7, various embodiments have been illustrated for communication units 4(1, 2, 3, . . . ) as they are configured in relation to various hardware devices 20(1, . . . , 8). As illustrated in these figures, a communication unit comprises one or more communication ports 22(1, . . . ) through which they are connected to exchange communication primitives. The communication ports 22(1, . . . ) are the functional components in a communication unit that perform operations in accordance with embodiments of this invention related to the reception and transmission of communication primitives. The communication port 22(1, . . . ) is conceptual in that it may be completely implemented as a software program or software library. If realized as a software program, storing functions as may be used by the communication port 22(1, . . . ) while performing its operations can utilize memory devices present in the hardware devices 20(1, . . . 8). Or the software implemented communication port may be comprised by a software program as a plurality of dedicated modules. When implemented in software a plurality of communication ports 22(1, . . . ) can share the implementation, with portions of the program's memory suitably allocated to each communication port 22(1, . . . ).

Alternatively, hardware devices 20(1, . . . 8) may include hardware components that perform specific functions to realize the communication port or parts thereof. Such hardware components may comprise memory devices of various types, RAM, ROM, EEPROM and all other kinds of memory known to persons skilled in the art. Furthermore, these components may be implemented using hard-wired logic circuits, programmable logic arrays, ASICs or programmable processing units with a program memory device, or any suitable combination of these.

In one embodiment, the functionality of the communication port 22(1, . . . ) is realized in an ASIC (Application Specific Integrated Circuit). In another embodiment, the communication port 22(1, . . . ) is realized as a hardware logic library, e.g. expressed in VHDL (VHDL=VHSIC Hardware Description Language; VHSIC=Very High Speed Integrated Circuit), that comprises all or part of the functional components, including one or more of the memories. In a further embodiment, the communication port logic library is integrated on-chip with the processor 1.

Figure 17:
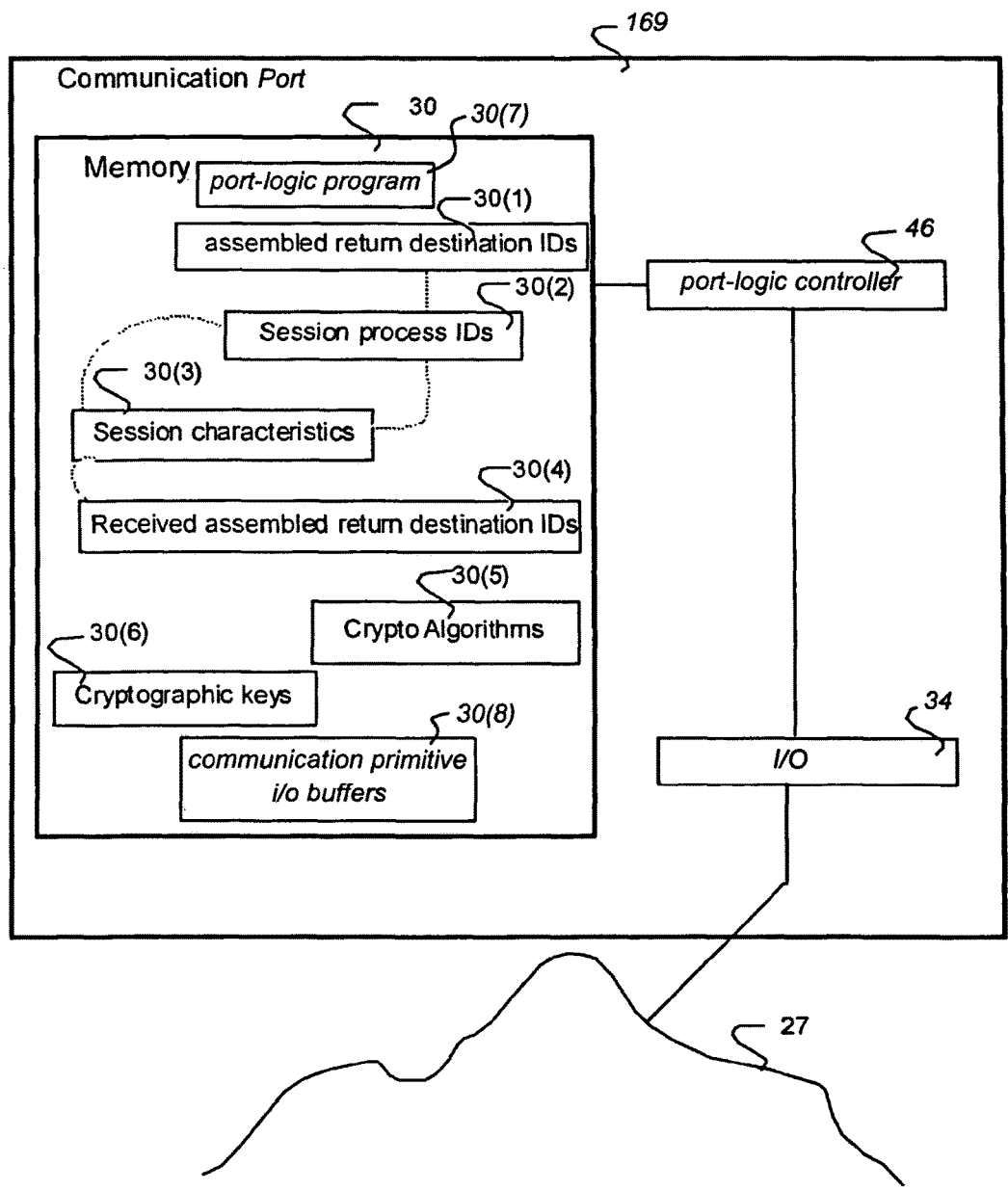
FIG. 17 is a block diagram showing exemplary data structures and physical components related to a communication port in a communication unit according to certain disclosed embodiments.

FIG. 17 shows a schematic example of communication port 22(i) operating as sender or receiver. The communication port 22(i) is shown to comprise a port-logic controller 46, a memory 30 and an I/O unit 34 for communicating with further communication units. FIG. 17 relates to FIG. 12 but provides more details for the communication port 22 shown in that figure. It shows memory 30 containing data structures typically used in an exchange of communication primitives between communication units in accordance with embodiments. Whereas FIG. 12 provides a general overview of memory content for a communication unit FIG. 17 provides additional details for data comprised in memory 30 specific to operations of a communication port 22(i) of which a communication unit may have more than one. Numerals in FIG. 17 have in general the same meaning as in FIG. 12.

As is explained above for FIG. 12, the memory 30 includes several data structure, e.g. tables, 30(1, 2, 3, 4, 6) comprising data used in the exchange of communication primitives in accordance with embodiments of the invention. In FIG. 17 the same numerals refer to similar data comprised by the memory 30 where such data in the context of FIG. 17 is used for the communication primitives exchanged via the port 22(i). Additionally, memory 30 may comprise a port-logic program 30(7) comprising the executable instructions that specify operations performed by the port-logic controller 46. Furthermore, memory 30 may comprise any I/O data buffers 30(8) that may be used by the port-logic controller for transient storage of data that has been received or is made ready for transmission.

Memory 30 may be shared memory comprising data for multiple ports 22(1, 2, 3, . . . ) or it may be a dedicated memory for port 22(i); it may also be implemented as combination of shared and dedicated memory.

The port-logic controller 46 is the functional part of communication port 22(i) in which resides the controlling intelligence of operations, timing, sequencing and synchronization. The port-logic controller 46 is a conceptual part of the communication port 22(i) in that it may be realized as a fully integrated part of the communication port 22(i) that cannot be distinguished from other parts, e.g. it is implemented as integral part of specific logical functions that control individual functional parts. Specifically, the port-logic controller 46 may be integrated in an all-software implementation of communication port 22(i), suitably dispersed over a possible plurality of software modules. Such software modules may be stored in memory 30 as the port-logic program 30(7).

However, the port-logic controller 46 may equally be realized as a separate processor connected to suitable memory devices 30 comprising a port-logic program 30(7) and that is functionally related to a plurality of other functional components in the communication port 22(i) for the purpose of controlling the operation of these other components with respect to timing, sequencing and synchronization as is known to a person skilled in the art. Memory 30 may comprise RAM, ROM, EEPROM, and all other kinds of memory known to persons skilled in the art, respectively. The port-logic processor 46 may, alternatively, at least in part be implemented as hard-wired logic, programmable logic arrays, ASICs, or any suitable combination of these, possibly in combination with a programmable processing unit with a program 30(7) in an associated memory device 30.

In one embodiment, the functionality of the port-logic controller 46 is realized in an ASIC. In another embodiment, the communication port 22(*i*) is realized as a hardware logic library, e.g. expressed in VHDL. In a further embodiment the port-logic library is integrated on-chip with a processor, e.g. processor 1.

Figure 18:
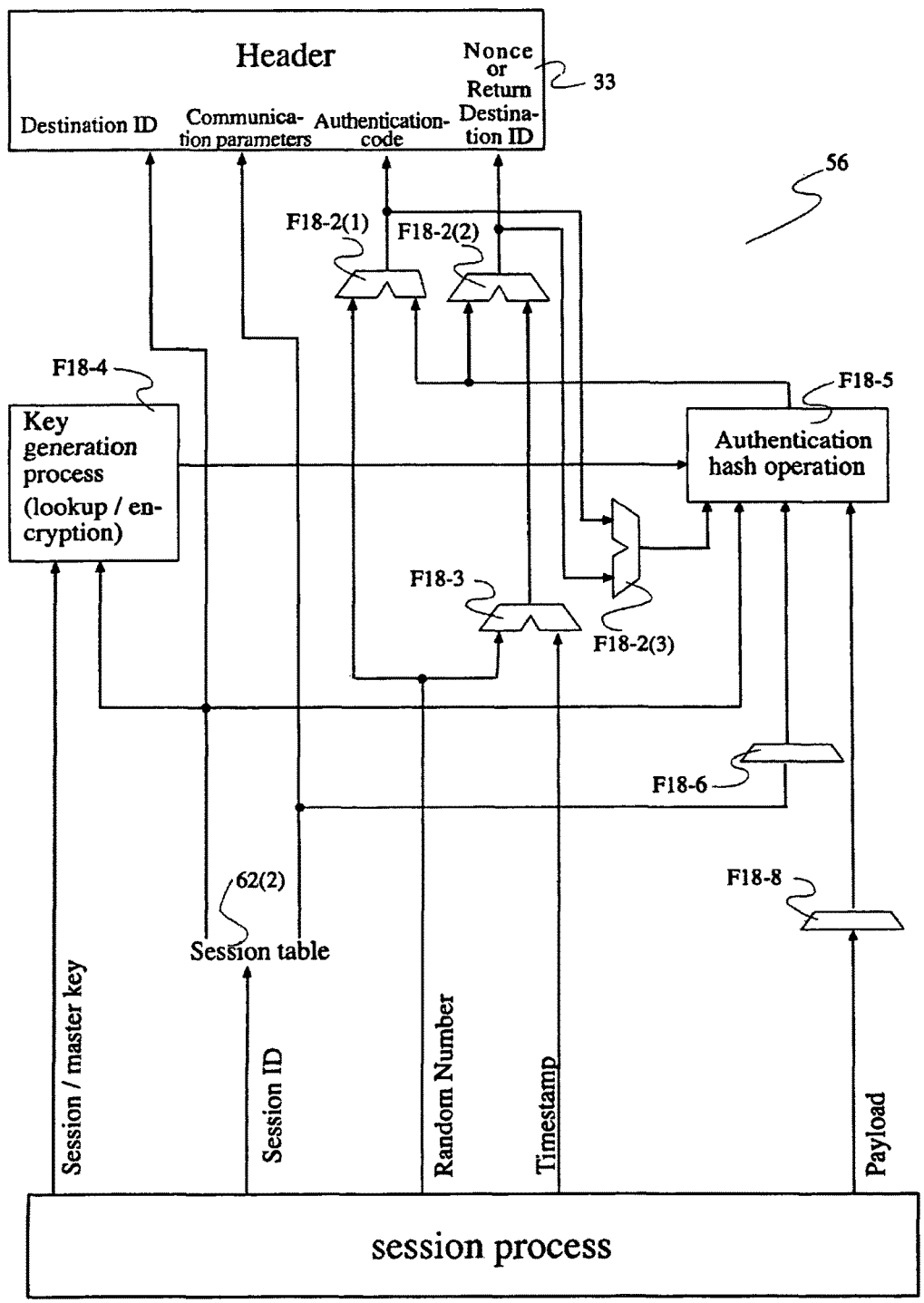
FIG. 18 is a block diagram of an exemplary functional arrangement for assembling the header of a communication primitive in accordance with certain disclosed embodiments.
Figure 19:
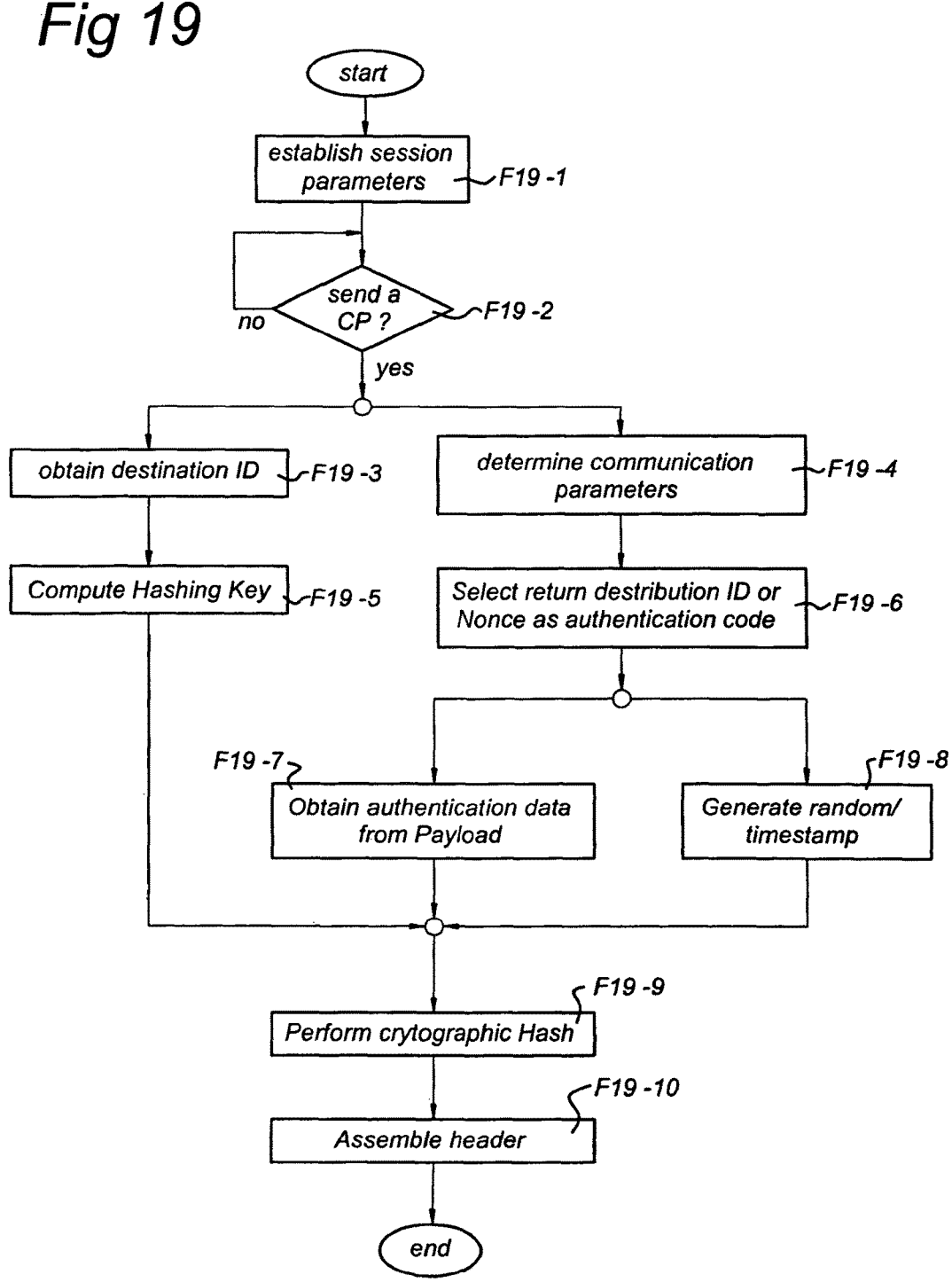
FIG. 19 shows a flow chart of an exemplary use of the functional arrangement shown in FIG. 17 in accordance with certain disclosed embodiments.

Processing typically performed by the port-logic controller 46 comprises assembling of data comprised in the communication primitive 31 such as the destination ID and for use in assembling a return destination ID to be used in a reply by the recipient. Such assembling of data as may in particular be included in the header of a communication primitive in accordance with embodiments is further explained with reference to FIGS. 18 and 19. More specifically, FIGS. 18 and 19 show the functional arrangement that may be used to perform the computations schematically indicated in FIGS. 13*a* and 13*b*. FIG. 18 shows a functional arrangement for the assembly of header data while FIG. 19 shows a flow diagram of operations involving the functional arrangement of FIG. 18.

FIG. 18 shows a header 33 of a communication primitive to be sent that is being assembled with various components. Input to a header computation process 56 is provided by a communication session process 66 as a session process ID that identifies the communication session and a payload that comprises the request or response from the process that is to be sent. The session process ID input is provided to a session table 62(2) to obtain the destination ID that has been assembled from data received in an earlier communication primitive from an other party in the communication session. Lookup in the session table 62(2) also results in a set of communication parameters that specify attributes of the communication primitive to be sent. The communication parameters are provided as resulting component of header 33 as well at least in part as data input as selected by a data selector F18-6 to an authentication hash operation F18-5 that will generate an authenticating checksum for the communication primitive to be sent.

The destination ID obtained from the session table 62(2) is provided as resulting component to the header 33. Also, the destination ID is data input into the authentication hash operation F18-5. The destination ID may also be used as input to a key generation process F18-4 that may comprise a lookup of a session specific master key and encryption using the found master key. The cryptographic key resulting from key generation process F18-4 is provided as key input to the authentication hash operation F18-5.

Authentication hash operation F18-5 also receives, via a data selector F18-8, all or part of the payload that has been provided by the communication session process for transmission. The result of authentication hash operation F18-5 is provided, via a data switch F18-2(1) and F18-2(2), as resulting value for either the return destination ID or nonce in the header 33. Further data input to the authenticating hash operation F18-5 is provided via a data selector F18-2(3) that receives outputs from data switches F18-2(1) and F18-2(2) in order to provide either the nonce or the return destination ID back to the authentication hash operation F18-5. Data switch F18-2(1) selects either a random number or the result of authenticating hash process F18-5 as the resulting return destination ID in header 33. Similarly, but complementary in operation, data switch F18-2(2) selects either the output of a data switch F18-3 or the result of authenticating hash process F18-5 as the resulting nonce in header 33. Data switch F18-3 selects either a random number or a time stamp as value that may be used as resulting nonce in the header 33.

Functionally, the arrangement shown in FIG. 18 can be explained with reference to a flow chart shown in FIG. 19 where in stage F19-1 session parameters are established and stored in session table 62(2). This stage is prior to any transmission of communication primitives and typically is performed when initiating the communication session. Initiating a communication session typically results in a session ID that can be used to identify a session amongst possible multiple simultaneous sessions. The session ID is stored in the communication session process. Typically, also stage F19-1 may be performed when receiving a communication primitive in an ongoing communication session to update the session parameters as appropriate with data in received communication parameters.

In stage F19-2, a determination is made in the communication session process to send a communication primitive at which point the header computation process involving the arrangement in FIG. 18 starts. Then, in stage F19-3 the destination ID is obtained from session table 62(2) using the session ID associated with the session as index key. The destination ID stored in session table 62(2) is in general the return destination ID assembled from a previously received communication primitive. Subsequently, the destination ID is used to determine a cryptographic authentication key in stage F19-5 that is specific to the communication primitive to be sent, at least specific to the destination ID used, which typically may be used for once. Meanwhile, in stage F19-4, which may be performed at a time possibly unrelated to stage F19-3, F19-5, communication parameters-applicable to the communication primitive to be sent are determined in an action that typically comprises consulting the session table 62(2) with the session ID as index key. Then, in stage F19-6 a determination is made, possibly based on the communication parameters determined in stage F19-4, to use either the checksum 33(5) or the nonce 33(3) in the resulting header 33 as the value for the communication primitive authentication checksum. The data switches F18-2(I, 2, 3) are configured according to the determination made in this stage. In stages F19-7 and F19-8 additional data input for the authentication hash operation F18-5 is prepared; stages F19-7 and F19-8 can be performed in any relative order, possibly simultaneously. In stage F19-7 all or part of the payload is obtained, e.g. by configuring data selector F18-8 as indicated in the communication or session parameters. In stage F19-8 additional input to the authentication hash operation F18-5 that may determine uniqueness of the result is determined. Either a random number or a time stamp may be used as can be selected by data switch F18-3 in accordance with communication or session parameters and compatible with the selection of the return destination ID or nonce for the value of the authentication checksum.

In stage F19-9 the authentication hash operation F18-5 is performed using the key input from stage F19-5, the destination ID from stage F19-3, the communication parameters from stage F19-4, the payload from stage F19-7 and the random number or timestamp from stage F19-8 as input producing an authentication checksum as value for the nonce 33(3) or checksum 33(5) determined in stage F19-6.

Finally the header 33 for the communication primitive to be sent is assembled in stage F19-10.

It is noted that other arrangements for the authentication key determination are possible, e.g. a key specific to the session may be obtained by lookup in session table 62(2). As mentioned above in relation to FIGS. 13*a* and 13*b*, generating the random number or timestamp in the context of this invention may be realized in a variety of different ways.

Figure 20:
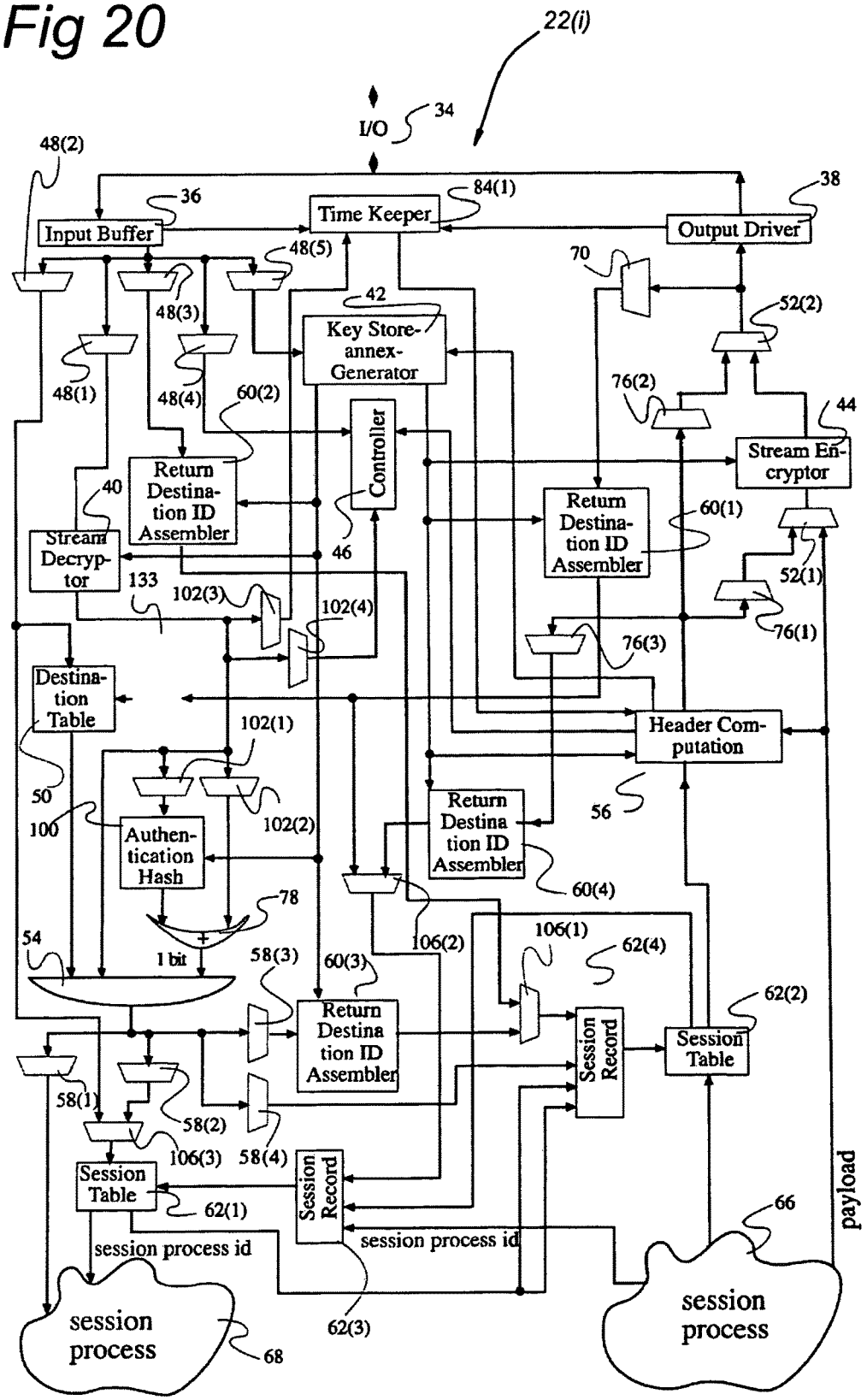
FIG. 20 shows a block diagram of exemplary functional arrangements of a communication port in a communication unit in accordance with certain disclosed embodiments.

Now turning to FIG. 20, where further details of a functional arrangement in embodiments of a communication port **22(*i*) are shown. The arrangement in FIG. 20 can be realized with a memory and processing structure as explained in FIG. 17. The functions performed in the communication port 22(*i*) comprise assembling header data as explained with reference to FIGS. 18 and 19**.

As shown in FIG. 20 the communication port **22(*i*) comprises an input buffer 36 for buffering input data received on an input line via an I/O device 34. The input buffer 36 is connected to a destination table 50 via a data selector 48(2). The destination table 50 has an output connected to a control input of an accepting gate 54. Furthermore, the input buffer 36 is connected via a data selector 48(1) to a stream decryptor 40. The output of stream decryptor 40 is connected to a communication session process 68 capable of handling the communication primitive payload via an accepting gate 54 and a data selector 58(1). The output of the stream decryptor 40 is, also via accepting gate 54, connected to a session table 62(1) via a further data selector 58(2) through which an appropriate communication session 68 can be selected amongst possibly multiple communication sessions. The output of input buffer 36 is further connected via respective data selectors 48(3, 4, 5) to a return destination ID assembler 60(2), port-logic controller 46 and a key store-annex-generator 42**, respectively.

The output of the stream decryptor 40 is furthermore connected to an input of authentication hash calculator 100 via a data selector 102(1) and, via a data selector 102(2) to an input of a comparator 78. Another input of the comparator 78 is connected to the output of hash calculator 100. The output of the comparator 78 is connected to a second control input of the accepting gate 54. Output of the stream decryptor 40 is also connected to port-logic controller 46 and a timekeeper 84(1) via data selectors 102(4) and 102(3), respectively.

Via a data selector 58(4) the output of the accepting gate 54 is further connected to a first input of a session record 62(4). Session record 62(4) has a second data input connected via data selector 106(1) to an output of return destination ID assembler 60(2) or return destination BD assembler 60(3). An index input for session record 62(4) is connected to the output of session table 62(1). The output of session record 62(4) is connected to a session table 62(2) as update.

Reference number 68 schematically refers to a communication session process performed by a processor e.g. a CPU (not shown) of the communication unit 4(1, 2, . . . ) which comprises communication port **22(*i*). The communication session process 68** will receive the payload of the received communication primitive and may process it.

Reference number 66 refers to a communication session process performed by the communication unit 4(1, 2, . . . ) generating data to be transmitted to another communication unit involved in a same communication session. Output of communication session process 66, when it is sending a communication primitive, is provided to a header computation unit 56 and, via a communication primitive assembler 52(1), to a stream encryptor 44. Communication session process 66 also provides a session ID associated with the payload to the session table 62(2) of which the output is also connected to header computation unit 56. Further inputs of header computation unit 56 are connected to the timekeeper 84(1) and key store-annex-generator 42. Output of header computation unit 56 is connected to communication primitive assemblers 52(1) and 52(2), via data selectors 76(1) and 76(2), respectively. Output of stream encryptor 44 is connected to an output driver 38 via the communication primitive assembler 52(2). The output driver 38 is connected to I/O device 34 connected to the output line, which may be the same physical medium as the input line. Alternatively, the input line/output line may be implemented as wireless connection.

The output of the header computation unit 56 is also connected via a data selector 76(3) to an index input of a session record 62(3) and to the key store-annex-generator 42. A data input for session record 62(3) is connected to the session process ID provided by communication session process 66. The output of session record 62(3) is connected to session table 62(1) as update.

Output of the communication primitive assembler 52(2) is connected via a data selector 70 to a return destination ID assembler 60(1). The output of return destination ID assembler 60(1) is connected to destination table 50 as update.

The communication port **22(*i*) is provided with port-logic controller 46, which, as explained above, is functionally connected to all components with respect to configuration, timing and synchronization. These connections are not shown for clarity. Specifically, the data selectors 48(1, . . . 5), 58(1, 2, 3), 70, 76(1, 2, 3), 102(1, . . . 4) and 106(1, 2, 3, . . . ) and communication primitive assemblers 52(1, 2)** are configured based on information pertaining to the communication primitive being received or in process of being sent using connections not shown.

The port-logic controller 46 is connected with configuration inputs from the input buffer 36, via data selector 48(4), from the stream decryptor 40, via data selector 102(4), and from the header computation unit 56, typically the configuration data used in these inputs is, at least in part, indicated by communication parameters in the header of the communication primitive being processed.

The key store-annex-generator 42 maintains secret data to be used as cryptographic keys in the various protection processes performed by the communication port **22(*i*). Outputs of the key store-annex-generator 42 are connected to the stream decryptor 40, authentication hash calculator 100, stream encryptor 44 and header computation unit 56. Each of these components will be provided with an appropriate possibly different secret key. Key generation input is provided to the key generator-annex-store 42 via inputs connected to outputs of the input buffer 36, via data selector 48(5), and of the header computation unit 56**.

Timekeeper 84(1) is optionally present in communication port **22(*i*). It is connected, when present, on an input to either the input buffer 36 or output driver 38 or both. The timekeeper 84(1) further may receive input from the stream decryptor 40 via a data selector 102(3) and it is connected to an input of the header computation unit 56**.

It is noted that FIG. 20 is a schematic representation of embodiments of the invention without limiting other embodiments. In particular the communication accepting gate 54 may be implemented as functions of the port logic controller 46 based on the state of the two control inputs to the port logic controller 46, and that processing an incoming communication primitive may be aborted as soon as it is determined that he destination ID is not present in the destination table 50. The comparator 78 may also be functionally integrated in the authentication hash calculator 100. The figure shows four distinct return destination ID assemblers 60(1,2,3,4) which may be realized as one functional unit shared between the various tasks, or as two functional units, e.g. one for input and one for output processing. The communication primitive assemblers 52(1, 2) may in some cases be realized by wiring and not be explicitly present. The input buffer 36 and output driver 38 in the figure symbolize the functionality to access a communication medium, e.g. Ethernet™, and may be realized in any form appropriate for a particular communication medium.

Figure 21:
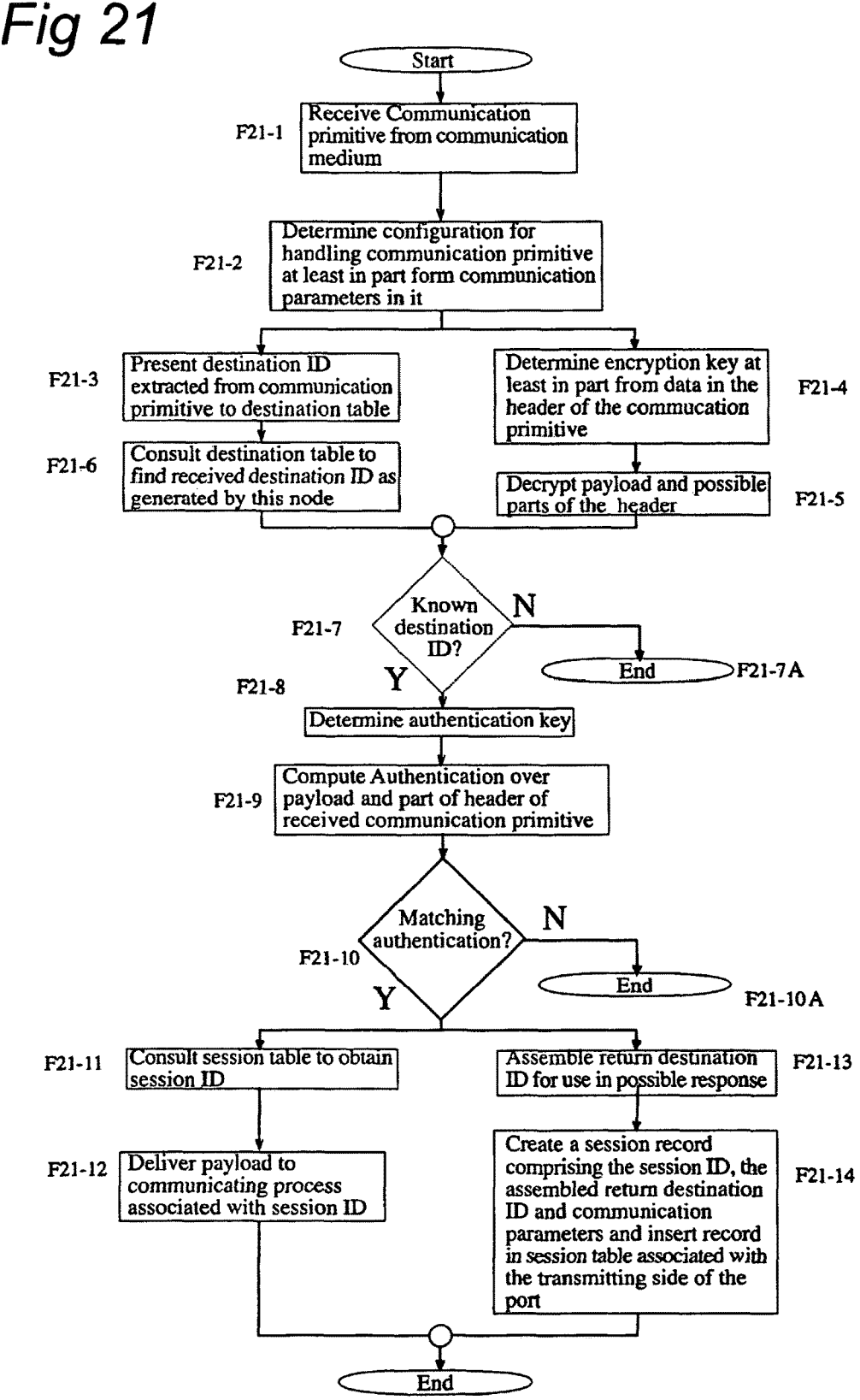
FIGS. 21 and 22 show flow charts of exemplary operations of the functional arrangements shown in FIG. 20 in accordance with certain disclosed embodiments.
Figure 22:
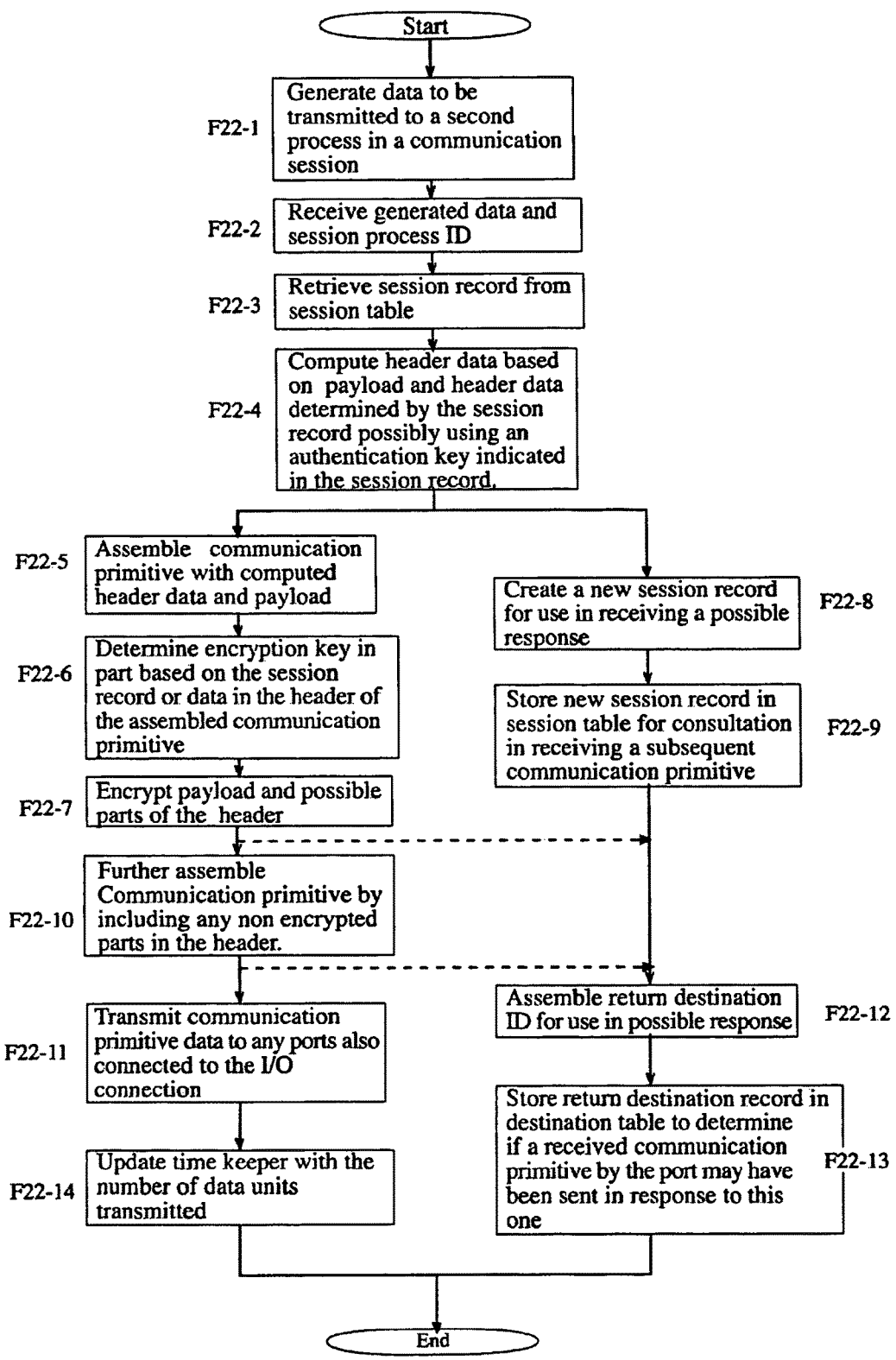

Operationally, the functional arrangement in FIG. 20 is further described in connection with FIGS. 21 and 22. FIG. 21 shows operations involving receiving a communication primitive and accepting it for delivery to communication session process 68. FIG. 22 shows operations involving sending a communication primitive with a payload generated by communication session process 66 to a further communication unit using a destination ID associated with the communication session.

In stage F21-1 (FIG. 21), a communication primitive is received via I/O device 34 and input to input buffer 36. If connected to the input buffer 36, the time keeper 84(1) is informed on the number of bits, or other data units, received in the communication primitive for the purpose of synchronization in a network of communication units.

In stage F21-2, using data selector 48(4) communication parameters, at least in part, are obtained from the received communication primitive which are used to configure processing of the communication primitive being received. In the embodiment of FIG. 20, the communication parameters are provided to the port-logic processor 46 for that purpose.

In stage F21-3, using data selector 48(2), the destination ID is obtained from the header of the communication primitive being received and provided as input to the destination table 50.

In stage F21-4, using data selector 48(5) data is extracted from the header of the communication primitive being received that may be used to determine an encryption key, including, possibly, the destination ID 33(1), the checksum 33(5) and some communication parameters and provided to the key store-annex-generator 42. The key store-annex-generator 42 determines the decryption key to be used in further processing from the communication primitive being received. In one embodiment, the key is generated in a cryptographic process that uses a payload checksum as input. In another embodiment, the key is generated in a cryptographic process that uses data from the timekeeper 84(1) as input. In yet another embodiment, a key is generated in a cryptographic process that uses the destination ID as input. The determined key is provided as input to stream decryptor 40.

In stage F21-5, using data selector 48(1), the payload and any encrypted part of the header, e.g. the return destination ID, of the communication primitive being received are provided to the stream decryptor 40 and decrypted using the decryption key determined in stage F21-4. The decrypted received communication primitive that is the result of this stage may be complemented with any parts of the received communication primitive that were received unencrypted, e.g. the destination ID or (parts of) the communication parameters (not shown in FIG. 20).

In stage F21-6, destination table 50 is consulted using the destination ID obtained I in stage F21-3. This consultation determines if a communication primitive has previously been sent via the communication port 22(i) that comprised data to assemble the current destination ID.

In stage F21-7, a determination is made to accept or reject the communication primitive based on the result of consulting destination table 50. If the communication primitive is rejected no further processing is done and reception of the communication primitive is aborted, stage F21-7A.

In stage F21-8, the key store-annex-generator 42 determines an authentication key based on the data extracted from the header in stage F21-4 possibly complemented with data extracted from the header in the communication primitive after decryption by stream decryptor 40. (This additional input is not shown in FIG. 20). The authentication key is provided to authentication hash calculator 100.

In stage F21-9, authentication hash calculator 100 computes an authentication checksum over the parts of the header and payload selected by data selector 102(1) using an authentication key determined in stage F21-8. Possible variants of the checksum computation have been explained above with respect to FIGS. 13a, 13b and 18. The resulting checksum is provided to comparator 78.

In stage F21-10, a determination is made if the authentication checksum computed in stage F21-9 matches the checksum in the decrypted received communication primitive, which is obtained from the header using data selector 102(2). This determination is symbolically represented in FIG. 20 with the comparator (XOR gate) 78. If the computed checksum does not match the received one, the communication primitive is rejected and processing is aborted, stage F21-10A. In FIG. 20, the determination in stage F21-7 and in this stage are combined in a symbolic representation of accepting (AND) gate 54, which has two controlling inputs representing the results of stages F21-6 and F21-9, respectively.

In stage F21-11, the session process ID for a process that is expecting the payload of the communication primitive for its further execution is determined. For this determination, session table 62(1) is consulted using data from the header of either the received communication primitive selected by data selector 48(2) or the accepted decrypted received communication primitive selected by data selector 58(2) as index to obtain a session record, which in addition to the session process ID may comprise communication parameters, e.g. time-out values, and further session identifying data.

In stage F21-12, the payload is extracted from the accepted decrypted received communication primitive selected using data selector 58(2) and provided to the communication process 68 identified by the session process ID obtained in stage F21-11.

In stage F21-13, the return destination ID is computed that may be used in a reply to the received communication primitive. In one embodiment, this computation by return destination ID assembler 60(2) uses the header, at least in part, of the received communication primitive, as selected by data selector 48(3). In another embodiment this computation uses the header, at least in part, of the accepted decrypted communication primitive, as selected by data selector 58(3) as input in a process by return destination ID assembler 60(3). In a further embodiment, the communication parameters determine which computation method for the return destination ID is used. Assembling the return destination ID from data in the header of a communication primitive is further explained with respect to FIG. 23.

In stage F21-14, header data from the accepted decrypted received communication primitive is selected using data selector 58(3), e.g. communication parameters, the return destination ID obtained in stage F21-13 and possible data contained in the session record 62(4) are combined with a session process II) obtained in stage F21-11, as index, and entered as an updated record in the session table 62(2) associated with the session process 68. This record will be used for a future transmission originating from session process 68 and directed at the sender of the received communication primitive.

Input buffer 36 may be configured to partially buffer an incoming communication primitive for the duration of stage F21-2 and possibly F21-4 in order to process the communication primitive once the mode of processing is fully configured. In particular, the input buffer 36 may be absent. Hence, in one embodiment, a communication port processes an incoming communication primitive in a pipe-line fashion, interpreting an initial part of it, including at least one of (i) destination 113 33(1), (ii) a first part of communication parameters and (iii) a first part of a nonce 33(3)', as processing instructions, e.g to decrypt or not to decrypt and process configuration parameters e.g which key to use.

Destination table 50 may be implemented in manner, e.g. with the destination ID as hashed index, that may indicate acceptance of a communication primitive with a destination ID that was not originally stored in the table. In that case, the communication primitive may still be rejected on the result of authentication comparator 78 which will fail as the authentication key used by the recipient does in general not match the key used by the sender. However, a communication primitive sent without cryptographic authentication may be incorrectly accepted. In that case a secondary acceptance procedure, which is not shown, should be applied, based on exact matching of the destination ID. Hence, in an embodiment, a communication port upon receiving a communication primitive rejects it when the received authentication checksum 33(5) does not match a computed authentication checksum. In a further embodiment, a communication primitive is reject if (i) it is accepted by the authentication check, (ii) the authentication check is based on non-confidential shared data or applies a non-cryptographic algorithm, and (iii) the received destination ID does not match a stored destination ID.

Now turning to FIG. 22, where further operational details of the arrangement in FIG. 20 are explained when used to transmit a communication primitive in accordance with embodiments of this invention using communication port 22(i). Then, in stage F22-1, the communication session process 66 performed by the communication unit 4 generates data to be transmitted to another communication unit taking part in this communication using communication port 22(i).

In stage F22-2, communication session process 66 indicates a session process ILK, a session ID and the communication payload generated in stage F22-1 to communication port 22(i).

In stage F22-3, communication port 22(i) uses the session ID to retrieve a session record from session table 62(2). The session record comprises session configuration data indicating communication parameters and a previously assembled return destination ID that may be used to address the intended recipient, or recipients in case of a multicast, of the payload. Data from the session record is provided as input to the header computation unit 56.

In stage F22-4, header computation unit 56 provided with data from the session record obtained in stage F22-3 and the payload obtained in stage F22-2 assembles header data to be included in the communication primitive. Details for the assembling process performed by header computation unit 56 has been described above with respect to FIGS. 18 and 19. The header computation unit 56 in performing its operations interacts with the key store-annex-generator 42, for instance, providing it with a destination ID to obtain a session key. This interaction is symbolically represented in FIG. 18 with numeral F18-4. Also, the header computation unit 56 provides any configuration data from the session record to port-logic controller 46, to configure any further processing of the communication primitive being assembled prior to transmission.

In stage F22-5, an initial communication primitive assembler 52(1) assembles the communication primitive to be sent using header data generated in stage F22-4, at least in part, as selected by data selector 76(1) and the payload as obtained in stage F22-2.

The assembled communication primitive is provided as data input to stream encryptor 44.

In stage F22-6, an encryption key to encrypt the communication primitive is obtained from the key store annex generator 42 based at least in part on information contained in the session record. Possibly, as alternative, the key determination data is extracted from the header as computed in stage F22-4, which in turn is based on data in the session record. In one embodiment, the key is generated in a cryptographic process that uses a payload checksum as generated in stage F22-4 as input. In another embodiment, the key is generated in a cryptographic process that uses data from the timekeeper 84(1) as input. The key is provided as input to a stream encryptor 44.

In stage F22-7, stream encryptor 44 encrypts the communication primitive, at least in part, as initially assembled by data assembler 52(1) in stage F22-5 using the encryption key determined in stage F22-6.

In stage F22-8, a session record 62(3) is created that comprises the process ID obtained in stage F22-2, various session attributes obtained contained in the session record obtained in stage F22-3 from session table 62(2) and the session process ID indicated in stage F22-2.

In stage F22-9, the session record 62(3) computed in stage F22-8 is stored in session table 62(1) that is associated with the receiving part of the port with an index determined by data selector 106(2) The index is either a return destination II) assembled in this stage by return destination ID assembler 60(4) from unencrypted data comprised in the header as selected by data selector 76(3) or a return destination ID assembled in stage F22-12.

In stage F22-10, communication primitive assembler 52(2) assembles the communication primitive in its final form by adding any non-encrypted parts of the header 33 as computed in stage F22-4 and selected by data selector 76(2) to the partially assembled and encrypted communication primitive produced in stage F22-7. Typically, this assembly consists of prefix or appending any additional header data as determined in stage 2F22-4 as further explained here below.

In stage F22-11, the output driver 38 transmits the communication primitive via I/O connection 34. Thus, any other communication port, not shown, connected to the I/O connection receives the transmitted communication primitive.

In stage F22-12, return destination ID assembler 60(I) assembles a return destination ID 33(2) from the data included in the completed communication primitive. This return destination ID 33(2) is assembled in accordance with the rules indicated in the communication parameters 33(4v) in the header data, and the data used in this assembly is extracted from the finally assembled communication primitive with data selector 70.

In stage F22-13, the return destination ID 33(2) is stored in destination table 50 that is associated with the receiving side of the communication port which enables the port to recognize and accept a possible response to the current communication primitive that may be sent by its recipient.

In stage F22-14, finally, the optional time keeper 84(1) is updated by providing it with the number of data units that have been sent in stage F22-11. In one embodiment, the time keeper 84(1) increments a counter based on the number of data units sent.

With respect to the description of operations in relation to FIGS. 20, 21 and 22, it is further noted that the data selectors (numerals 48, 58, 70, 76, 102 and 106) indicate that possibly only a part of a composite data element is used in some processing. In embodiments, the selection operation for a particular data selector is determined by configuration data and realized with logic gates. In other embodiments, the data selector's selection may be fixed and, for instance may be realized by connecting wires carrying the appropriate electric signals. The stages in FIGS. 21 and 22 are shown in a particular order that reflects one possible way to arrange the various processing steps. As is known to persons skilled in the art it is in general possible to change the order of processes and perform them in parallel within the constraints of data dependencies, and such rearrangements can be made dynamically with well known process scheduling art. For example, stage F22-12 can be performed as soon as any encrypted parts of the header data that are used in the assembly process have been computed in stage F22-7. It may also be performed before or in parallel with stage F22-8 or F22-9. In an other example, stage F22-12 may need to be performed before stage F22-9 if the session record index used in stage F22-9 is based on the return destination ID computed in stage F22-12, rather then on the result of stage F22-8.

While FIGS. 20, 21, 22 are illustrative for a communication port 22($i$) and the port as described may further be realized in various embodiments. In a first embodiment, no encryption is provided and key-store-annex-generator 42, stream encryptor 44 and stream decryptor 40 and controlling components like data selectors are not present. In another embodiment, the use of encryption can be configured, either per communication primitive or more statically, for instance with dip-switches. In a further embodiment, the session record index used in stage F22-9 is based on the return destination ID computed in stage F22-4. In another embodiment, the session record index is based on the return destination ID computed in stage F22-12. In a further embodiment, the session record index is derived from the return destination ID by decrypting it with a stream encryption key. In yet another embodiment, the output driver 38 and I/O device 34 perform Media Access Control for a shared communication medium connected to I/O device 34. Typically in this embodiment, output driver 38 performs data buffering to enable retransmission after a media access collision.

As shown in FIG. 20 and explained with respect to FIGS. 21 and 22, the return destination ID may be determined from an, at least partially, encrypted version of the communication primitive. With reference to FIG. 9B, the encrypted part of the communication primitive, comprising the parts 33(3)", 33(5), 33(4)", 35 and 33(3)"', after applying the encryption is represented by nature of the cryptographic process as a string of pseudo-random bits. Yet, for the purpose of assembling the return destination ILK 33(2) pertaining to communication primitive 31 a structure may be imposed on the string of pseudo random bits with a first part being interpreted as second nonce part 33(3)" and a second part as the checksum 33(5). The return destination ID assembler 60(1) and 60(2) in FIG. 20 are applied on the encrypted version of the communication primitive. Data selectors 70 and 48(3), respectively, in selecting data to use in assembling the return destination ID, perform the interpretation of the encrypted part as header data.

It is noted that the return destination ID resulting from interpreting the encrypted part of the communication primitive as data in the header will always be a pseudo random number. It will also be a unique random number if some unique data is used as input to its assembly, e.g. first nonce part 33(3)'. Hence, in an embodiment the communication primitive 31 comprise a header that comprises at least three data parts, a destination ID, communication parameters and a nonce, and an encrypted payload. In a further embodiment, assembling the return destination ID involves selecting data from the encrypted part of the communication primitive as input. In an other embodiment, a trailer of the communication primitive comprises a nonce 33(3)"' which is included in the encryption and has a size depending on the size of the payload 35 and on the padding that may be required for a particular encryption algorithm used as stream encryptor 44.

It is further noted that assembling a destination ID using data extracted from the encrypted part of the communication primitive will in general result in a return destination ID that changes for each communication primitive.

It is also noted that the rule for assembling the return destination ID, if indicated by the communication parameters, must be indicated in the unencrypted first communication parameters part 33(4)'. It also noted that the format, size and structure, of at least a first part of the unencrypted part of the header 33 must be agreed between the communication units. It is further noted that interpretation of a first part of the encrypted part of the communication primitive 31 as data in the header 33 to assemble a return destination ID is possible even if in the unencrypted communication primitive this header data is only present in a trailer or not present at all. Also, with part of the communication primitive encrypted it is possible to use larger data sizes for the header data used in assembling the return destination ID then would fit in the header of the unencrypted communication primitive. Hence, in one embodiment, the communication parameters in the unencrypted part of the header indicate at least one of (i) the use of encryption to a part of the communication primitive, (ii) the size of the complete unencrypted header, (iii) the key used for encryption, (iv) the rule to assemble a return destination ID, and (v) the size and offset of data units extracted from the encrypted part of the communication primitive and to be interpreted as header data.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of communicating a series of communication primitives during a multicast communication session between an originating communication unit and listening communication units, the method comprising:
   with an originating communication unit executing on an originating computer, sending at least a first and a second multicast communication primitive, as part of the series of communication primitives, to the listening communication units via a network, wherein each listening communication unit is executing on a respective one of a plurality of listening computers, and each one of the listening communication units being a receiver of the series of communication primitives; and with the originating communication unit prior to the sending of the second multicast communication primitive, changing the multicast destination ID during the multicast communication session to generate a changed multicast destination ID, the first multicast communication primitive comprising at least the multicast destination ID, the second multicast communication primitive comprising at least the changed multicast destination ID, wherein the changing of the multicast destination ID during the multicast session further comprises:

with the originating communication unit determining that the multicast destination ID has been used a predetermined number of times in multicast communication primitives during the multicast communication session; and with the originating communication unit sending a pseudo random number employable to derive the changed multicast destination ID in a given multicast communication primitive, as part of the series of communication primitives, the given multicast communication primitive comprising the multicast destination ID; and with the originating communication unit sending data in the series of communication primitives, the series of communication primitives being recognized by the listening communication units during the multicast communication session before and after sending the second multicast communication primitive.

2. The method of claim 1, further comprising:
sending a requesting communication primitive by a sending communication unit to the originating communication unit, the requesting communication primitive specifying that the sending communication unit requests to become a listening communication unit in a specified multicast communication session.

3. The method of claim 1, further comprising:
sending an initiating communication primitive by the originating communication unit to a communication unit, the initiating communication primitive specifying that the communication unit is invited to join as a listening communication unit in a specified multicast communication session.

4. The method of claim 1, the method further comprising:
calculating the changed multicast destination ID by each one of the plurality of the listening communication units using the pseudo random number in the given multicast communication primitive rendering a calculated changed multicast destination ID; and
storing the calculated changed multicast destination ID in memory of each one of the listening communication units.

5. The method of claim 1, wherein the communication primitive includes a checksum and the method further comprises:
receiving, by a receiving communication unit, the communication primitive; and
verifying, by the receiving communication unit, the checksum during a process of accepting the communication primitive by the receiving communication unit.

6. The method of claim 1, further comprising:
with each of the listening communication units applying a predetermined computational rule on the pseudo random number in the given multicast communication primitive to derive the changed multicast destination ID.

7. A method of communicating a series of communication primitives during a multicast communication session between an originating communication unit and listening communication units, the method comprising:

with an originating communication unit executing on an originating computer, sending multicast communication primitives, as part of the series of communication primitives, to listening communication units via a network, wherein each listening communication unit is executing on a respective one of a plurality of listening computers, wherein each of the multicast communication primitives comprises at least a multicast destination ID, and each one of the listening communication units being a receiver of the series of communication primitives and wherein each of the multicast communication primitives includes a checksum;

receiving, by a receiving one of the listening communication units, one of the multicast communication primitives;

verifying, by the receiving one of the listening communication units, the checksum during a process of accepting the received one of the multicast communication primitives;

with the originating communication unit, sending data relating to a changed multicast destination ID generated by the originating communication unit during the multicast communication session to each one of the plurality of listening communication units, wherein the sending data related to the changed multicast destination ID during the multicast session further comprises:

determining, by the originating communication unit, that the multicast destination ID has been used a predetermined number of times in multicast communication primitives during the multicast communication session, wherein the data relating to the changed multicast destination ID comprises a pseudo random number employable to derive the changed multicast destination ID;

with each one of the plurality of the listening communication units, calculating the changed multicast destination ID using the data relating to the changed multicast destination ID rendering a calculated changed multicast destination ID; and with the originating communication unit sending data in the series of communication primitives, the series of communication primitives being recognized by the listening communication units during the multicast communication session before and after sending the data relating to the changed multicast destination ID.

8. The method of claim 7, further comprising:
sending a requesting communication primitive by a sending communication unit to the originating communication unit, the requesting communication primitive specifying that the sending communication unit requests to become a listening communication unit in a specified multicast communication session.

9. The method of claim 7, further comprising:
sending an initiating communication primitive by the originating communication unit to a communication unit, the initiating communication primitive specifying that the communication unit is invited to join as a listening communication unit in a specified multicast communication session.

10. The method of claim 7, further comprising storing the calculated changed multicast destination ID in memory of each one of the listening communication units.

11. The method of claim 7, further comprising:
applying, by each of the listening communication units, a predetermined computational rule on the pseudo random number of the data relating to the changed multicast destination ID to derive the changed multicast destination ID.

12. A computer system:
an originating communication unit executing on an originating computer; and
a plurality of listening communication units each executing on a respective one of a plurality of listening computers,
wherein the originating communication unit sends at least a first and a second multicast communication primitive, as part of a series of communication primitives, to the listening communication units via a network during a multicast communication session,
wherein each one of the listening communication units being a receiver of the series of communication primitives,
wherein, during the multicast communication session and prior to the sending of the second multicast communication primitive, the originating communication unit changes the multicast destination ID during the multicast communication session to generate a changed multicast destination ID, the first multicast communication primitive comprising at least the multicast destination ID, the second multicast communication primitive comprising at least the changed multicast destination ID, wherein the changing of the multicast destination ID during the multicast session further comprises:
applying, by the originating communication unit, a cryptographic hash function on a given portion of a given multicast communication primitive of the multicast session to derive the changed multicast ID, the given multicast communication primitive comprising data indicating an intended change in the multicast destination ID; and
sending, by the originating communication unit, the given multicast communication primitive, as part of the series of communication primitives, to the listening communication units, the given multicast communication primitive comprising the multicast destination ID,
wherein the originating communication unit sends data in the series of communication primitives, the series of communication primitives being recognized by the listening communication units during the multicast session before and after sending the second multicast communication primitive.

13. The computer system of claim 12, further comprising a sending communication unit sending a requesting communication primitive to the originating communication unit, the requesting communication primitive specifying that the sending communication unit requests to become a listening communication unit in a specified multicast communication session.

14. The computer system of claim 12, wherein the originating communication unit sends an initiating communication primitive to a communication unit, the initiating communication primitive specifying that the communication unit is invited to join as a listening communication unit in a specified multicast communication session.

15. The computer system of claim 12, wherein each one of the plurality of the listening communication units calculates the changed multicast destination ID by applying the cryptographic hash function on the given portion of the given multicast communication primitive rendering a calculated changed multicast destination ID, and wherein each one of the listening communication units stores the calculated changed multicast destination ID in memory.

16. The computer system of claim 12, wherein the communication primitive includes a checksum, wherein a receiving one of the listening communication units receives the communication primitive, and wherein the receiving one of the listening communication unites verifies the checksum during a process of accepting the communication primitive.

17. The computer system of claim 12,
wherein each of the listening communication units applies the cryptographic hash function on the given portion of the given multicast communication primitive to derive the changed multicast destination ID.

* * * * *